United States Patent [19]
Suzuki et al.

[11] Patent Number: 5,140,413
[45] Date of Patent: Aug. 18, 1992

[54] IMAGE PROCESSING APPARATUS INCLUDING PROCESSING MEANS FOR MOVING IMAGE AND PERFORMING CONVERSION

[75] Inventors: Yasumichi Suzuki, Hara; Yoshinori Ikeda, Taira; Koichi Katoh, Yokohama; Tetsuya Ohnishi, Yokohama; Toshihiro Kadowaki, Yokohama; Toshio Honma, Kawasaki, all of Japan

[73] Assignee: Canon Kabushiki Kaisha, Tokyo, Japan

[21] Appl. No.: 687,087

[22] Filed: Apr. 18, 1991

Related U.S. Application Data

[62] Division of Ser. No. 399,920, Aug. 29, 1989, abandoned, which is a division of Ser. No. 120,820, Nov. 13, 1987, Pat. No. 4,873,570.

[30] Foreign Application Priority Data

| Nov. 14, 1986 [JP] | Japan | 61-271450 |
| Nov. 14, 1986 [JP] | Japan | 61-271451 |
| Jan. 19, 1987 [JP] | Japan | 62-009468 |
| May 15, 1987 [JP] | Japan | 62-119311 |

[51] Int. Cl.[5] ............................................. H04N 1/46
[52] U.S. Cl. ........................................ 358/80; 358/75
[58] Field of Search ................................ 358/75, 80

[56] References Cited

U.S. PATENT DOCUMENTS

| 4,236,174 | 11/1980 | Gall | 358/80 |
| 4,328,515 | 5/1982 | Wellendorf | 358/80 |
| 4,393,399 | 7/1983 | Gast et al. | 358/80 |
| 4,642,681 | 2/1987 | Ikeda | 358/79 |
| 4,667,228 | 5/1987 | Kawamura et al. | 358/32 X |
| 4,679,074 | 7/1987 | Sugiura et al. | |
| 4,682,216 | 7/1987 | Sasaki et al. | 358/79 |
| 4,833,532 | 5/1989 | Abe | 358/32 X |

FOREIGN PATENT DOCUMENTS

| 0004078 | 9/1979 | European Pat. Off. |
| 2136475 | 12/1972 | France |
| 8002607 | 11/1980 | PCT Int'l Appl. |
| 1388026 | 3/1975 | United Kingdom |

Primary Examiner—James J. Groody
Assistant Examiner—Mark R. Powell
Attorney, Agent, or Firm—Fitzpatrick, Cella, Harper & Scinto

[57] ABSTRACT

An image processing apparatus includes a first indicator for indicating movement of an objective color image, a second indicator for indicating conversion of a specific color in the objective color image and a processor for moving the objective color image in accordance with the indication by the first indicator, and for performing the conversion of the specific color in the objective color image in accordance with the indication by the second indicator.

32 Claims, 79 Drawing Sheets

FIG. 3

| COMMAND | CODE | FUNCTION |
|---|---|---|
| RESET COMMAND | 01H | AFTER RECEPTION OF RESET COMMAND, 0-ADDRESS CALLED STARTS FOLLOWING A SERIES OF COMMUNICATION HANDSHAKING |
| HOLD-OFF COMMAND | 02H | AFTER RECEPTION OF HOLD-OFF COMMAND, STEPPING MOTOR CONTROLLER RELEASES HOLD STATE OF MOTOR AND MAKES SCANNER FREE (POWER OFF STATE) |
| HOLD-ON COMMAND | 03H | AFTER RECEPTION OF HOLD-ON COMMAND, STEPPING MOTOR CONTROLLER MAINTAINS HOLD STATE OF MOTOR |
| HP SEARCH COMMAND | 04H | AFTER RECEPTION OF HP SEARCH COMMAND, SCANNER IS MOVED TO HP SENSOR POSITION (MOVING OPERATION CONSISTS OF THREE STATES) |
| SCAN COMMAND | 05H | SCAN COMMAND IS NORMALLY TO DESIGNATE SCAN MODE, AND CONSISTS OF FOLLOWING 4-BYTE PARAMETER (SCAN LENGTH ; MAGNIFICATION) AFTER RECEPTION OF SCAN COMMAND AND PARAMETERS, SCANNER STARTS RESPONSIVE TO "SSTART" SIGNAL SCAN COMMAND IS HELD UNTIL RESET DEFAULT VALUE : A-4 SIZE (210mm) EQUI-MAGNIFICATION (100%) |
| DESIGNATION MOVEMENT COMMAND | 06H | DESIGNATION MOVEMENT COMMAND IS TO DESIGNATE MOVEMENT DISTANCES IN TWO DIRECTIONS FROM PRESENT POSITION, AND CONSISTS OF FOLLOWING 2-BYTE PARAMETER |

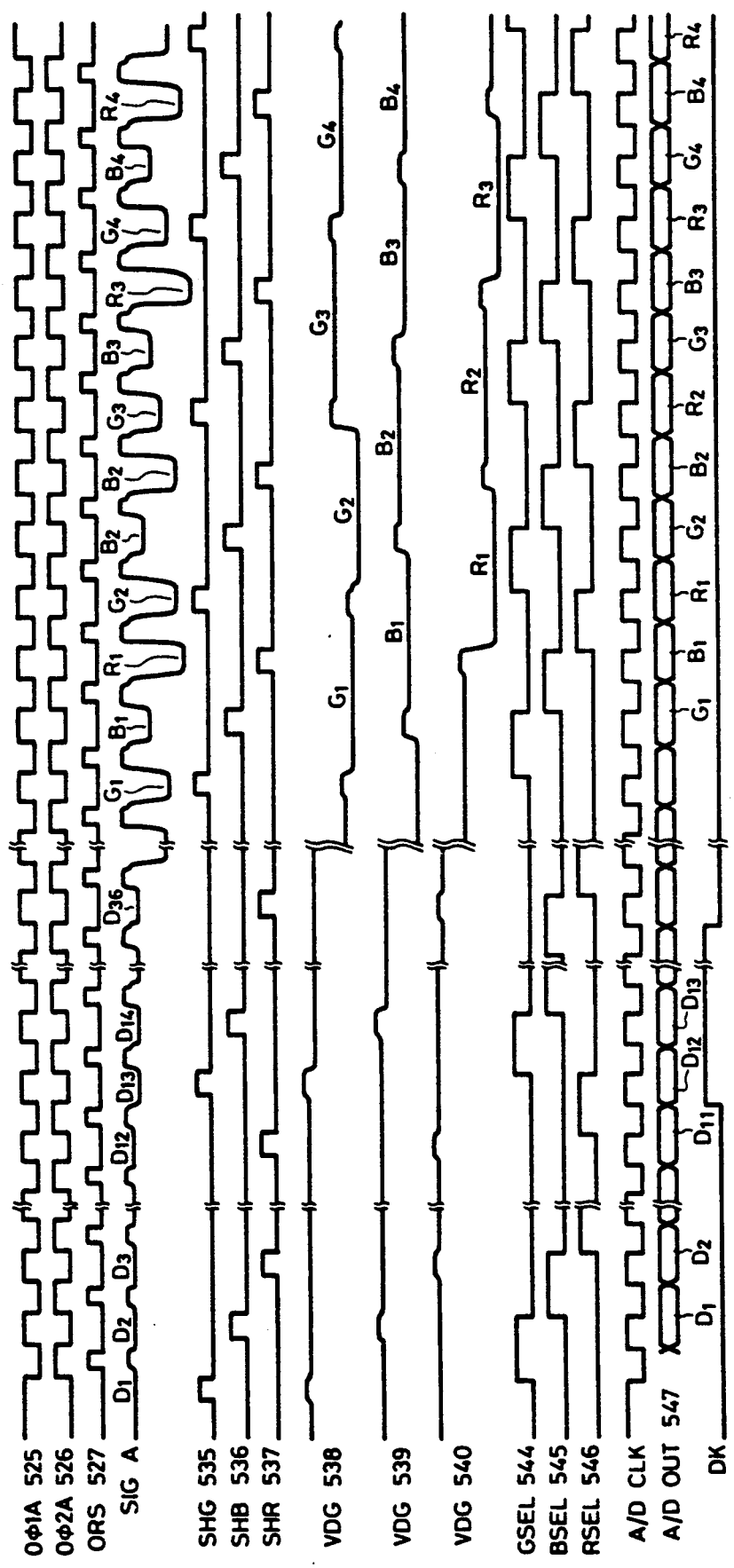

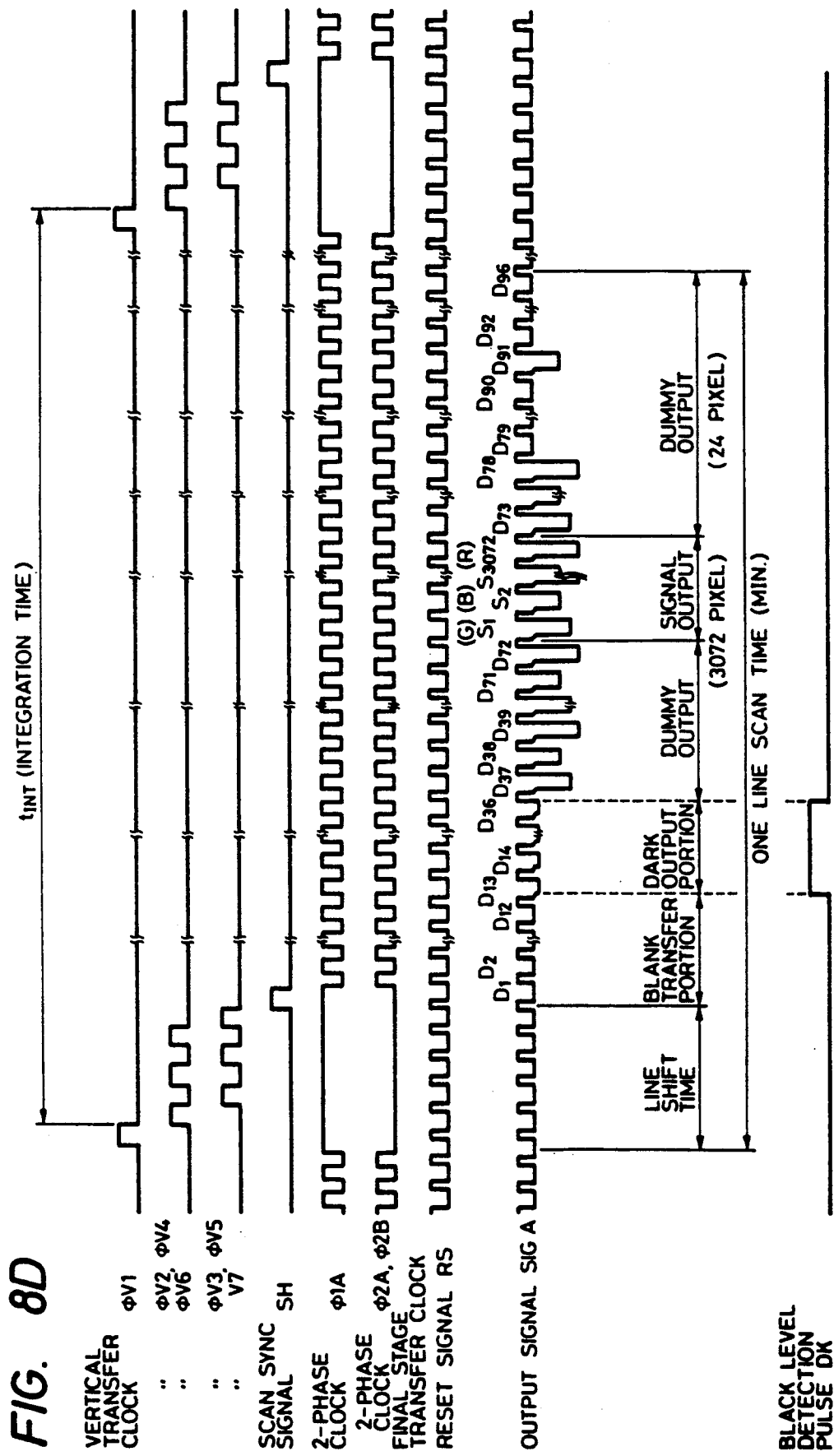

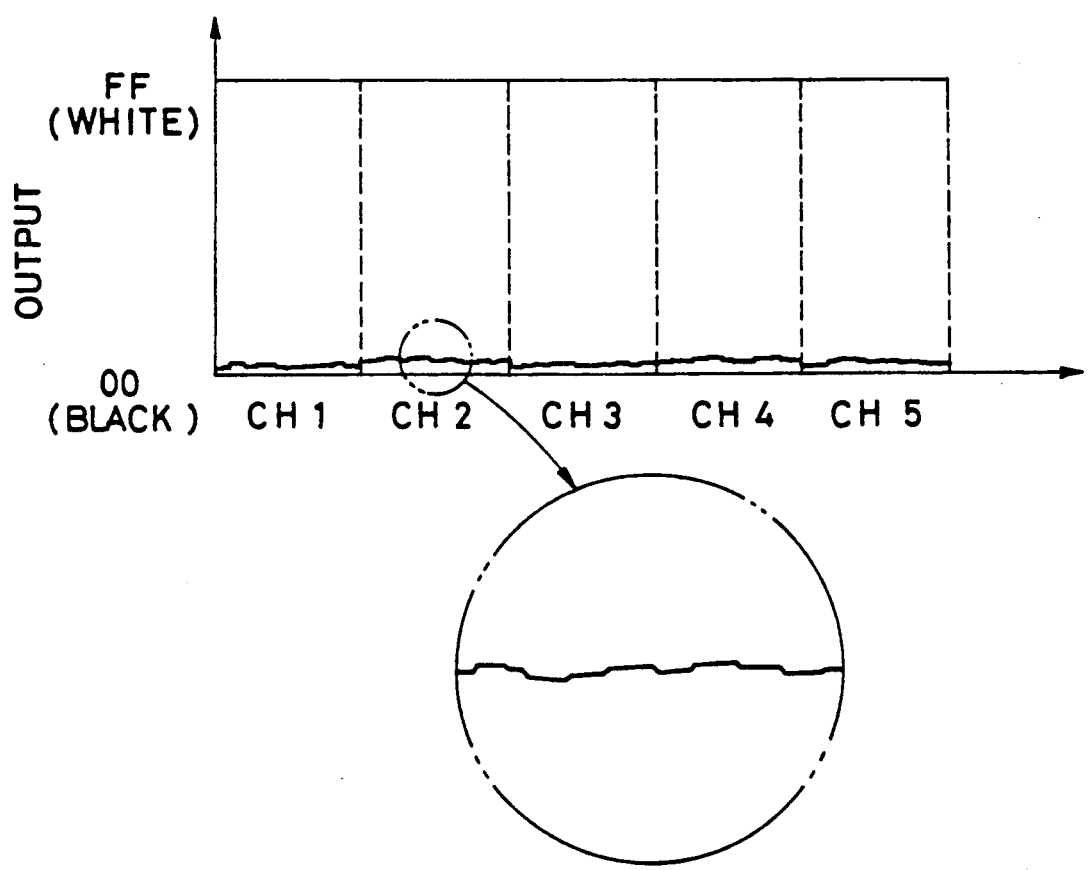

FIG. 14
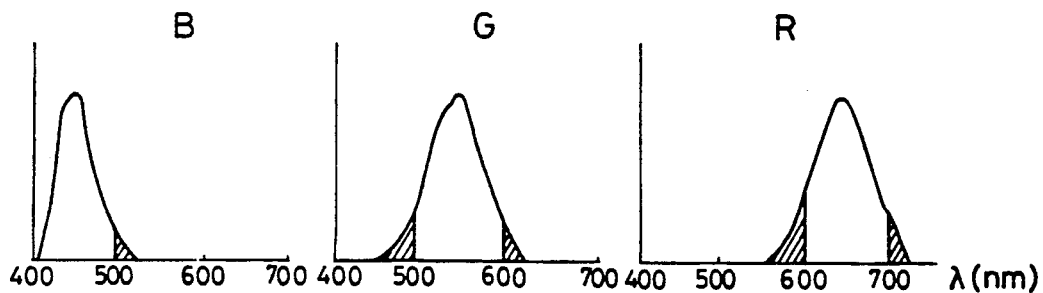
FIG. 15
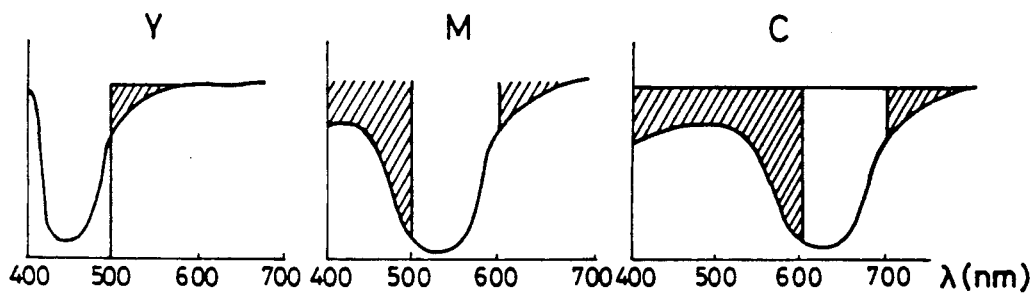
FIG. 16B
| C2 | C1 | C0 | a | b | c | | |
|----|----|----|----|----|----|----|----|
| 0 | 0 | 0 | 1 a | 1 b | 1 c | Y | ——① |
| 0 | 0 | 1 | 2 a | 2 b | 2 c | M | ——② |
| 0 | 1 | 0 | 3 a | 3 b | 3 c | C | ——③ |
| 0 | 1 | 0 | 4 a | 4 b | 4 c | MONO | ——④ |
| 1 | X | X | X | X | X | B K | ——⑤ |

FIG. 17E
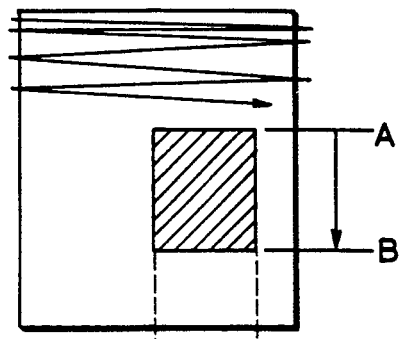
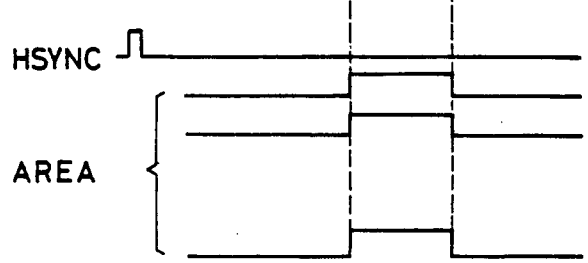
FIG. 17G
| AREA | 0 | UAREA | 565 |
|------|---|-------|-----|
| AREA | 1 | KAREA | 587 |
|      | 2 | MAREA | 564 |
|      | 3 | GAREA | 626 |
|      | 4 | AWE   | 628 |
|      | 5 | ARE   | 632 |
|      | 6 | BWE   | 629 |
|      | 7 | BRE   | 633 |
|      | 8 | TMAREA| 660 |
|      | 9 | CHAREA 0 | 615 |
|      | 10 | •  1 | 665 |
|      | 11 | •  2 | 666 |
|      | 12 | •  3 | 667 |
|      | 13 | CHSEL 0 | 668 |
| AREA | 14 | CHSEL 1 | 669 |
FIG. 17F
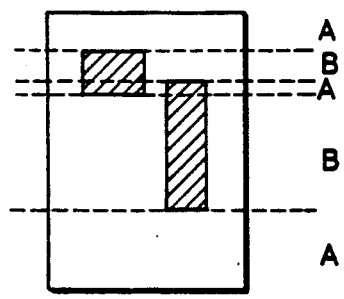

FIG. 18B
| $S_0$ | $S_1$ | $S_2$ | $S_3$ | $\overline{O}$ |
|---|---|---|---|---|
| 1 | 1 | 0 | 0 | 1 |
| 1 | 1 | 0 | 1 | 2 |
| 1 | 1 | 1 | 0 | 3 |
| 0 | X | X | X | 4 |
| X | 0 | X | X | 4 |
FIG. 18D
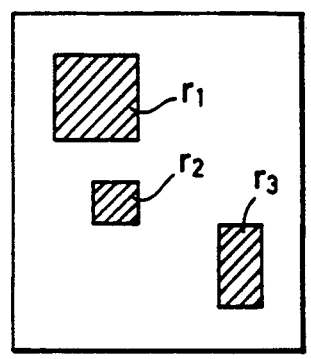
FIG. 18C
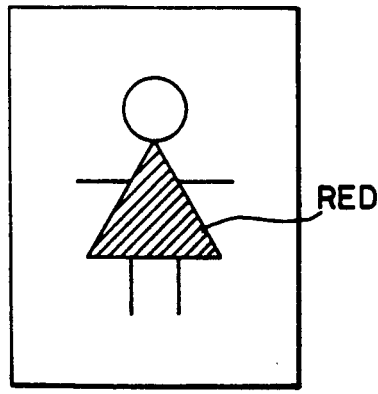
FIG. 18E
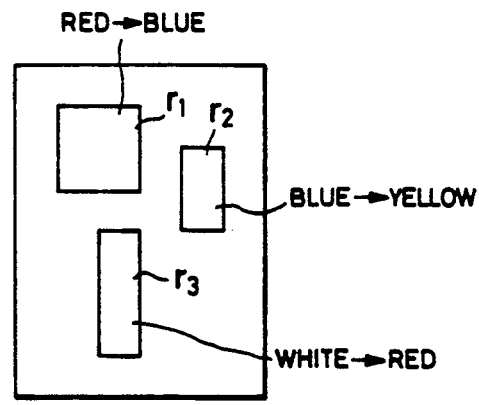

FIG. 19D
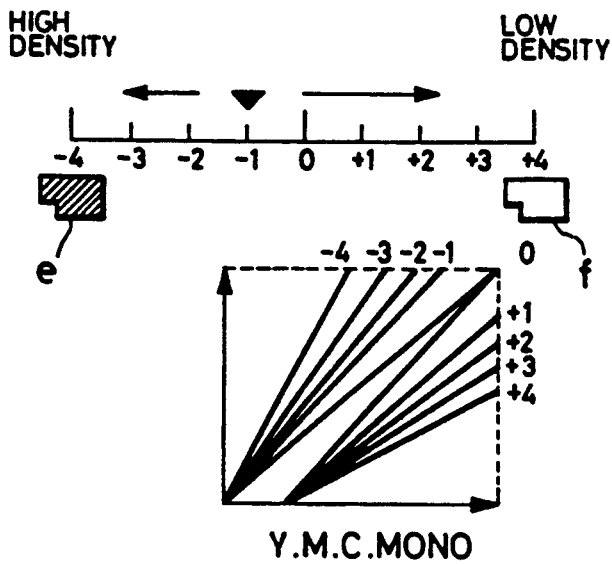
FIG. 19E
FIG. 19F
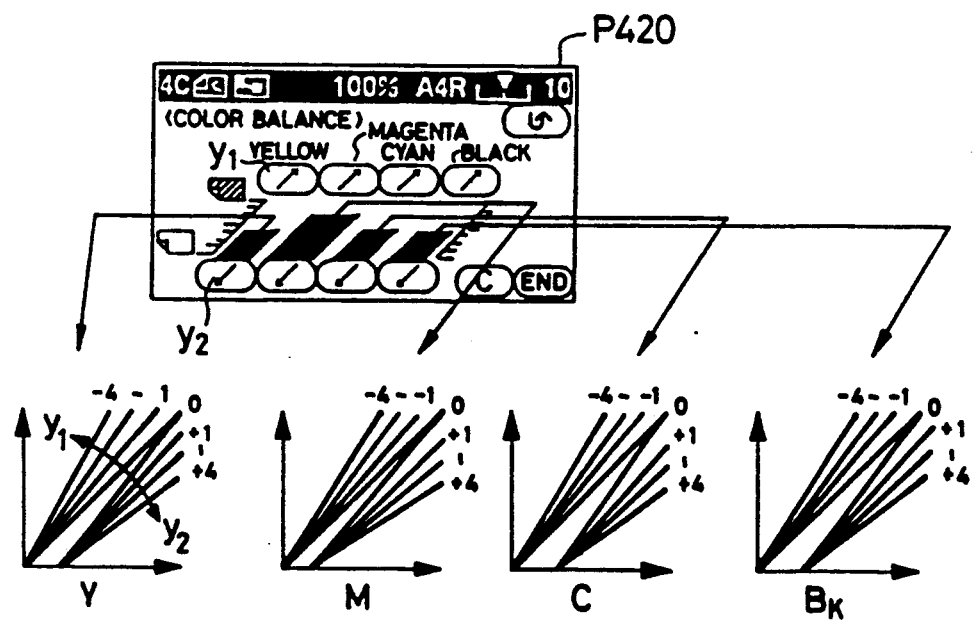
FIG. 19F-Y  FIG. 19F-C
FIG. 19F-M  FIG. 19F-BK

P430

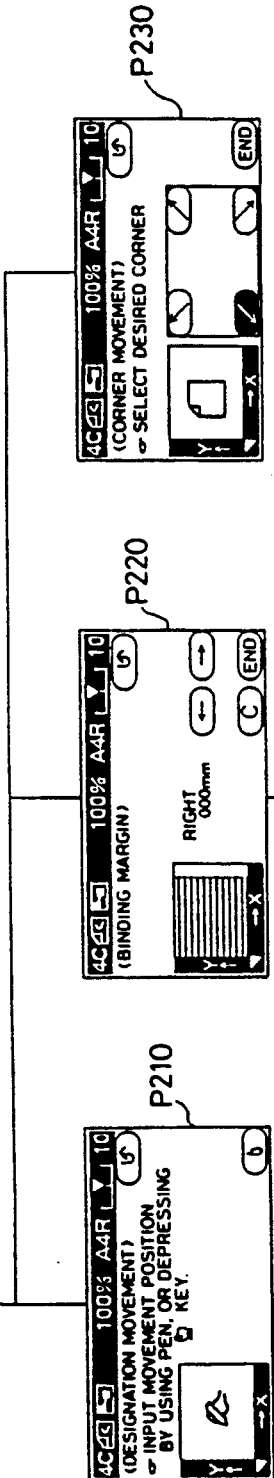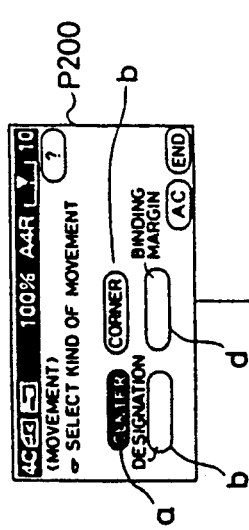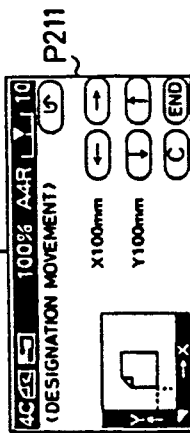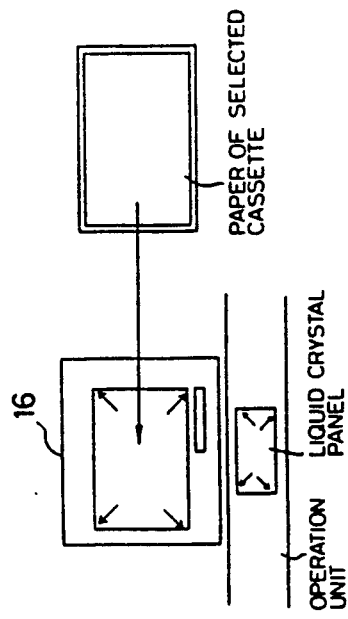
FIG. 35A
FIG. 35B

MONOCHROME IMAGE
MOVEMENT COLOR IMAGE AREA
MOVED AREA
(EQUI MAG)

WHITE IMAGE
(XY SAME RATE AUTO MAG CHANGE)

MONOCHROME IMAGE
WHITE IMAGE
(EQUI MAG)

(XY INDEPENDENT AUTO MAG CHANGE)

MONOCHROME ORIGINAL DOCUMENT

COLOR ORIGINAL DOCUMENT

PRINT AFTER INSERTION SYNTHESIZING

FIG. 45

| STANDARD COLOR | YELLOW COMPONENT | MAGENTA COMPONENT | CYAN COMPONENT | BLACK COMPONENT |
|---|---|---|---|---|
| YELLOW | 80H | 00H | 00H | 00H |
| MAGENTA | 00H | 80H | 00H | 00H |
| CYAN | 00H | 00H | 80H | 00H |
| BLACK | 00H | 00H | 00H | 80H |
| RED | 80H | 80H | 00H | 00H |
| GREEN | 80H | 00H | 80H | 00H |
| BLUE | 00H | 80H | 80H | 00H |

COMPARISON OF EACH COLOR COMPONENT
IN STANDARD COLOR DESIGNATION
(WHITE IMAGE = 00, BLACK = FFH)

FIG. 52B  $V_{OUT} = -V_{IN}/N$ $$0 < N < 1$$

$$A_V = -\frac{V_{OUT}}{V_{IN}} = -\frac{1}{N}$$

$A_V$ = VOLTAGE GAIN $$N = \frac{BIT\ 1}{2^1} + \frac{BIT\ 2}{2^2} + \cdots + \frac{BIT\ 8}{2^8}$$

| DIGITAL INPUT N<br>MSB      LSB | $A_V$ |
|---|---|
| 0 0 0 0 0 0 0 0 | $-A_{OL}$(OPAMP) |
| 0 0 0 0 0 0 0 1 | $-256$ |
| 1 0 0 0 0 0 0 0 | $-\frac{256}{128} = -2$ |
| 1 1 1 1 1 1 1 1 | $-\frac{256}{256} = -1$ |

IMAGE PROCESSING APPARATUS INCLUDING PROCESSING MEANS FOR MOVING IMAGE AND PERFORMING CONVERSION

This application is a division of application Ser. No. 07/399,920 filed Aug. 29, 1989 which is a division of application Ser. No. 07/120,820 filed Nov. 13, 1987 now issued as U.S. Pat. No. 4,873,570.

BACKGROUND OF THE INVENTION

1. Field of the Invention

The present invention relates to a color image processing apparatus for processing color image data so as to obtain data which are necessary for forming a color image.

2. Related Background Art

The applicant has already proposed, in the specification of U.S. Pat. No. 4,204,728, a color copying apparatus which is capable of conducting conversion between a predetermined number of colors which are combinations of R, G and B colors. This color copying apparatus, however, is not suitable for use in the field of graphic designing because the number of colors available for the color conversion is limited. In order to obviate this shortcoming, the applicant also has proposed, in the specification of the U.S. patent application Ser. No. 084,080 filed on Aug. 11, 1987, a copying apparatus capable of conducting color conversion between a greater number of colors.

The color copying apparatus, however, suffers from the following disadvantage. The conversion from a first color into a second color is conducted by appointing these colors in terms of color information. In this operation, the color information which identifies the first color is used as a reference and all the colors with information falling within a predetermined range around the reference color information are regarded as being the same as the first color so that all these colors are converted into the second color. In consequence, problems are encountered such as failure in the conversion of the desired color or conversion of a color which the user does not wish to convert. This drawback is attributable to the fact that, while the ranges of colors which the user wishes to convert vary depending on factors such as the type of the document, intension of the user, and so forth, the copying apparatus employs fixed tolerances of hue and color density so that it regards and processes all the colors having hues and color densities falling within the fixed tolerances from those of the appointed color as being the same as the appointed color.

SUMMARY OF THE INVENTION

Accordingly, an object of the present invention is to provide a color image processing apparatus capable of overcoming the above-described problems of the prior art.

Another object of the present invention is to provide a color image processing apparatus capable of converting conversion between a variety of colors.

Still another object of the present invention is to provide a color image processing apparatus which is capable of conducting conversion between predetermined colors which have been registered in the apparatus, as well as between the colors which are optionally appointed by the operator.

A further object of the present invention is to provide a color image processing apparatus which makes it possible to change the tolerance of color information with respect to the color information of the appointed color to be converted and which regards all the color of color information falling within the tolerance as being the same as the appointed color, thereby converting all these colors into the target color.

A still further object of the present invention is to provide a color image processing apparatus in which the accuracy of the image processing operation is enhanced by using, as color detection data concerning the appointed color to be converted, values which are computed from data obtained on a plurality of points in the area of the appointed color.

A still further object of the present invention is to provide a color image processing apparatus which allows the colors to be converted into desired colors only in the appointed regions on an original.

A still further object of the present invention is to provide a color image processing apparatus which can produce color images of a high degree of gradation.

The above and other objects, features and advantages of the present invention will become clear from the following description of the preferred embodiments when the same is read in conjunction with the accompanying drawings.

BRIEF DESCRIPTION OF THE DRAWINGS

FIG. 8C is a signal timing chart showing timings of signals in the circuits shown in FIGS. 8A and 8B;

FIG. 8D is a driving timing chart for driving the CCD;

FIGS. 10B, 10C and 10D are illustrations of black correction;

FIGS. 11-1B, 11-1C and 11-1D are illustrations of the manner in which the white-level correction is conducted;

FIGS. 11-2A, 11-2B, 11-2C and 11-3 are illustrations of the manner in which CCD channels are connected;

FIG. 14 is a spectral characteristic chart showing the spectral characteristic of a reading sensor;

FIG. 15 is a spectral characteristic chart showing the spectral characteristics of color developing toners;

FIG. 16B is an illustration of the relationships between selection signals $C_0$, $C_1$, $C_2$ and color signals;

FIGS. 17A, 17B, 17C, 17D, 17E, 17F and 17G are illustrations of manners in which region signals are generated;

FIGS. 18A, 18B, 18C, 18D, 18E and 18F are illustrations of color conversion;

FIGS. 19A, 19B, 19C, 19D, 19E, 19F, 19F-Y, 19F-M, 19F-C and 19F-BK are illustrations of gamma conversion for controlling the color balance and the color density;

FIGS. 35A and 35B are illustrations of operation in moving mode;

FIG. 40-1 is an illustration of operation in registration mode;

FIG. 40-2 is an illustration of operation in service mode;

FIG. 45 is an illustration of color components of a standard color;

FIG. 52B is a chart showing the codes of the multiplier;

DESCRIPTION OF THE PREFERRED EMBODIMENTS

Preferred embodiments of the present invention will be explained hereinunder with reference to the drawings.

Figure 1:
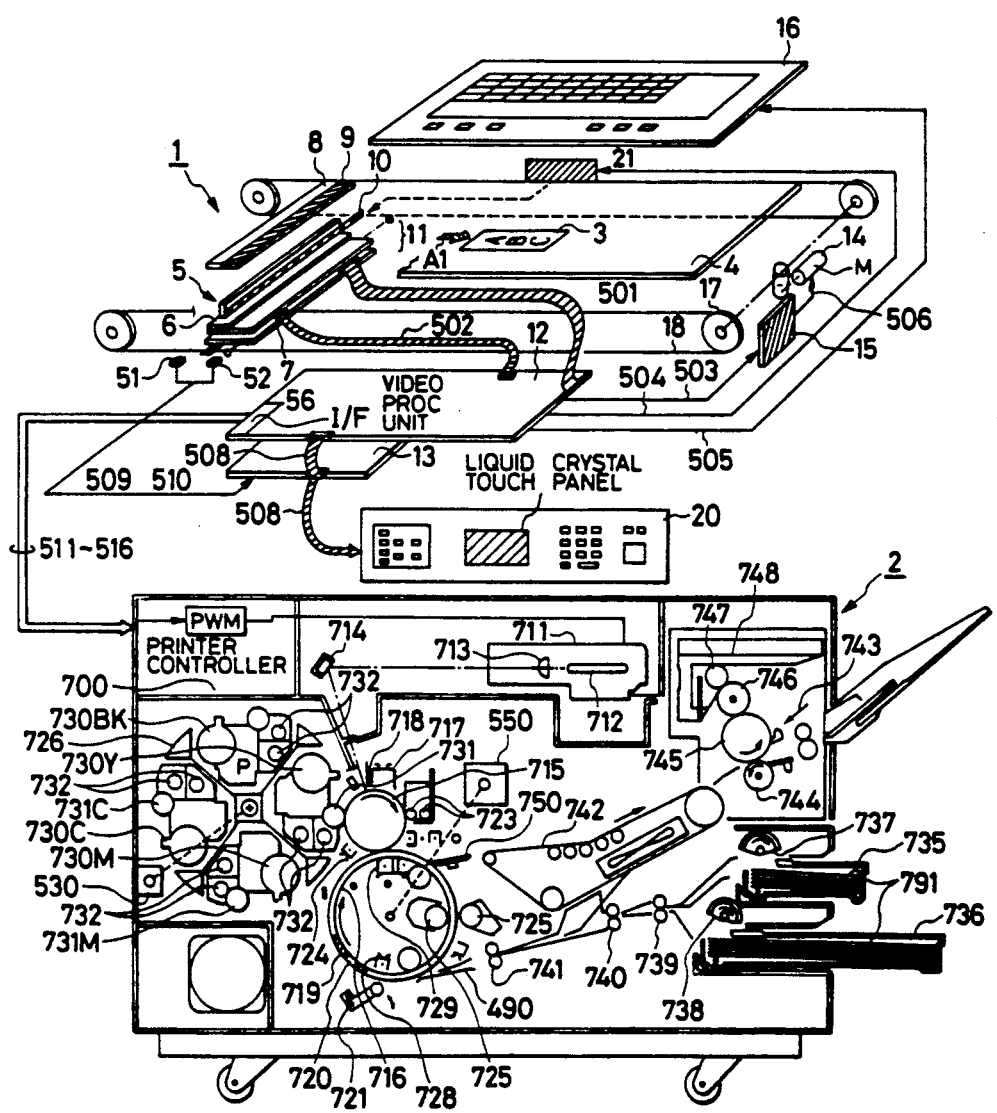
FIG. 1 is a digital color copying machine incorporating a color image processing apparatus of the present invention.

FIG. 1 is a schematic illustration of the internal structure of a digital color image processing apparatus in accordance with the present invention. As will be seen from this Figure, the digital color image processing apparatus has a digital color image reading unit (referred to as "color reader" hereinafter) 1 installed on an upper part thereof and a digital color image printing unit (referred to as "color printer" hereinafter) 2 installed on a lower part thereof. The color reader 1 has a later-mentioned color separation means and photoelectric conversion elements such as CCDs which cooperate with each other in reading color image data of different colors from the original and converting the read data into electric digital image signals. On the other hand, the color printer 2 is an electrophotographic laser beam color printer which is capable of reproducing color images of different colors in accordance with the digital image signals and recording the color images in the form of dot patterns on a recording paper through a plurality of transfer cycles.

The description will be made first as to the outline of the color printer 1. The color printer 1 has a platen glass 4 for carrying an original 3. The original 3 is exposed to and scanned by a light from a halogen exposure lamp 10 and the light reflected form the original 3 is focused and projected onto a real-size full-color sensor 6 through a rod lens array 5. These constituents 5, 6, 7 and 10 constitute an original scanning unit 11 which moves in the direction of an arrow A1 so as to expose the original. Color-separated image signals obtained from each line of scan are amplified to predetermined voltage level by a sensor output signal amplifier circuit 7 and are then transferred through a signal line 501 to a later-mentioned video processing unit so as to be processed in the latter. The detail of this signal processing operation will be described later. A numeral 501 indicates a coaxial cable which is intended for ensuring high fidelity of signal transfer. The real-size full-color sensor 6 is adapted to be driven by driving pulses which are generated in the video processing circuit and supplied to the sensor 6 through a signal line 502. White and black boards 8 and 9 are used for the purpose of white and black level correction which will be detailed later. Briefly, the correction is conducted by illuminating these boards 8 and 9 with the halogen exposure lamp and obtaining signal levels of predetermined densities of respective colors by means of which the white and black levels of the video signals are corrected. A reference numeral 13 designates a control unit having a microcomputer. The control unit 13 performs. through a BUS 508, all the controls performed in the color reader 1, including indication on a control panel 20, control of key input and control of the video processing unit 12, detection of position of the scanning unit 11 by means of position sensors S1, S2 through signal lines 509, 510, control of the stepping motor circuit for driving, by driving pulses, a stopping motor 14 for moving the scanning unit 11 through a signal line 503, on/off control of the halogen exposure lamp by an exposure lamp driver through a signal line 504, control of the light quantity, controls of a digitizer 16, internal keys and display through a signal line 505, and so forth. The color image signals read by the exposure scanning unit 11 during the exposure/scanning are delivered through the amplifier 7 and the signal line 501 into the video processing unit 12 and are processed in various ways within the unit 12. The signals obtained through the signal processing operation are then delivered to the printer unit 2 through an interface circuit 56.

The construction of the color printer 2 will be explained briefly. The color printer 2 has a scanner 711 which has various parts including a laser output portion for converting the image signals from the color reader 1 into light signals, a polygonal mirror 712 such as an octahedral mirror, a motor (not shown) for rotating the mirror 712, and and f/θ lens (image-forming lens) 713. A reference numeral 714 designates a reflection mirror capable of altering the path of laser light, while 715 denotes a photosensitive drum. The laser light emitted from a laser output section is reflected by the polygonal mirror 712 so as to conduct a raster scan of the surface of the photosensitive drum 715 through a lens 713 and a mirror 714, whereby a latent image corresponding to the original image is formed.

The color printer 2 further has a primary charger 717, a whole-area exposure lamp 718, a cleaner unit 723 for collecting residual toner which has not directly contributed to the image transfer, and a pre-charger 724 for charging before transfer. These constituents are arranged around the photosensitive drum 715.

The color printer 2 further has a developing unit for developing the electrostatic latent image formed on the surface of the photosensitive drum 715 through exposure to the laser light. The developing unit 726 includes developing sleeves 731Y, 731M, 731C and 731Bk which are adapted to conduct development upon direct contact with the photosensitive drum 715, toner hoppers 730Y, 730M, 730C and 730Bk which are adapted to hold spare toners, and screws 732 for transferring toners. These sleeves 731Y to 731Bk, toner hoppers 730Y to 730Bk and the screws 732 in combination constitute a developing unit 726. These constituents are arranged about the axis P of rotation of the developer unit. For instance, when an yellow toner image is to be formed, the development is conducted while the developing unit 726 is in the position shown in FIG. 1 so that the yellow toner is supplied to develop the latent image in yellow color. For the purpose of forming a magenta toner image, the developing unit 726 is rotated about the axis P so as to bring the developing sleeve 731M in the magenta developing device into contact with the photosensitive drum 715. Development in cyan and black colors can be conducted in similar manners as that for development in black color.

A reference numeral 716 denotes a transfer drum through which the toner image formed on the photosensitive drum is transferred to a copy paper. A reference numeral 719 designates an actuator plate for detecting the position to which the transfer drum 716 has been moved. A home position sensor 720 is adapted to cooperate with the actuator plate 719 when the same has been brought to a position near the actuator plate 719 so as to detect the returning of the transfer drum 716 to the home position. A reference numeral 725 denotes a drum cleaner, 727 denotes a paper pressing roller, 728 denotes a charge eliminator and 729 denotes a transfer charger. These constituents 719, 720, 725, 727 and 729 are arranged around the transfer roller 716.

Copy papers are adapted to be fed from paper cassettes 735, 736 by means of paper feed rollers 737, 738. The timing of feed and convey of the copy papers is controlled by timing rollers 739, 740 and 741. The copy paper fed by the operation of these parts is guided by a paper guide 749 and is wound on the transfer drum 716 with its leading end gripped by a later-mentioned gripper, so as to be subjected to a subsequent image forming process.

The photosensitive drum 715 and the transfer drum 716 are adapted to be driven in synchronism with each other by a drum driving motor 550. A reference numeral 750 denotes 9 a separation claw for separating the copy paper from the transfer drum 716 after the formation of the image. The separated copy paper is then conveyed by a conveyor belt 742 to an image fixing section which employs a pair of heat-pressing rollers 744, 745 which cooperate with each other in pressing the copy paper therebetween so as to fix the image on the copy paper.

A description will be made hereinunder as to the control section 13 of the reader portion with specific reference to FIG. 2.

<Control Section>

Figures 1A, 11:
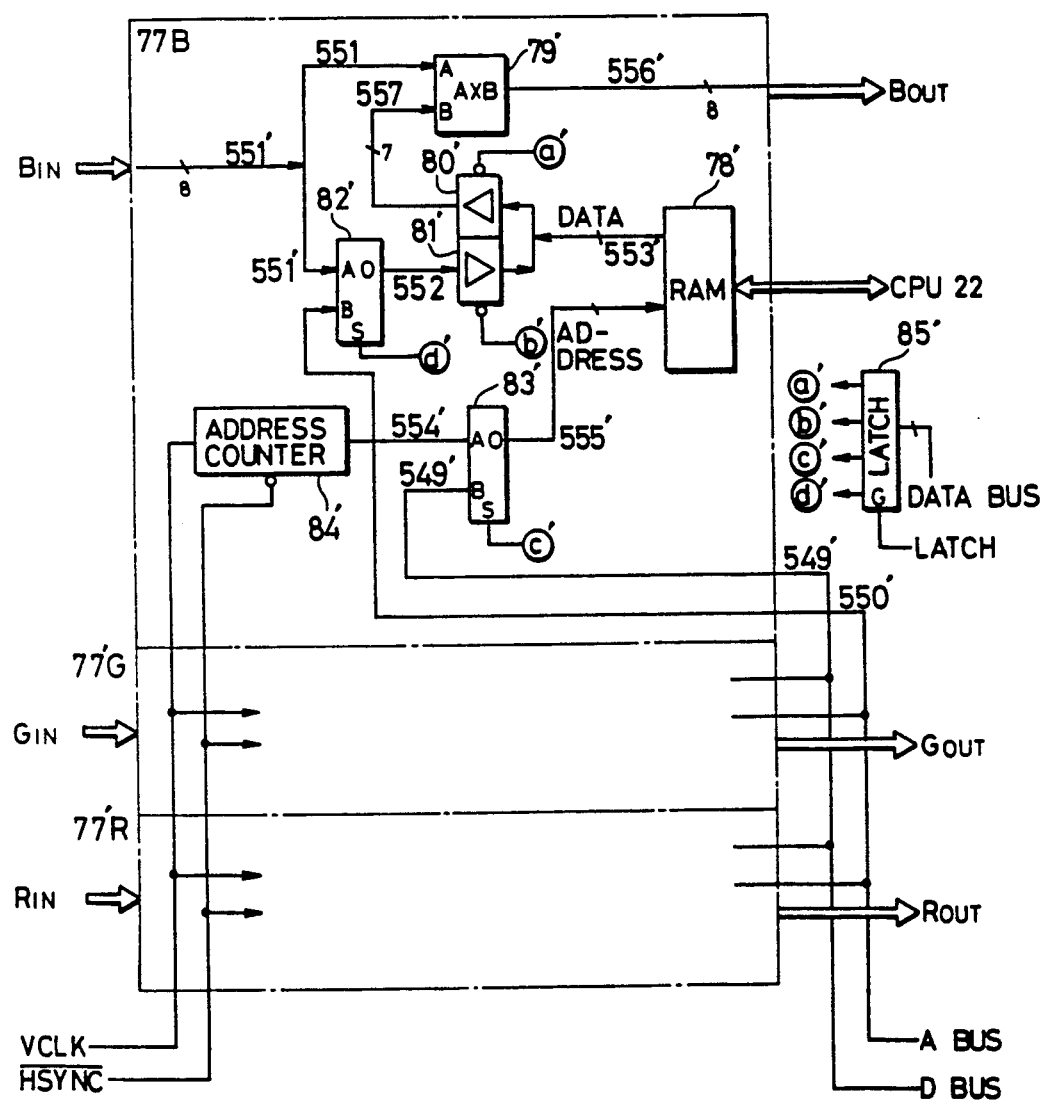
FIG. 11-1A is a circuit diagram of a white level correction circuit.
Figures 1B, 11:
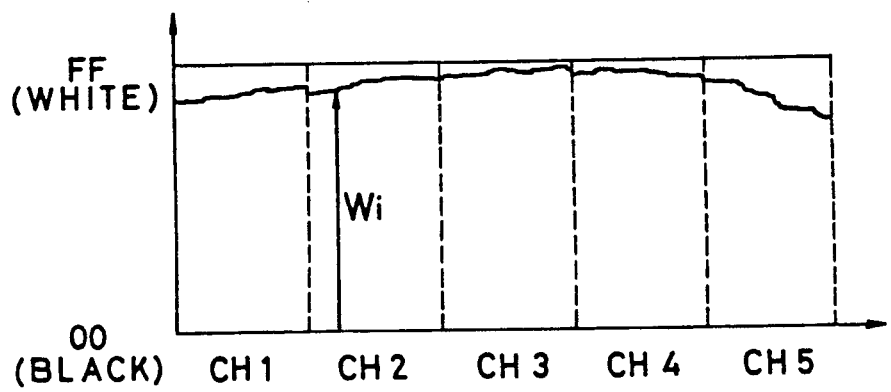
Figures 1C, 11:
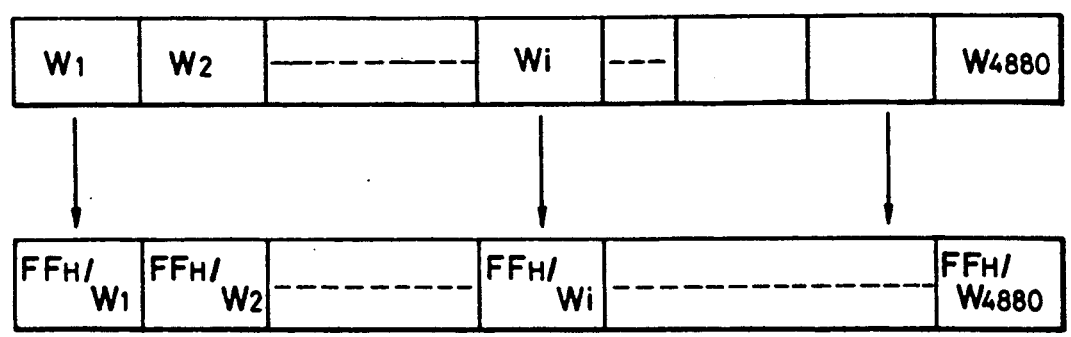
Figures 1D, 11:
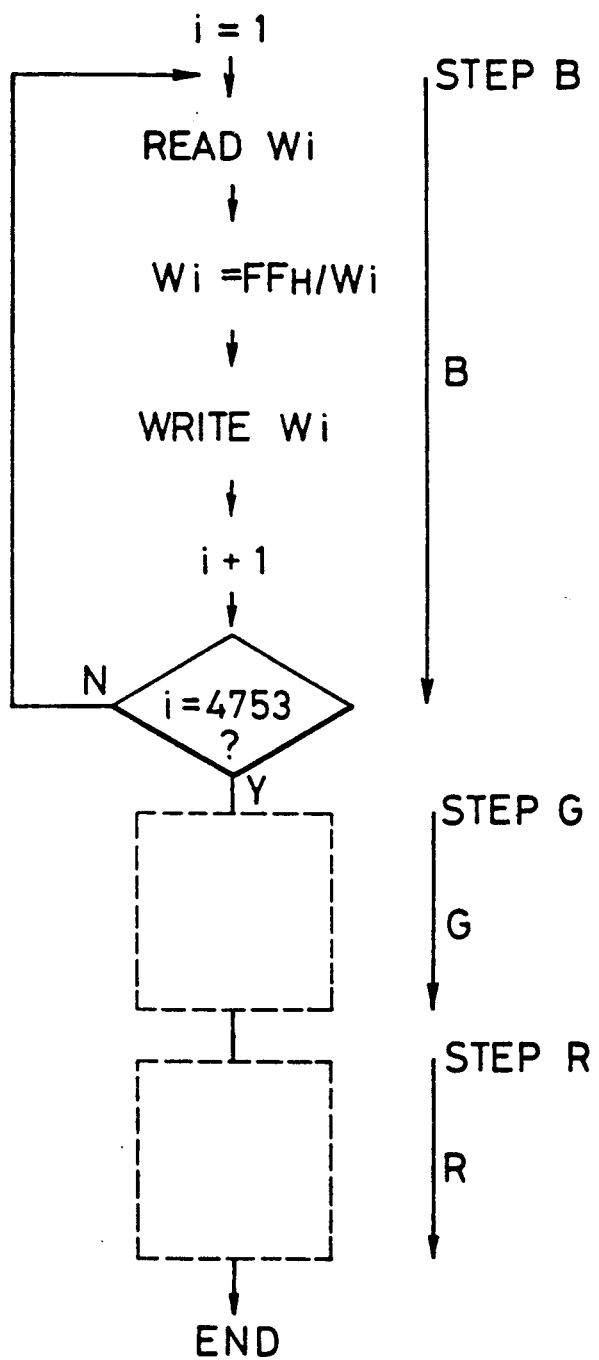

The control section 13 includes a CPU 22 constituted by a microcomputer. In order to obtain desired copies, the CPU 22 conducts, through signal lines 508 (BUS), 504, 503, 505 and so forth, various controls such as control of the video signal processing, control of the lamp driver 21 for the purpose of controlling the exposure/scanning. Control of the stepping motor driver 15, control of the digitizer 16, control of the control panel 20, and so forth, in accordance with programs stored in the ROM 23 and RAMs 24 and 25. A back-up battery power 31 of the RAM 25 ensures non-volatility of the RAM 25. The signal line 505 is an ordinary signal line used in serial data communication. The input of data is conducted by the operator through the digitizer 16 in accordance with protocols of the CPU 22 and the digitizer 16. The signal line 505 therefore is used in edition of the original, e.g., for inputting coordinates and regions for the purpose of shifting and synthesizing images, as well as instructions such as those for appointing the copying mode, magnification, and so on. The signal line 503 carries signals which are delivered from the CPU 22 to the motor driver 15 for the purpose of instructing the motor driver of various factors such as the scanning speed, distance, forward stroking, backward stroking, and so forth. In accordance with these instruction signals derived from the CPU 22, the motor driver 15 delivers predetermined pulses to the stepping motor 14 so as to cause the motor 14 to operate stepwise. Serial interfaces 29, 30 may be ordinary interfaces which may be composed of, for example, serial interface LSIs such as Model 8251 of Intel Company. Although not shown, similar circuits are provided in the digitizer 16 and the motor driver 15. A protocol between the CPU 22 and the motor driver 15 is shown in FIG. 3 by way of example.

The position sensors S1 and S2 are adapted for sensing the position of the original exposure/scanning unit 11 (see FIG. 1). The positioning of the exposure/scanning unit 11 at the home position is detected by the sensor S1. The white-level correction is conducted when the unit 11 is positioned in this home position. On the other hand, the sensor S2 senses that the exposure/scanning unit is on one end of the image. This position is used as a reference position for the original.

<Printer Interface>

Signals ITOP, BD, VCLK, VIDEO, HSYNC, and SRCOM, denoted by numerals 511 to 516, are interface signals which act between the color printer portion 2 and the reader portion 1 of the color copying apparatus as shown in FIG. 1. All the image signals VIDEO 514 read by the reader portion 1 are delivered to the color printer portion 2 on the basis of these interface signals. More specifically, ITOP represents a synchronous signal in the direction of feed of the image (sub-scan direction). The signal ITOP is produced once for each frame of image and for each color of image. Thus, when the image is to be output in four colors including yellow, magenta, cyan and black, the signal ITOP is generated four times for each frame. This signal is synchronized with the rotation of the transfer drum 716 and the rotation of the photosensitive drum 715 so that, when the toner image on the photosensitive drum 715 is transferred to the copy paper wound on the transfer drum 716, the leading end of the copy paper is correctly aligned with the image on the leading end of the original. This signal is delivered to the video processing unit in the reader 1 and is used as an interruption to the CPU 22 in the controller 13, as denoted by 511.

The CPU 22 conducts a control of image in the direction of sub-scan for the purpose of, for example, edition, on the basis of the interruption by ITOP. The signal BD denoted by 512 is a synchronizing signal in the raster scan direction (referred to as "main scan direction" hereinafter). This signal is produced once for each rotation of the polygonal mirror 712, i.e., for each raster scan. The image signals read by the reader portion 1 are delivered to the printer portion 2 in a line-by-line fashion in synchronism with the signal BD.

The signal VCLK denoted by 513 is a synchronizing clock signal for delivering an 8-bit digital video signal 514 to the color printer portion 2. For instance, video data 514 is transmitted through the flip-flops 32 and 35 in a manner as shown in FIG. 4B. The signal HSYNC denoted by 515 is a main scan synchronizing signal which is formed from the BD signal 512 in synchronization with the VCLK 513. This signal has a period which is the same as that of the BD signal. More strictly, the video signal 514 is formed in synchronism with the HSYNC signal 515. Since the BD signal 515 is produced in synchronism with the rotation of the polygonal mirror, the BD signal 515 contains a large noise attributable to jitter of the motor which drives the polygonal mirror 712. If the video signal is formed in synchronism with the BD signal, therefore, the quality of the image is deteriorated by the jitter. It is therefore highly desirable that the VIDEO signal is produced in synchronism with the HSYNC signal 515 which is formed from the BD signal in synchronism with the VCLK signal which does not have any jitter component. The signal line SRCOM is a signal line for semi-double bidirectional communication. As shown in FIG. 4C, a command CM is produced in synchronization with the 8-bit serial clock SCLK between successive synchronizing signals CBUSY (command busy) coming from the reader portion. In response to this command, the printer portion sends back a status ST in synchronism with the 8-bit serial clock between successive SBUSY (status busy). This timing chart shows that a status 3CH is sent back in response to a command 8EH. Thus, exchange of signals such as instructions from the reader portion to the printer portion. e.g., color mode selection and cassette selection, and information given from the printer portion, e.g., jamming, absence of copy paper, weight and so forth, are conducted through this communication line SRCOM.

Figure 4A:
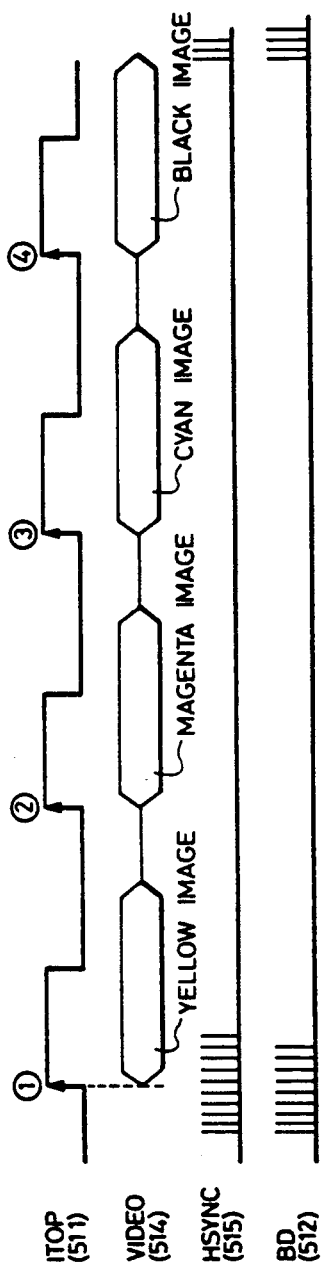
FIG. 4A is a timing chart illustrating timing of exchange of a control signal between the reader portion and a printer portion.
Figure 4B:
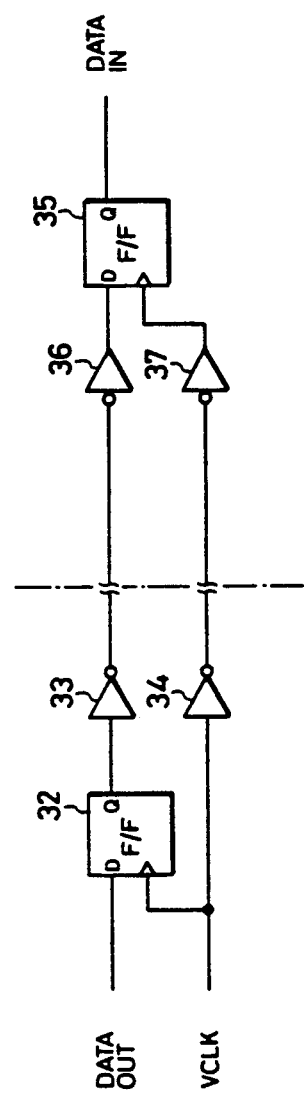
FIG. 4B is an illustration of a video signal transmission circuit between the reader portion and the printer portion.
Figure 4C:
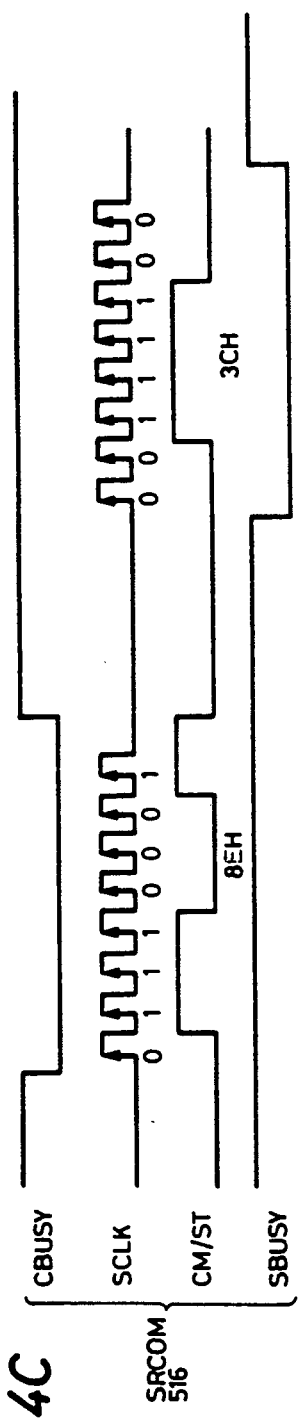
FIG. 4C is a timing chart showing timings of various signals on a signal line SRCOM.

FIG. 4A is a timing chart showing timing of transmission of signals corresponding to a single 4-color image in accordance with the ITOP and HSYNC signals. The ITOP 511 is produced once for each revolution of the transfer drum 716 or for every two revolutions of the same. Signals corresponding to the yellow image, magenta image, cyan image and black image are delivered in sections (1), (2), (3) and (4), respectively, and are delivered from the reader portion 1 to the printer portion 2, whereby a fullcolor image with four superposed color images is formed on the copy paper. Assuming here that the A3 size image has a length of 420 mm and an image density of 16 pel/mm in the direction of feed, the HSYNC signal is transmitted for 6720 times (420×16=6720). The HSYNC signals are also delivered to the clock input of a timer circuit 28 in the controller circuit 28. When a predetermined number of HSYNC signals have been counted, an interruption HINT 517 is made to the CPU 22, so as to allow the CPU to conduct an image control in the feeding direction, e.g., extraction or movement of an image.

<Video Processing Unit>

A description will be made hereinunder as to the video processing unit 12, with reference to FIGS. 5 onwards. When the original is illuminated by the exposure lamp 10 (see FIGS. 1 and 2), the light reflected from the original is read by the color reading sensor 6 in the scanning unit 11 in a color-separated manner, so that color image signals representing different colors are formed. The color image signals thus obtained are amplified to a predetermined level by an amplifier circuit 42. A reference numeral 41 designates a CCD driver for supplying pulse signals for driving the color reading sensor 6. Pulses constituting these driving pulses are generated by a system control pulse generator 57. FIGS. 6A and 6B show the construction of the color reading sensor and trains of driving pulses. Referring to FIG. 6A, the color reading sensor used in this embodiment has five chips 58 to 62 each being adapted to read one fifth (1/5) of each scanning line at a time. To this end, each chip of the sensor has 976 pixels each having a length of 62.5 $\mu$m (1/16 mm). As shown in FIG. 6A, each pixel is divided in the direction of main scan into three portions, i.e., portions corresponding to G, B and R. Thus, the color reading sensor has 2928 (976×3=2928) pixels. The chips 58 to 62 are formed on the same ceramics substrate. The first, third and fifth chips 58, 60, 62 on the sensor are arranged on the same line LA, while the second and the fourth chips 59, 61 are arranged on a line LB which is spaced from the line LA by an amount corresponding to four lines, i.e., 250 $\mu$m (62.5 $\mu$m×4=250 $\mu$m). During reading, the scanning is conducted in the direction of an arrow AL. The first, third and the fifth CCDs are synchronously driven by a driving pulse group ODRV 518, while the second and the fourth CCDs are synchronously driven by a driving pulse group EDRV.

Figure 7A:
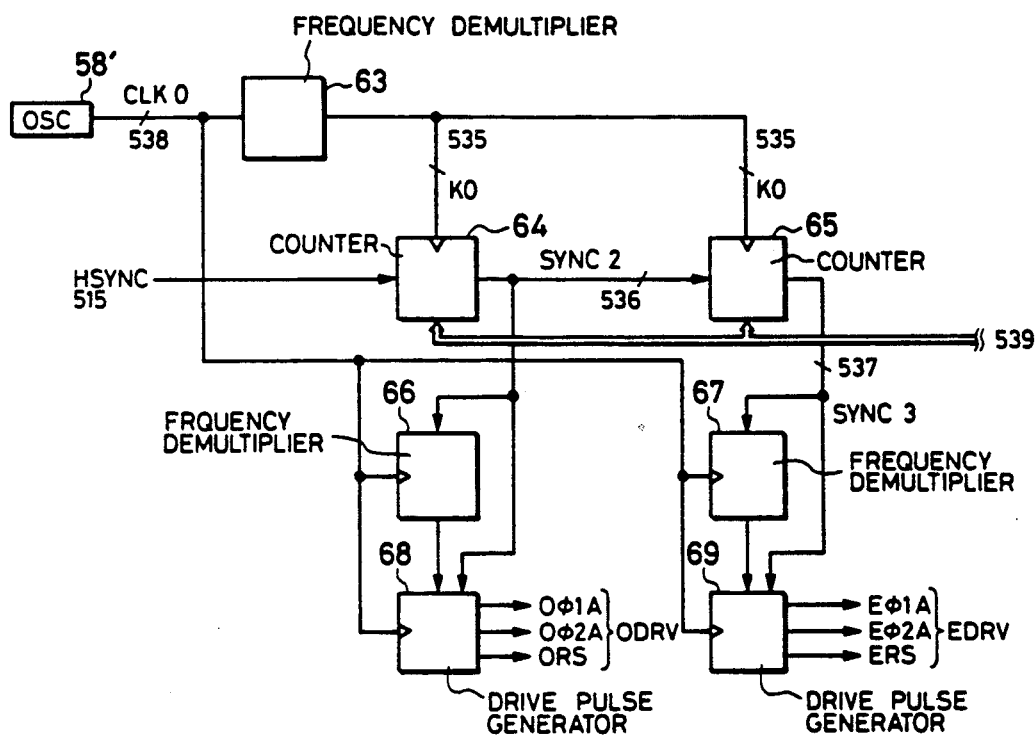
FIG. 7A is a circuit diagram of a CCD driving signal generating circuit in a system control pulse generator.
Figure 7B:
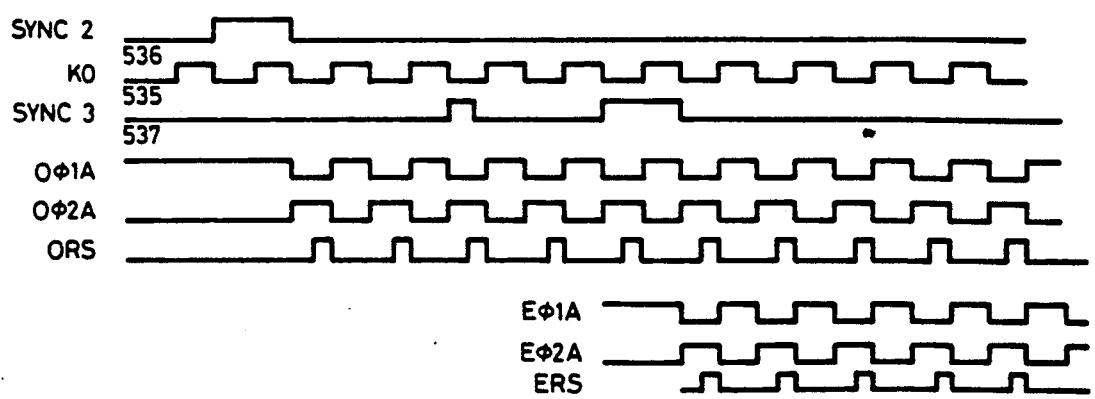
FIG. 7B is a signal timing chart showing the timings of signals available at various portions of the circuit shown in FIG. 7A.

Pulses $O^0_1$, $O^0_1$ and ORS contained by the pulse group ODRV 518 and the pulses $E^0_1$, $E^0_1$ and ERS contained by the pulse group EDRV 519 are charge transfer clocks and charge reset pulse in the respective sensor chips. In order to eliminate any mutual interference or disturbance by noises between the first, third and fifth chips and the second and fourth chips, the corresponding pulses of both pulse groups are generated in such a manner as to eliminate jitter, i.e., in complete synchronism with each other. To this end, the pulses are generated by a single reference oscillation source OSC58' (see FIG. 5). FIG. 7A shows blocks of circuits for generating the pulse groups ODRV 518 and EDRV 519, while FIG. 7B is a timing chart illustrating the operation of these circuits. These circuits are included in the system control pulse generator 57 shown in FIG. 5. Clocks KO535, which are produced by demultiplying original clocks CLKO generated by a single OSC 58' are used in generation of reference signals SYNC2 and SYNC3 which determine timings of generation of the pulse groups ODRV and EDRV. The timings of output of the reference signals SYNC2 and SYNC3 are determined in accordance with set values of presettable counters 64 and 65 which are presettable through a signal line 539 connected to the CPU BUS. The reference signals SYNC2 and SYNC3 serve to initialize demultipliers 66, 67 and the driving pulse generating portions 68, 69. Namely, since the reference signals SYNC2 and SYNC3 are formed by using the HSYNC signal 515 as the reference and in accordance with the original clocks CLOKO produced by the single OSC and demultiplied clocks which are all synchronous, the pulses of the pulse groups ODRV 518 and EDRV 519 are produced in complete synchronism without jitter, whereby disturbance of signals due to interference between the sensors can be eliminated.

The sensor driving pulses of the pulse group ODRV 518 are delivered to the first, third and the fifth sensor chips, while the driving pulses of the pulse group EDRV 519 are delivered to the second and the fourth sensors, whereby video signals V1 to V5 are independently derived from the sensor chips 58, 59, 60, 61 and 62, respectively. These video signals are then amplified by the independent channels of the amplifier circuit 42 to a predetermined level of voltage and the thus amplified signals are delivered through the coaxial cable 501 (see FIG. 1) to the video processing unit 12. More specifically, the delivery of the amplified video signals V1, V3 and V5 is conducted at the timing indicated by OOS529 in FIG. 6B, while the amplified video signals V2 and V4 are delivered at the timing indicated by EOS534 in FIG. 6B.

Figure 8A:
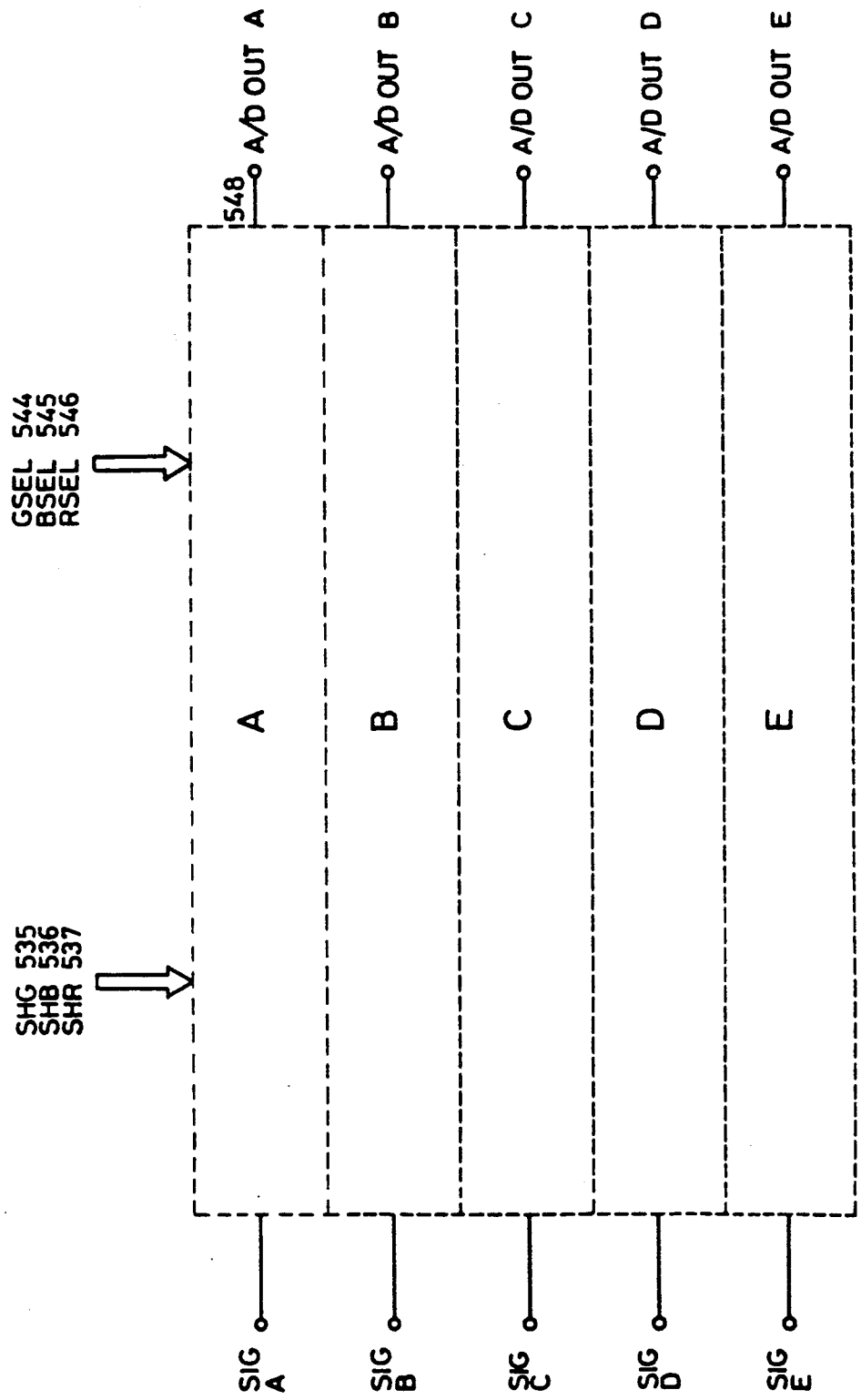
FIG. 8A is a block diagram of an analog color signal processing circuit in the video processing unit as shown in FIG. 5.
Figure 8B:
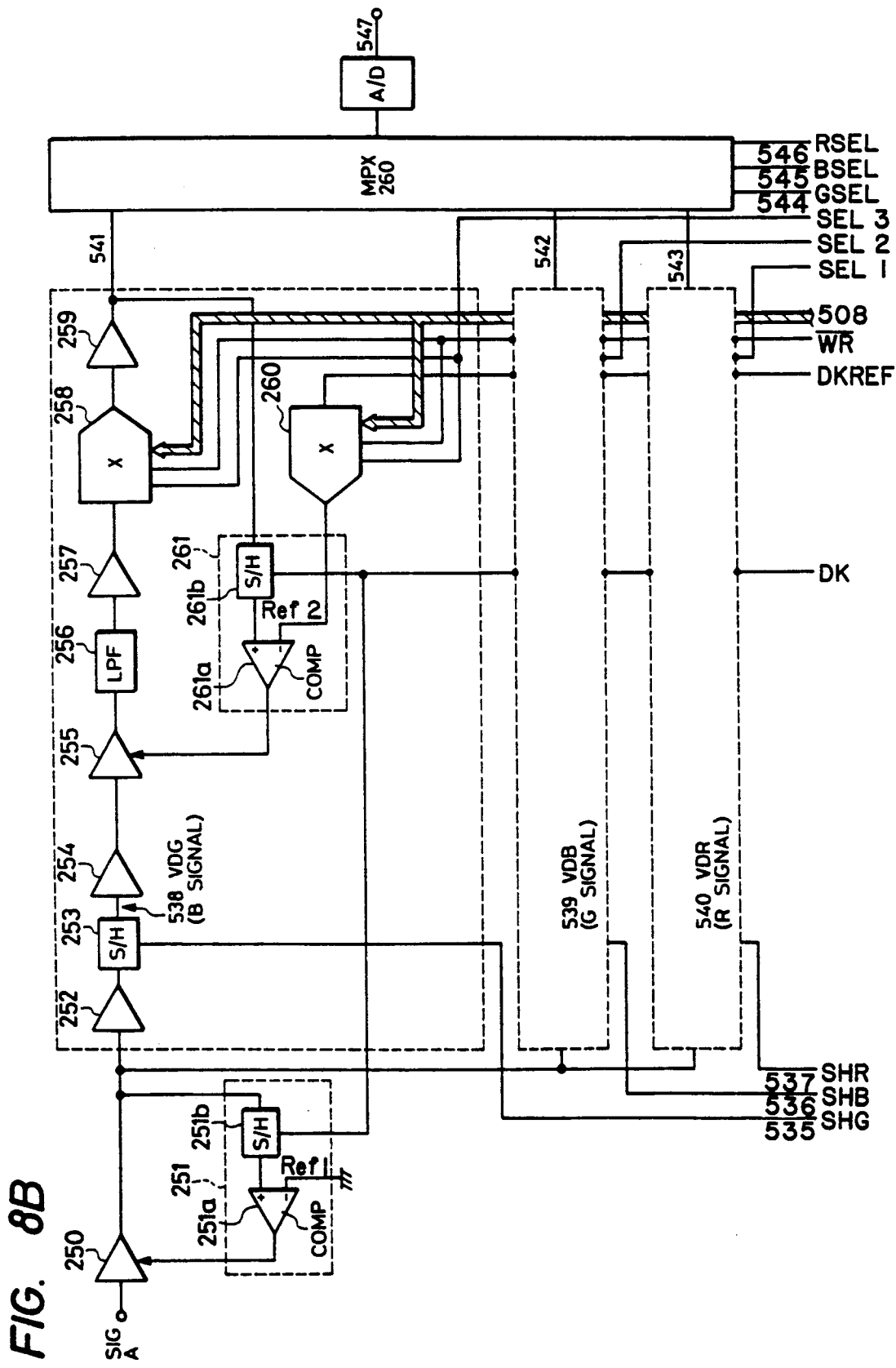
FIG. 8B is a detailed circuit diagram of one CCD channel in the block shown in FIG. 8A.

The color image signals thus received by the video processing unit 12 represent data corresponding to the respective one fifths of the original data. These signals are delivered to a sample hold circuit S/H 43 and are separated into three types of color signals, i.e., G (green), B (blue) and R (red). Thus, fifteen channels (3×5=15) are required for the processing of color image signals after the color separation. FIG. 8C shows timings of operations in a process in which the color image signal of each channel is subjected to the sample-hold processing, amplification and multiplexed and A/D converted by an A/D converter so as to become digital data A/D out. FIGS. 8A and 8B illustrate processing blocks.

The analog color image signal of each channel read by the 5-chip type real-size color sensor is delivered to one of the analog color signal processing circuits shown in FIG. 8A. The constructions of the analog color signal processing circuits A to E are the same, so that the description will be made as to the circuit A by way of example, with reference to the processing block diagram shown in FIG. 8B and the timing chart shown in FIG. 8C.

As will be seen from FIG. 8C, the analog color image signal of each channel is delivered such that the green color signal G comes first, followed by blue color signal B and then by the red color signal R. The analog color signals of each channel include, besides the effective portion constituted by 3072 pieces of effective pixels, a blank transfer portion constituted by 12 pixels prior to the effective pixels. In the period of this blank transfer period, the analog color processing circuit is not connected to the photodiodes of the color sensor. The blank transfer portion is followed by a dark output portion (optical black) constituted by 24 pixels of photodiodes covered by Al, and a dummy output portion constituted by 36 pixels immediately before the effective portion. The effective portion is succeeded by a dummy portion corresponding to 24 pixels. Thus, the analog color image signal is a composite signal constituted by 3156 pixels (see FIG. 8D).

The analog color image signal SiGA is input to an amplifier 250 and is amplified to a predetermined signal level while it is maintained in the form of the composite signal. The thus amplified signal SiGA has D.C. level which oscillates in a manner like an A.C. Then, a zero-level clamp is conducted by a feedback clamp circuit 251 so as to fix the D.C. level of the SiGA at the level optimum for the operation of the amplifier 250 through eliminating the oscillation of the D.C. level. The feedback clamp circuit 251 is constituted by the S/H circuit 251b and a comparator circuit 251a. The dark output portion (optical black) of the analog color image signal SiGA derived from the amplifier 250 is detected by the S/H circuit 251b, and is compared with a reference voltage Refl which is received by the minus input of a comparator amplifier 251a. The difference is fed back to the amplifier 250 so that the level of the dark output portion is fixed at the level of the reference voltage Refl. A signal DK is a signal which represents the duration or length of the dark output portion of the analog color image signal SiGA. This signal is delivered to the S/H circuit 251bso that the D.C. level of the dark output portion of the analog color image signal SiGA is detected once in the period (1H) of each horizontal scan.

The output signal from the amplifier 250 is color-separated into G. B and R signals by the S/H circuit 43 and the thus obtained color signals are amplified to a level matching for the dynamic range of the A/D conversion circuit. Since the same process is conducted on these color signals, the description will be made as to the B color signal by way of example. It will be seen that the same process is conducted also on other color signals, i.e., the G and R signals. The composite output signal from the amplifier 250 is supplied through the buffer circuit 252 to a S/H circuit 253 in which a sampling is conducted in accordance with the SHG signal so as to extract only the pixel outputs corresponding to B signals in the composite signal. The thus separated B signal 538 are amplified by the amplifiers 254 and 255 and are input to a low-pass filter LPF 256. The low-pass filter 256 removes the frequency components produced by the sampling pulses and involved in the output derived from the S/H circuit 253, so that only the variance of the sampled S/H output signal is extracted. Namely, representing the driving frequency of the CCD by $f_D$, each color signal is changed into discrete signal of a frequency of $f_D/3$, as a result of the sampling executed by the S/H circuit 253. This effect is obtained by a nyquist filter having a cut-off frequency $f_C$ of $f_D/6$ ($f_C=(f_D/3) \times \frac{1}{2}=f_D/6$. In consequence, only the variance of the signal is extracted and the frequency bandwidth of the signal processing system for the subsequent signal processing can be maintained low.

Figure 8E:
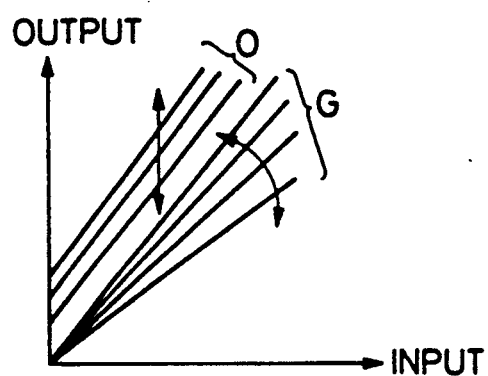
FIG. 8E is an input/output conversion characteristic diagram.

The color signal now composed solely of the signal component extracted by the low-pass filter 256 is subjected to a gain adjustment (see characteristic G in FIG. 8E) through a CPU control conducted by the amplifier 257, multiplier 258 and the buffer amplifier 259. The color signal after the gain adjustment is clamped at a desired D.C. level by means of a feedback clamp system composed of a multiplier 260 and a feedback clamp circuit 261. The operation of this system is identical to that of the feedback clamp circuit 251.

Figure 52A:
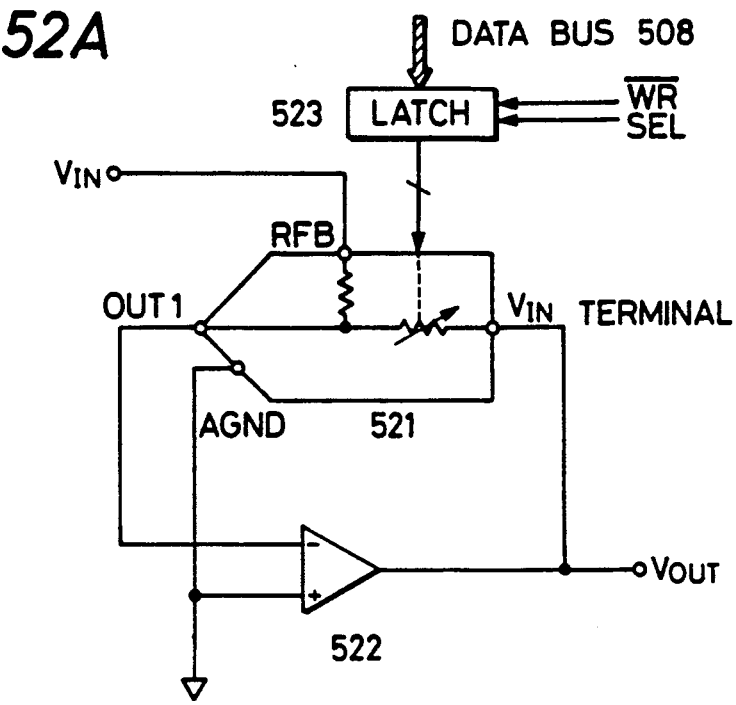
FIGS. 52A is a circuit diagram of a multiplier 258 as shown in FIG. 8B.

In the embodiment under the description, the multiplier 258 is of the type which makes use of a multiplying D/A (digital-to-analog) converter, as shown in FIG. 52A. More specifically, the multiplier 258 is composed of a multiplying D/A converter 521, an operation amplifier 522 and a latch 523. The output signal $V_{out}$ from the multiplier 258 meets the following condition.

$$V_{out}= -V_{IN}/N \quad 0<N<1$$

where, N represents a binary fractional number of the digital code.

The basic multiplying D/A converter circuit is similar to an analog potentiometer which is unloaded by the operation amplifier. In this sense, the described circuit is similar to a follower constituted by a feedback circuit and a trim circuit connected thereto. In consequence, in a channel connecting operation which will be explained later, the image data produced when the uniform white board is read by the scanning unit is amplified to the level which is determined by the digital data which is set in the internal latch 523. FIG. 52B shows a code table. The latch 523 is allocated as I/O of the CPU 22 and setting of data in the latch 523 is conducted through a control line $\overline{WR.SEL}$.

Figures 53A, 53B:
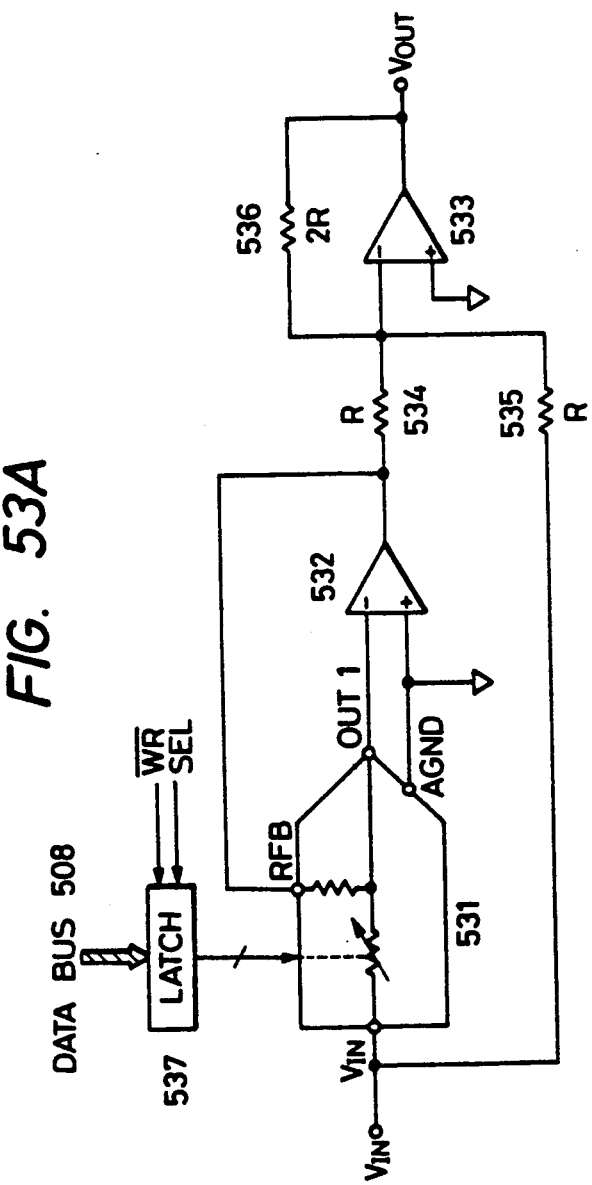
FIG. 53A is a circuit diagram of a multiplier 258 as shown in FIG. 8B.
FIG. 53B is a chart showing the codes of the multiplier.

A description will be made hereinunder as to the feedback clamp system composed of a multiplier 260 and a feedback clamp circuit 261. The feedback clamp system has a construction which is substantially the same as the feedback clamp circuit 251 of the preceding stage. More specifically, this feedback clamp system includes a S/H circuit 261b and a comparator amplifier 261a. The multiplier 260 under the control of the CPU is connected to the reference voltage Ref2 of the feedback clamp circuit. In the channel connection correcting operation which will be explained later, the reference voltage Ref2 is varied by the multiplier 260 at the level determined by the digital data which is set in the internal latch 537 through the data BUS 508 of the CPU in order to shift the level of the black level image signal read from the black portion, and each color signal processed and amplified through the amplifier 257, multiplier 258 and the buffer amplifier 259 is clamped at the level of the reference voltage Ref2. The latch 537 is allocated as the I/O of the CPU 22, and setting of data therein is conducted through a control line WR.SEL. The multiplier 260 is a 4-quadrant mode multiplier composed of a multiplying D/A converter 531, operation amplifiers 532, 533, resistors 534, 535 of a resistance value R, and a resistor 536 of the resistance value 2R, as shown in FIG. 53A. This multiplier 260 outputs voltages of both polarities as shown in FIG. 53B, in accordance with 8-bit digital data set by the CPU.

The color signals 541 (G), 542 (B) and 543 (R) amplified to predetermined white and black levels and clamped at predetermined D.C. level are again multiplexed into a series of signal by the multiplier (MPX) 260 in accordance with multiplex pulses GSEL, BSEL and RSEL (544 to 546) and the thus formed series of signal is supplied to the A/D converter circuit 45 so as to be converted in accordance with A/D clock 547, whereby a digital data ADOUT 548 is obtained as the output. In this arrangement, the A/D conversion is conducted after the multiplexing by the MPX 260, so that five A/D converters are used to deal with 15 channels of color signals, i.e., five channels for each of three colors G, B and R. The same applies also to other circuits B to E.

Figure 9A:
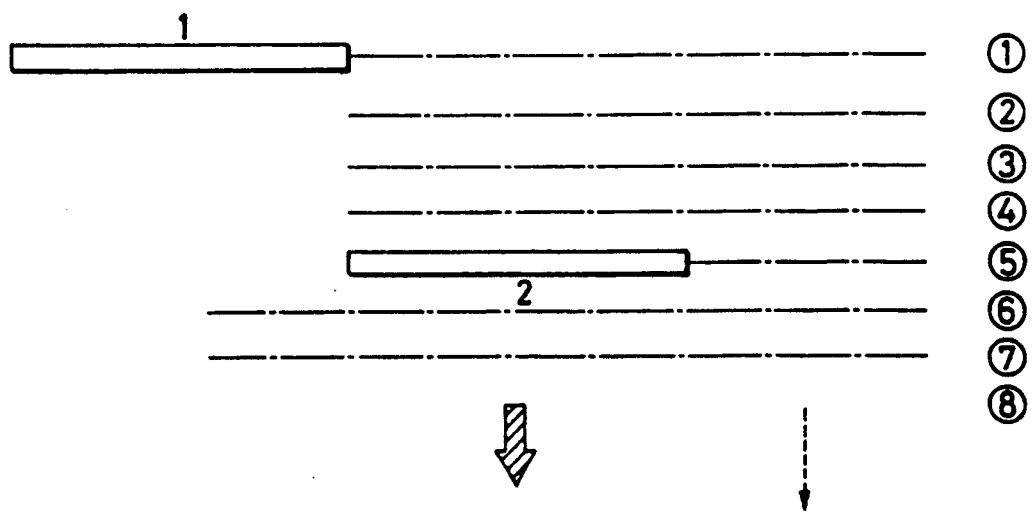
FIGS. 9A, 9B, 9C and 9D are illustrations of the manners in which line signals are derived from staggered sensors.
Figure 9B:
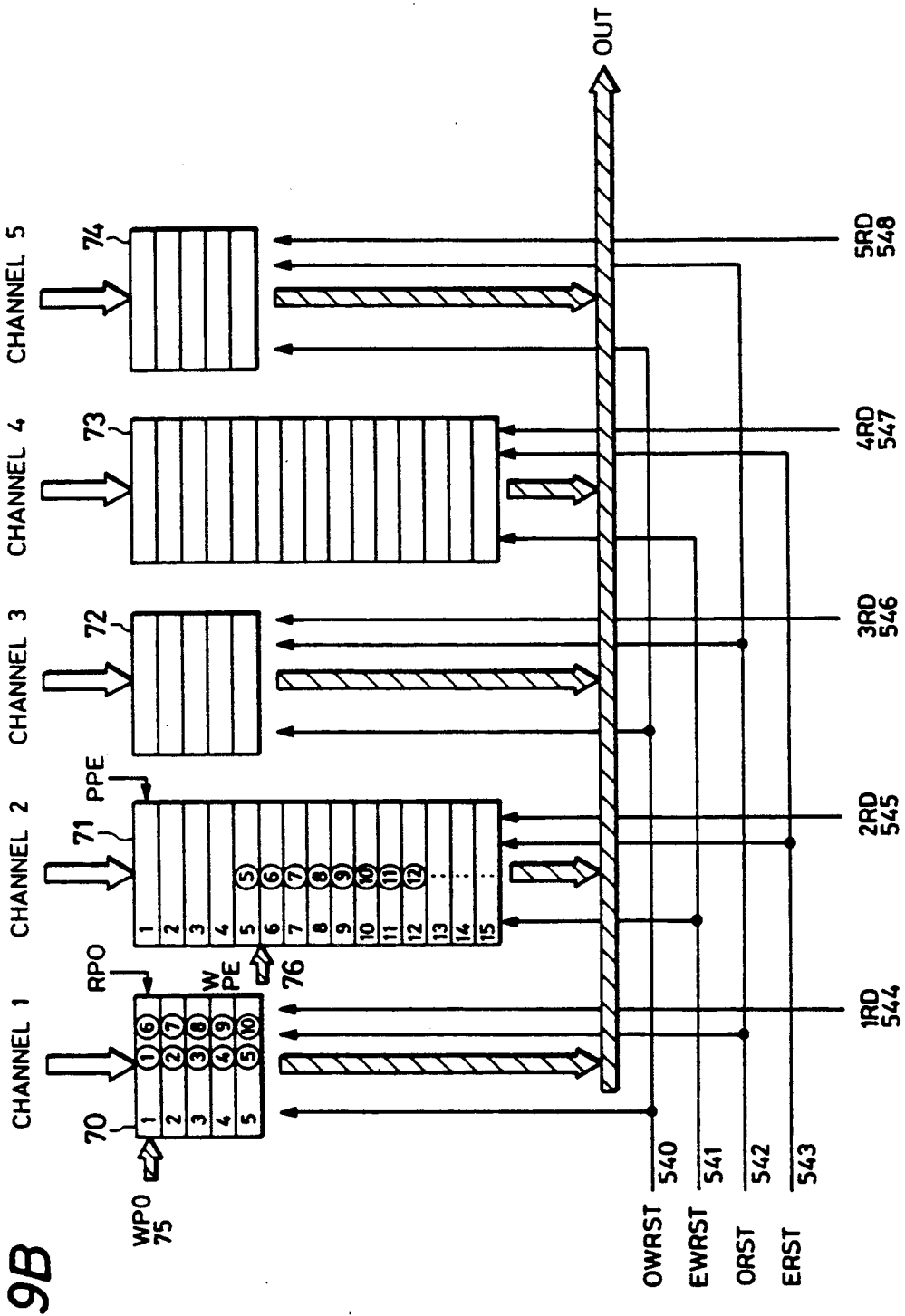

In this embodiment, the original is read by a sensor having five staggered sensor chips which are arranged in such a staggered manner that these chips cover the respective one fifths of the original in the direction of the main scan and that a coverage or spacing corresponding to four lines (62.5 μm×4=250 μm) in the direction of the sub-scan. It will be seen that there is a difference in reading position or reading timing between the channels 2,4 on the leading side and the channels 1,3,5 on the trailing side. In order to correctly connect the data derived from these channels, the described embodiment employs memories corresponding to a plurality of lines. The construction of the memories adopted in this embodiment is shown in FIG. 9B. In this Figure, numerals 70 to 74 denote memories each containing data from a plurality of lines. Thus, these memories are arranged to provide an arrangement known as FiFo arrangement. More specifically, the memories 70, 72 and 74 has storage capacities corresponding to five lines each constituted by 1024 pixels, while memories 71 and 73 have capacities corresponding to 15 lines. Writing of data in these memories is conducted in a line-by-line fashion from points indicated by writing pointers WPO 75 and WPE 76. After completion of writing of one-line data, the WPO 75 or the WPE 76 is incremented by +1. It will be seen that the WPO 75 is used commonly for the channels 1, while the WPE 76 are used commonly for the channels 2 and 4.

OWRST 540 and EWRST 541 are signals for initializing the values of the line pointers WPO 75 and WPE 76, while ORST 542 and ERST 543 are signals for resetting the values of the read pointers to the starting end. The operation will be explained with specific reference to channels 1 and 2. As will be seen from FIG. 9A, the channel 2 is ahead of the channel 1 by an amount or distance corresponding to four lines. Therefore, the channel 2 first reads the line (5) and writes the data of this line in the FiFo memory 71. Then, after moving of the sensor by a distance corresponding to 4 lines in the sub-scan direction, the channel 1 reads the line (5). Therefore, the writing pointer WPE is set ahead of the writing pointer WPO by an amount corresponding to four lines. If the contents of the fifo memories are read by the same read point value, the data derived form the same lines are read simultaneously from the channels 1,3,5 and the channels 2,4, whereby the offset or time lag in the direction of the sub-scan is eliminated. For instance, referring to FIG. 9B, the WPO for the channel 1 is positioned on the first line 1 of the memory, whereas the WPE for the channel 2 is positioned on the fifth line 5 of the memory. When the reading is commenced in this state, the pointer WPE will point 9 when the pointer WPO points 5.

Figure 9C:
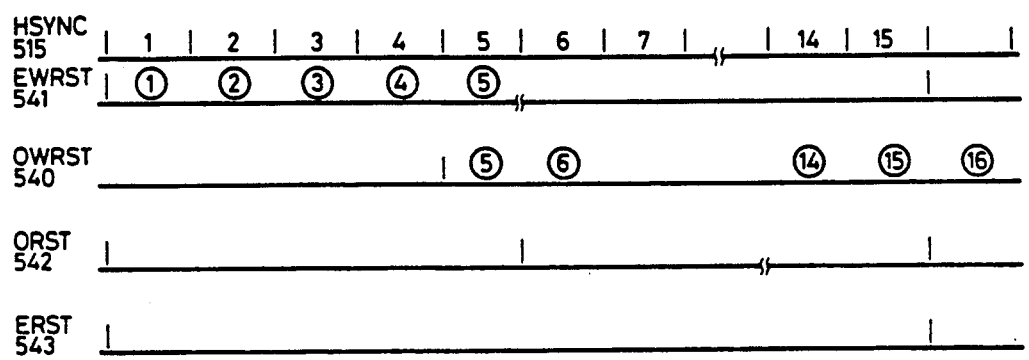

In consequence, the line (5) on the original is written in the region identified by the pointer position "5". Thereafter, the read line pointers RPO and RPE are advanced simultaneously so that data is read cyclically. FIG. 9C is a timing chart illustrating the above-described operation. The image data is fed in a line-by-line manner in synchroism with the HSYNC signal 515. As will be seen from this Figure, the signals EWRST 541 and OWRST 540 are produced with a time offset corresponding in amount to four lines. The signal ORST 542 is generated at a time interval corresponding to the capacities of the FiFo memories 70, 72 and 74, i.e., for every five lines, while the signal ERST 543 is generated for every 15 lines for the same reason. In reading, data is read first from the channel 1 at a speed which is five times as high as the writing speed, followed by one-line reading from the second, third, fourth and fifth channels, whereby a continuous signal formed of the data read from the first to fifth channels in sequence is obtained within the period of one HSYNC signal.

Figure 9D:
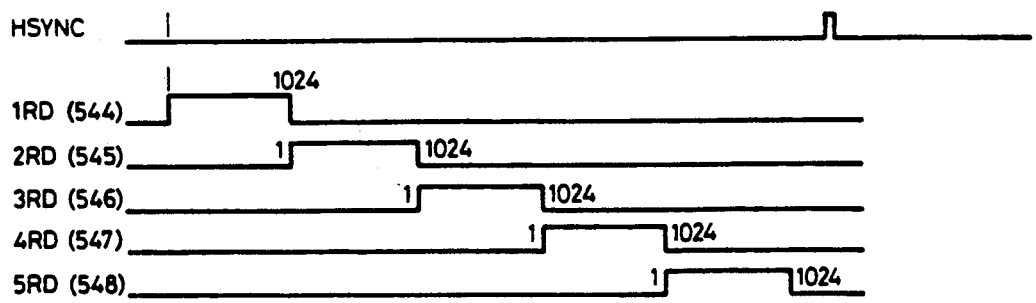

Referring now to FIG. 9D, 1RD to 5RD (544 to 548) indicates signals representing the regions in which the reading from the channels is effective. The control signal which is used for the image connection control employing the FiFo memory is generated in a memory control circuit 57' shown in FIG. 5. The circuit 57' is constituted by a discrete circuit such as TTL. This circuit, however, is not described because it does not constitute any critical portion of the invention. The memory arrangement described hereinabove is provided for each of three colors, namely, blue, green and red, although one of these arrangement corresponding to one of these colors has been described by way of example. Namely, the same memory arrangement is used for other colors.

Figure 10A:
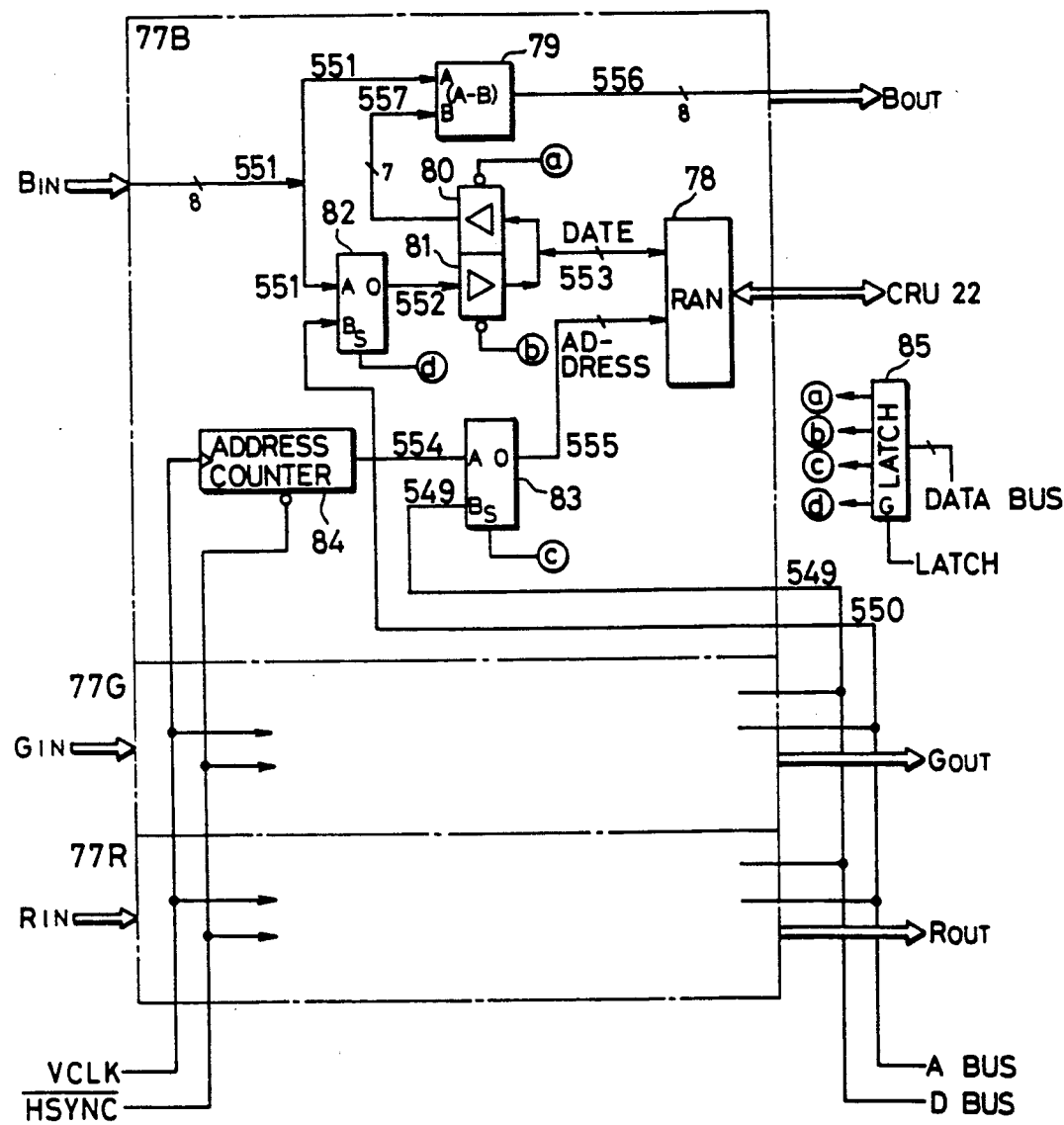
FIG. 10A is a circuit diagram of a black correction circuit.

FIG. 10A shows a black level correction circuit. As will be seen from FIG. 10B, when the quantity of light input to the sensor is small, the black level outputs from the channels 1 to 5 largely fluctuate according to the chip and according to pixels. If the output image is formed without correction of fluctuation in the black level, scores or unevenness will be caused in the image. It is therefore necessary to conduct a correction to eliminate fluctuation in the black level output. The correction can suitably be conducted by a correction circuit as shown in FIG. 10A. Before the copying operation is actually started, the original scanning unit is moved to a position where a black board of a uniform black color density is provided. This black board is typically disposed in a non-image-forming region on the leading end of the original plate. Then, the halogen lamp is started so that a black level image signal is input to this circuit. More specifically, in order to store one-line black level signal in a black level RAM 78, a selector 82 is operated to select A (d) so that a gate 80 is closed (a) while the gate 81 is opened. In consequence, the data lines 551, 552 and 553 are connected in series. At the same time, (c) is output in order that the address input of the RAM receives the output from the address counter 84 which is initialized by $\overline{\text{HSYNC}}$, whereby the black level signal corresponding to one line is stored in the RAM 87. This operation mode will be referred to as black reference pickup mode.

Figure 10C:
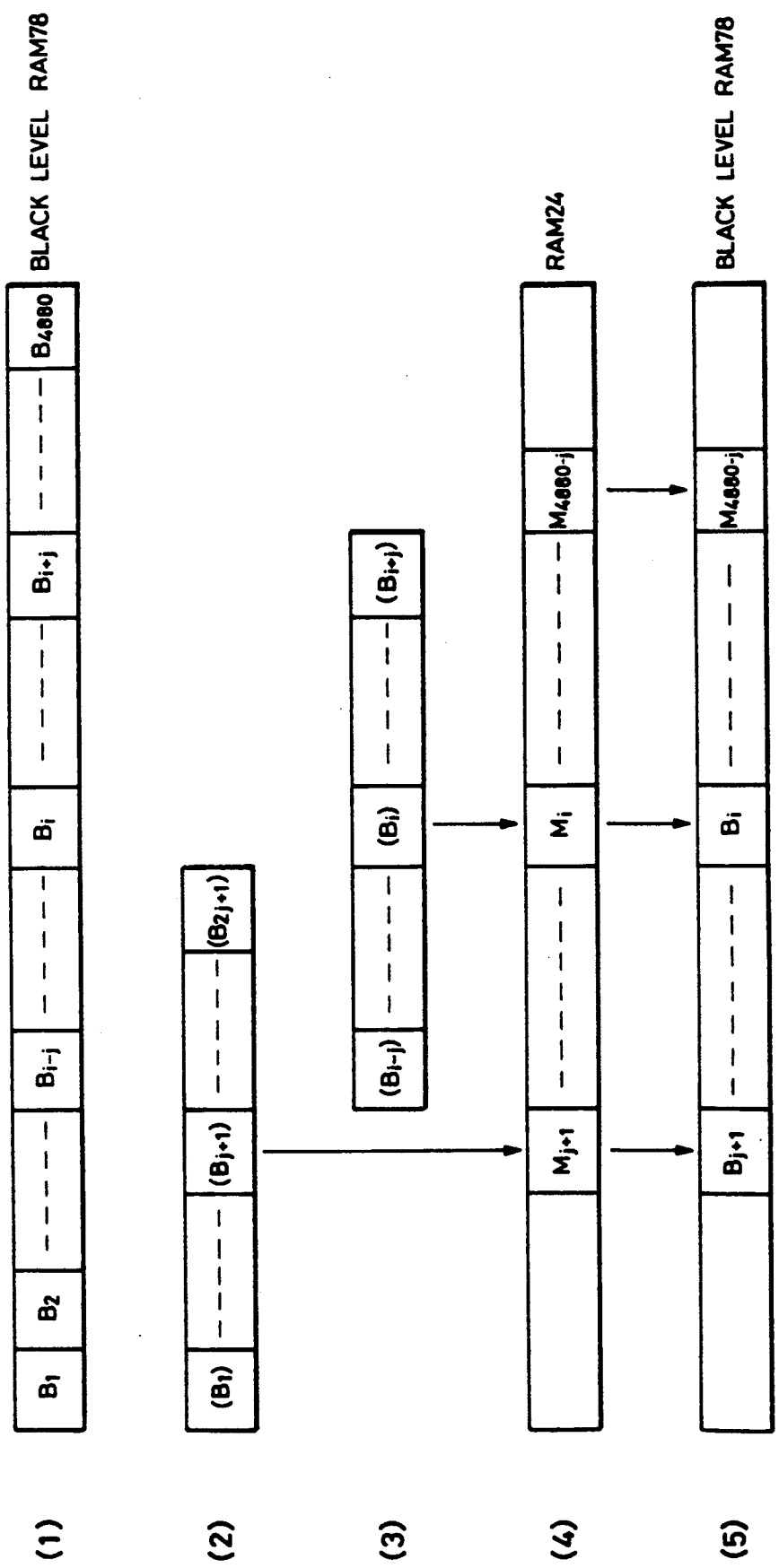
Figure 10D:
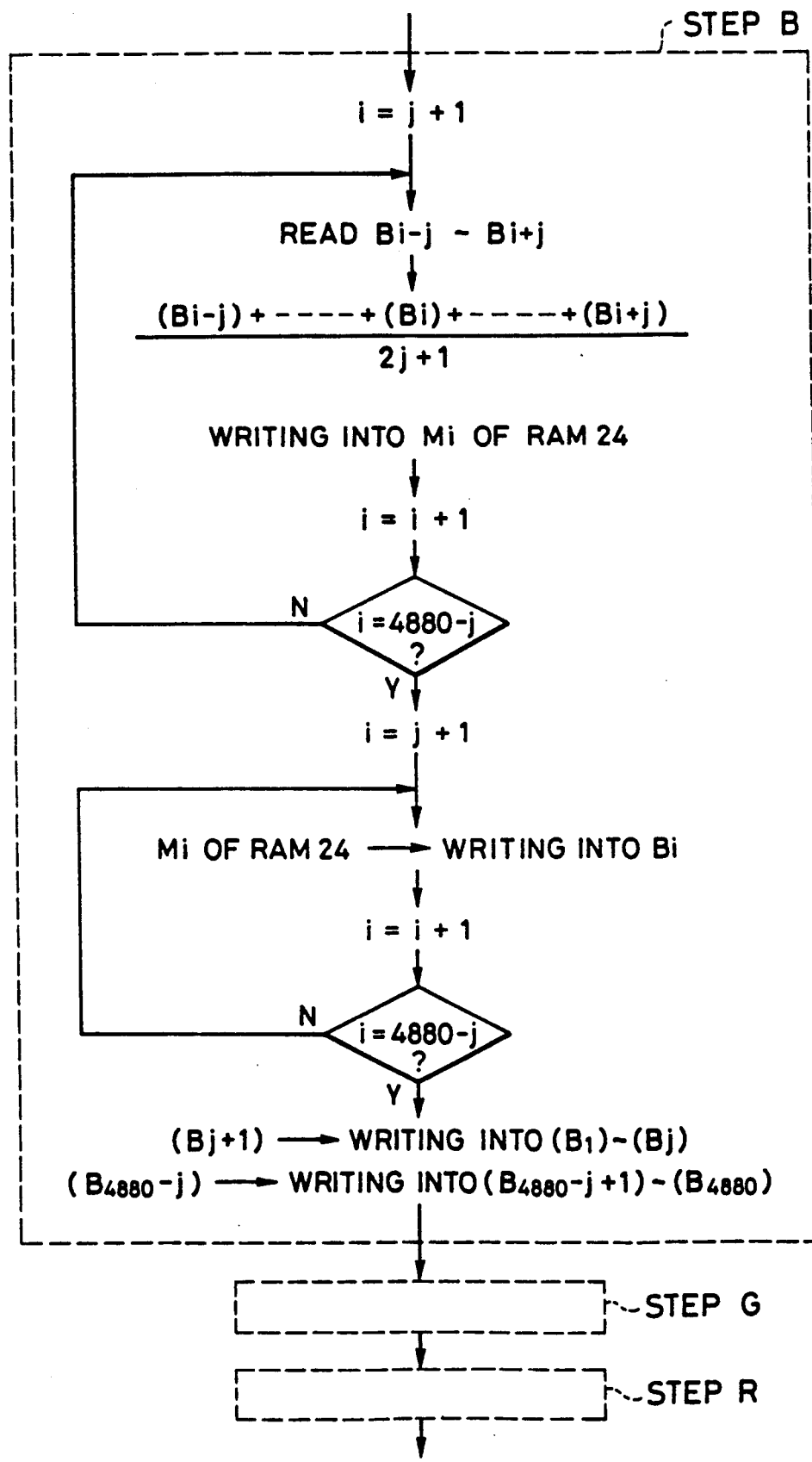

The level of the thus picked up black level data is very low so that the data is largely affected by noise generated in the analog video processing circuit and external noises which are introduced through various lines or by radiation. If such an affected data is used as the black level correction reference data, the black portion of the image will be impaired by the noises undesirably. In order to overcome this problem, an operation as shown by the flow chart in FIG. 10D is effected on the black level data picked up by the RAM 78 so as to eliminate unfavorable effect of the noises. This operation is conducted by the CPU 22 (see FIG. 2). In FIGS. 10C and 10D, a symbol Bi represents each address in the black level RAM 78, while (Bi) represents the data in the address. The suffix i represents each address. Thus, assuming that the original has a width corresponding to the length of A-4 size paper, there are 4752 pixels/color (16×297 mm=4752), provided that the pitch of the pixels is 16 pe l/mm. In order to cover the entire length, five CCD chips each being 61 mm long are arrayed to constitute one line. In consequence, the value of i can vary within the range between 1 and 4880 (16×61 mm×5=4880 pixels/color).

Referring to FIG. 10C, the black level data picked up by the black level RAM 78 in section (1) of this Figure, the CPU 22 operates to open the latch 85 and also to close the gate 80 while opening the gate 81 for (a), (b), (c) and (d) with respect to the black level data carried by the addresses $B_{ij}$ to $B_{i+j}$. The data is then accessed through selection of the selectors 82 and 83 and are read into a work register in RAM 24 within the CPU 22, as shown in section (3) of FIG. 10C. Then, the data $(B_{i-j})$ to $(B_{i+j})$ carried by the addresses $B_{ij}$ to $B_{i+j}$ are summed and the sum is divided by the number $2j+1$ of the data, and the result is written in the address $M_i$ of the working RAM 24 as the value of the central pixel $B_i$. In the manner described, computations are carried out starting with $\{(B_i)+\ldots+(B_{j+i})+\ldots+(B2j+1)\}=(M_j+)$ and ending with $\{B4880-2j)+\ldots+(B4880-j)+\ldots+(B4880)\}=(M4880-j)$. In consequence, the central pixel $B_i$ is written in the RAM 24 as the mean value of the data in the addresses $B_{i-j}$ to $B_{i+j}$, as shown by section (4) in FIG. 10C. In regards to the addresses between $i-1$ and $i=j$, the data of $i=j+1$ is written, whereas the data of $i=4880-j$ is written for addresses between $i=4880-j+1$ and $i=4880$. Namely, the pixels corresponding to addresses $i=1$ to $i=j$ and $i=4880-j+1$ to $i=4880$ are within the invalid areas on both ends of the sensors. In the described embodiment, j is set to be 48. Then, the data in the addresses from $M_{j+1}$ to $M_{4880-j}$ of the RAM 24 are rewritten in the addresses from $B_{j+1}$ to $M_{4800-j}$ of the black level RAM 78 so that the black level data free of the noise component is set. When this operation is completed with respect to the blue component of the color component image (Step B in FIG. 10D), similar computations are conducted for the G signal representing the green component (Step G) and for the R signal representing the red component (Step R). Although in this embodiment the computation is conducted without weighting the central pixel and pixels in the vicinity of the central pixel, it is possible to conduct the computation by multiplying the data carried by these pixels with suitable weighting factors.

During reading of the image, the operation mode of the RAM 78 is changed to data reading mode so that the read data are input to the B input of a subtractor 79 through a data line 553 and then through a data line 557 for each pixel of each line. Namely, in this state, the gate 81 is closed (b) while the gate 80 is opened (a). Therefore, the black correction circuit output 556 is obtained with respect to the black level data DK(i) as $B_{out}(i) = B_{in}(i) - DK(i)$, thus completing black correction mode for blue color. Green color data $G_{in}$ and the red color data $R_{in}$ are controlled in the same manner by means of 77G and 77R. The control lines (a), (b), (c) and (d) of the selector gates are controlled by the CPU, more specifically by the latch 85 allocated as I/O of the CPU 22 (FIG. 2).

A description will be made hereinunder as to the white level correction (shading correction) with reference to FIG. 11-1. This correction is conducted in accordance with white color data obtained by moving the original scanning unit to a position of a white board of a uniform white color and illuminating the same by the scanning unit, for the purpose of correcting any fluctuations in the illuminating system, optical system and sensor sensitivity. A basic circuit arrangement is shown in FIG. 11-1A. This arrangement is materially the same as the circuit arrangement for black level correction as shown in FIG. 10A, except that the subtractor 79 used in the black level correction is substituted by a multiplier 79'. Description of the portions common to those in the black level correction circuit is therefore omitted.

The white level correction operation will be described. When the original scanning unit is on the home position where it faces the white plate of uniform white color, i.e., when the copying apparatus is in the state before the copying or reading operation, the exposure lamp is lit on to illuminate the white board so that a one-line image data of uniform white level is stored in a correction RAM 78'. Assuming here that the original has a width corresponding to the length of an A-4 size paper in the direction of the main scan, 4752 pixels (16×297 mm=4752) are required to cover the image area of the original provided that the pixels are arranged at a pitch of 16 pe 1/mm. Provided that the image data on each single CCD chip is composed of 976 pixels, there are 4880 pixels (976×5=4880) on the sensor. Thus, the RAM 78' has a capacity which is at least 4880 bytes. The white board data corresponding to i-th pixel is represented by Wi (i=1 to 4880) so that white board data carried by the respective pixels are stored in the RAM 78' in a manner shown in FIG. 11-1C. Representing the ordinary image data read by the i-th pixel corresponding to the white board data $W_i$ by $D_i$, the data $D_0$ after the white level correction should meet the condition of $D_0 = D_i \times FF_H / W_i$. To this end, the CPU in the controller operates to close the gate 80' while opening the gate 81' with respect to the latches 85' (a'), 85' (b'), 85' (c') and 85' (d'). The CPU also operates to enable the selectors 82' and 83' to select B, thereby enabling the CPU 22 to make access to the RAM 78'. Then, a computation of $FFH/W_1$ is conducted for the first pixel $W_1$. Similarly computations $FFH/W_i$ are conducted for the successive pixels, whereby substitution of data is conducted for each of the successive pixels. When this operation is completed for the blue component of the color image (Step B of FIG. 11-1D), similar operations are conducted for the green component (Step G) and the red component (Step R). Then, a control is executed to open the gate 80' (a'), while closing the gate 81' (b') and the selector 83' selects A, whereby the corrected data $D_0 = D_i \times FFH/Wi$ are output for each of the original data Di which are input successively. The coefficient data $FFH/W_i$ read from the RAM 78' is delivered through the signal line 553 and then through the signal line 557, and are multiplied with the image data 551, whereby the corrected data as the product is output.

When the channels 58 to 62 of the color CCD sensor 6 have read an original of the same density, these channels should output digital signals of the same level. This is ensured by a channel connection correcting operation which will be explained hereinunder with reference to flow charts of FIGS. 11-2A and 11-2B. This operation is commenced first with channel connecting black level processing. This operation is conducted first with respect to, for example, B signal (Step D-B). In Step D-B1 for the black level processing of the B signal of the first channel CH1, in order to use the offset of the B signal as a reference level, the CPU 22 sets D1 (80H in this embodiment) in the latch 537 of the multiplier circuit 260 through the data BUS 508, thereby setting the data of the multiplying D/A converter 531 (Step 1). In this state, as in the case of the black level correction explained before, the black level signal obtained from the black level is stored in the black level RAM 87 (Step 2). FIG. 11-2C shows the black level data stored in the RAM 78. Then, the value i of the counter i is initialized to "1" and the $FF_H$ is set (Step 3) in the temporary memory address $M_1$ which is the address which is provided in the CPU working RAM 24 and adapted for storing the minimum value. Then, the data ($B_i$) in the black level RAM 78 and the data $M_1$ in the address $M_1$ are compared with each other. If the data ($B_i$) is smaller than the data ($M_i$), the data ($M_i$) in the address $M_1$ is substituted by the data ($B_i$). This operation is conducted for each of the successive addresses $B_i$, from $B_i=B_1$ to $B_i=B_{976}$ (Steps 4,5,6). Consequently, the smallest value of the data from the channel CH1 is stored in the address $M_1$. Then, the minimum value data in the address $M_1$ is judged (Step 7) as to whether it is equal to the reference value $D_2$ of the black level which is, in this embodiment, $08_H$. If the answer is NO, a judgment is conducted (Step 8) as to which one of these values is greater. If the minimum value data in the address $M_1$ is smaller than the reference value $D_2$, the CPU 22 operates to set ($D_1+\alpha$) in the latch 537 within the multiplier circuit 260 so as to raise the offset level (Step 9). The process is then returned to Step 3 and proceeds to Step 7 in which the judgment is conducted again as to whether the condition of ($M_1$)=$D_2$ is met. If the data $M_1$ is greater than the reference value $D_2$, the CPU 22 operates to set ($D_1-\alpha$) in the latch 537 of the multiplier circuit 260 so as to lower the offset level (Step 10). The process is then returned to Step 3 and proceeds to Step 7 in which the judgment is conducted again as to whether the condition of ($M_1$)=$D_2$ is met. Thus, the CPU repeatedly executes the operation by varying the value of the data $D_1 \pm \alpha$) delivered to the multiplying D/A converter 531, until the condition of ($M_1$)=$D_2$ is met. When this condition is met, the process proceeds to Step D-2B from Step 7 so that the content of the counter is initialized to 977, so that the process explained in connection with Step D-B1 for the first channel CH1 is executed for the second channel CH2 in the black level RAM 78, whereby the minimum value is selected as the reference value $D_2$. Similarly, Steps D-B3, D-B4 and D-B5 are executed to set the minimum values of the respective channels CH3, CH4 and CH5 as the reference values $D_2$. This operation is conducted for the channels CH2, CH3, CH4 and CH5 of G and R signals in Step D-G and Step D-R, respectively, so that the data of the minimum value are set as the reference values $D_2$.

Subsequently, white-level processing is conducted on the B signal for the purpose of channel connecting white-level processing. This is executed in Step W-B. More specifically, the white level processing of the B signal of the first channel CH1 is conducted in Step W-B1. In this step, the CPU 22 sets $D_3$ (AOH in the described embodiment) in the latch 523 of the multiplier circuit 258 so as to set the gain of the B signal of the channel CH1 at the reference level, thus setting data of the multiplying D/A converter 521 (Step 11). In this state, the white level signal derived from the white board is set in the white level RAM 78' as in the case of the white level correction explained before (Step 12). White level data set in the RAM 78' is shown in FIG. 11-2C. Subsequently, the value i in the counter is initialized into "1" and $OO_H$ is set in the temporary memory address $M_2$ which is provided in the CPU working RAM 24 and adapted for storing the maximum value (Step 13).

Subsequently, the data ($W_i$) in the white level RAM 78' and the data ($M_2$) in the address $M_2$ are compared with each other. If the value of the data ($W_i$) is greater than ($M_2$), the data ($M_2$) is substituted by ($W_i$). This operation is conducted for each value of i, i.e., from $W_1$ to $W_{976}$ (Steps 14, 15, 16). In consequence, data of the maximum value in the channel CH1 is stored in the address $M_2$. Then, a judgment is conducted (Step 17) as to whether the maximum data stored in the address $M_2$ is equal to the reference value $D_4$ ($AO_H$ in this embodiment) of the white level. If the answer is NO, a judgment is conducted (Step 18) as to which one of these data is greater. If the data ($M_2$) is greater than $D_4$, the CPU 22 sets a value ($D_4-\beta$) in the latch 523 of the multiplier circuit 258 so as to lower the gain level (Step 19) and the process returns to Step 13. The process then proceeds again to Step 17 in which the judgment is conducted again as to whether the condition of ($M_2$)=$D_4$ is met. If the condition of ($M_2$)<$D_4$, the CPU 22 operates to set a value ($D_3+\beta$) in the latch 523 of the multiplier circuit 258 so as to raise the gain level (Step 20). The process then returns to Step 13 and proceeds to Step 17 in which the judgment is executed again as to whether the condition ($M_2$)=$D_4$ is met. Thus, the CPU repeatedly conducts the operation while varying the data ($D_4 \pm \beta$) supplied to the multiplying D/A converter 521. When the condition of ($M_2$)=$D_4$ is met, the process proceeds from Step 17 to Step W-2B in which the counter content is initialized to 977, whereby the operation same as that conducted on the channel CH1 in Step W-B1 is executed on the second channel CH2 in the white level RAM 78' so as to set the minimum value as the reference value $D_4$. Subsequently, Steps W-B3, W-B4 and W-B5 are executed to set the data of the maximum values as the reference values $D_4$. The described process is executed for the channels CH2, CH3, CH4 and CH5 of the G and R signals in Steps W-G and W-R, whereby the data of the maximum values are set as the reference values $D_4$.

The channel connecting processing is executed in accordance with the flow chart shown in FIG. 11-3. After the power is turned on in the reader portion 1, if the original scanning unit 22 is not on the home position sensor S1 in Step Sm-1, the CPU 22 operates to deliver a reset instruction to the stepping motor driver 15 (see FIG. 2) through the signal line 503 thereby to operate the stepping motor 14 so as to reset the original scanning unit 11 to the home position. Subsequently, in Step S-m2, the CPU 22 delivers a lighting instruction through a signal line 504 to the lamp driver 21 thereby to turn the halogen lamp 10 on. After the lighting of the halogen lamp 10, the CPU operate in Step S-m3 so as to set in the driver 15 the number of pulses corresponding to the travel of the original scanning unit 11 from the home position (S1) to the position where it faces the reference black board 9, thereby to cause the scanning unit 11 to travel to the position of the reference black board. The channel connecting black level processing explained before in connection with FIG. 11-2A is conducted in this state (S-m4). Subsequently, the CPU 22 sets, in the driver 15, the number of pulses corresponding to the travel of the scanning unit 11 between the reference black board 9 and the reference white board 8 so as to enable the original scanning unit 11 to move from the position where the black board 9 is located to the position where the white board is located. The aforementioned channel connecting white level processing is executed (Step S-m6) while the original scanning unit 17 is stationed at the position of the reference white board. Then, in Step S-m7, the halogen lamp is turned off and the original scanning unit 11 is reset to the home position in Step S-m8, thus completing the channel connecting process.

In the described embodiment, it is thus possible to increase the processing speed and to effect correction on data carried by each pixel.

Figure 12:
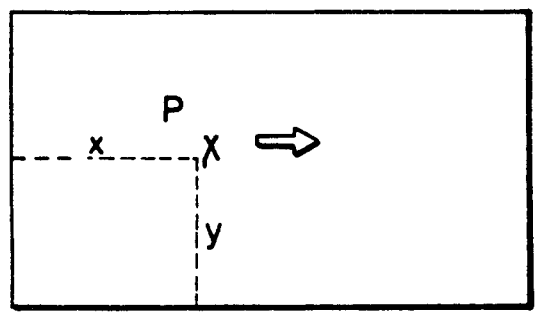
FIG. 12 is an illustration of a line-data pickup mode.

According to the invention, image data can be input at a high speed in a line-by-line fashion, and the CPU is allowed to make a high-speed access for reading and writing operations. This offers the following advantages. When the operator wishes to detect the components of the image data at a point P having coordinates (Xmm, Ymm) on the original as shown in FIG. 12, the scanning unit is driven in the X-direction through a distance corresponding to $(16 \times x)$ lines and the data of the thus reached line is picked up in the RAM 78' in the same manner as that explained before, and then the data carried by the $(16 \times y)$-th pixels is read, whereby the ratios of B, G and R components are detected on this point. This operation mode will be referred to as "line data pickup mode". It will also be clear to those skilled in the art that the described embodiment enables an easy computation of mean density over a plurality of lines (referred to as "mean computing mode" hereinafter) and also of density histogram (referred to as "histogram mode" hereinafter).

Thus, the described embodiment conducts correction of offsets of the black and white levels which are attributable to various reasons such as variation in the black level density of the image input system, fluctuation in the dark current level, variation in the sensitivities of sensor chips, fluctuation in the light quantity of the optical system, variation in the white level sensitivity and so forth. In consequence, the characteristics are uniformalized in the direction of the main scan so that color image data proportional to the input light quantity can be obtained over the entire length of the main scan. The thus obtained color image data is input to a logarithmic conversion circuit 86 (see FIG. 5) so as to be converted in conformity with the visual sensitivity of human eyes. More specifically, the conversion is conducted such as to obtain conditions of white=$00_H$ and black=$FF_H$.

Figure 13A:
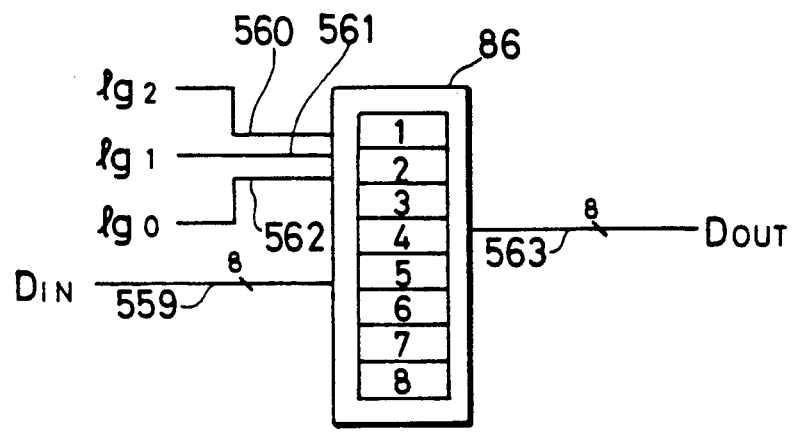
FIG. 13A is a circuit diagram of a logarithmic conversion circuit.
Figure 13B:
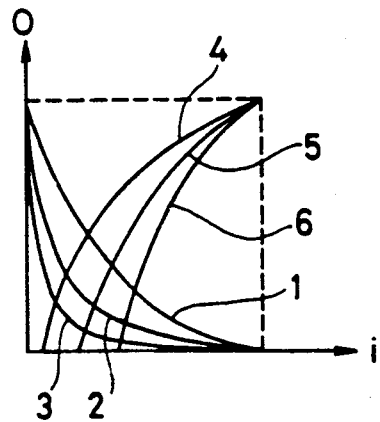
FIG. 13B is a chart illustrating the logarithmic conversion characteristic.

Various types of image sources can be input to the reading sensor, such as ordinary reflective originals, and transparent originals such as films used in a film projector including both negative and positive films and films of various sensitivity and exposure degrees. These different types of image source provide different input gamma characteristics. It is therefore advisable to prepare a plurality of logarithmic conversion LUTs (Look-up Tables) and to selectively use these Tables as shown in FIGS. 13A and 13B. The switching between these Tables is conducted by selecting signal lines lg0, lg1 and lg2 (560 to 562), in accordance with instructions given through, for example, the control panel as an I/O port of the CPU 22. The data output for the respective colors B, G and R correspond to the density value of the output image. Thus, the output of B (blue) corresponds to the amount of yellow toner, the output of G (green) corresponds to the amount of magenta toner and output of R (red) corresponds to the amount of cyan toner. The color image data are therefore expressed in terms of Y, M and C hereinunder.

The following color compensation operations are conducted on each color component of the color image data obtained through the logarithmic conversion, i.e., on the yellow component, magenta component and cyan component. As well known to those skilled in the art, the spectral characteristic of color reading sensor arranged on each pixel of the color reading sensor has an unnecessary transmission region shown by hatched area. It is also well known that the color toners Y, M and C to be transferred to the copy paper has unnecessary absorption component as shown in FIG. 15.

A technique called "masking compensation" is also well known. In this technique, the following primary equation of each color is calculated to effect color compensation for each of the color component data $Y_i$, $M_i$ and $C_i$.

$$\begin{pmatrix} Y_0 \\ M_0 \\ C_0 \end{pmatrix} = \begin{pmatrix} ay_1 - bM_1 - cC_1 \\ -ay_2 & bM_2 - cC_2 \\ -ay_3 - bM_3 & cC_3 \end{pmatrix} \begin{pmatrix} Y_i \\ M_i \\ C_i \end{pmatrix}$$

Figure 16A:
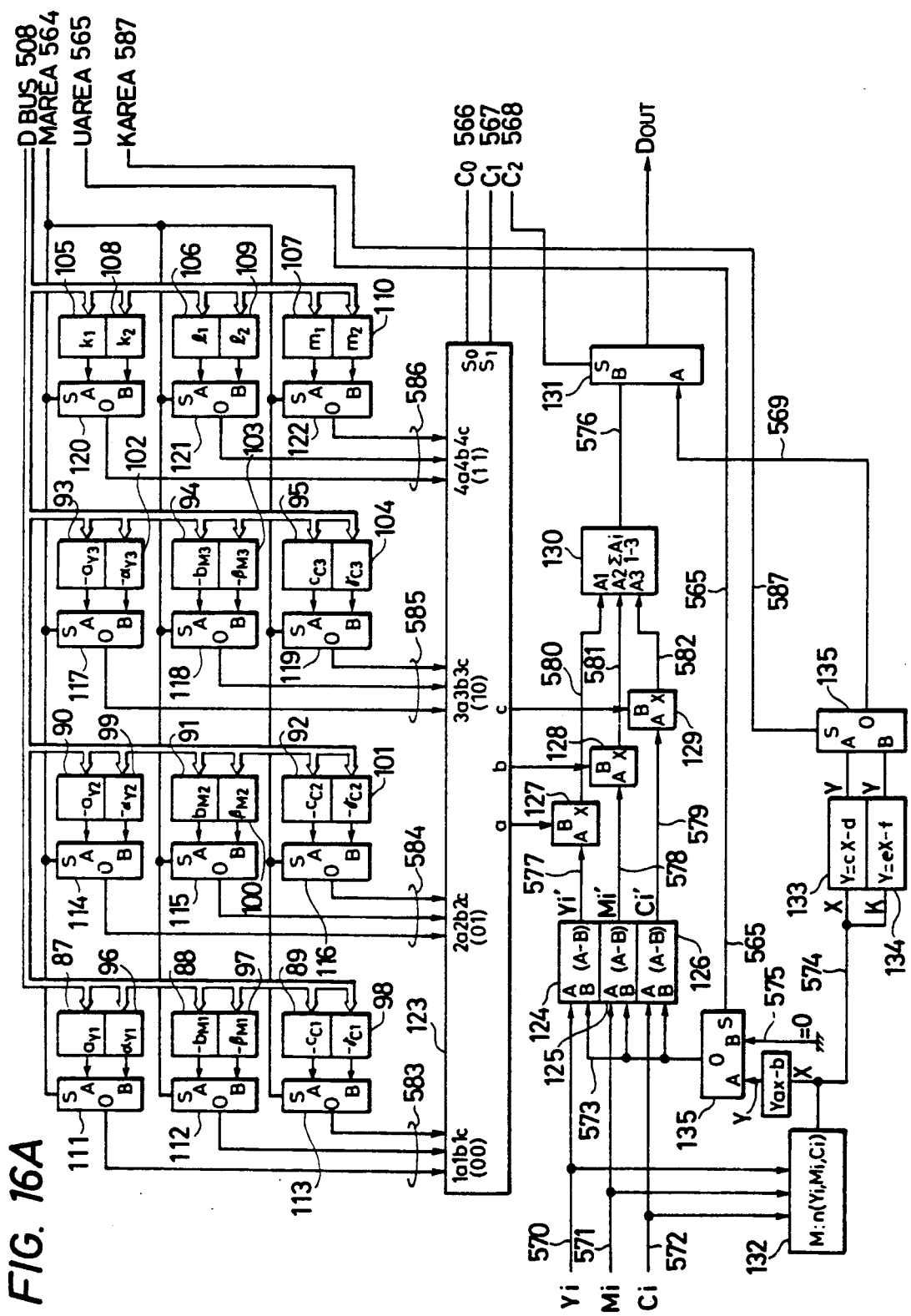
FIG. 16A is a circuit diagram showing a masking circuit, an inking circuit, and a UCR circuit.

An operation is also known in which the minimum value Min($Y_i$, $M_i$, $C_i$) of the $Y_i$, $M_i$ and $C_i$ is computed and determined as ink (black) and black toner is added (inking) to the portion of the minimum value. Also known is an operation called "undercolor removal (UCR)" in which the amount of coloring material to be added is decreased by the same amount as the addition of the black component. FIG. 16A shows a circuit arrangement for the masking, inking and UCR operations.

The described embodiment has the following critical features.

(1) There are two masking matrix systems which can be switched at a high speed by 1/0 of a single signal line.

(2) A high speed switching is possible between a mode in which UCR is conducted and a mode in which UCR is not conducted, by 1/0 of a single signal line.

(3) There are two circuit systems for determining the amount of inking switchable by 1/0 of a single signal line.

In advance of the reading of an image, desired first matrix coefficient $M_1$ and second matrix coefficient $M_2$ are set through a BUS connected to the CPU 22.

In this embodiment, the coefficients M1 and M2 are determined as follows.

$$M_1 = \begin{pmatrix} aY1 & -bM1 & -cC1 \\ -aY2 & bM2 & -cC2 \\ -aY3 & -bM3 & cC3 \end{pmatrix},$$

$$M_2 = \begin{pmatrix} \alpha Y1 & -\beta M1 & -\gamma C1 \\ -\alpha Y2 & \beta M2 & -\gamma C2 \\ -\alpha Y3 & -\beta M3 & \gamma C3 \end{pmatrix}$$

The coefficient M1 is set in the registers 87 to 95, while the coefficient $M_2$ is set in registers 96 to 104. Numerals 111 to 122, 135 and 131 denote selectors which are adapted to select "A" when the S terminals carry "1" and B when the same carry "0". Therefore, when it is desired to select the matrix $M_1$, the switching signal MAREA 564 is set at "1", whereas, when the matrix $M_2$ is to be selected, the same switching signal is set at "0". A reference numeral 123 denotes a selector which provides outputs (a), (b) (c) (c) in response to selection signals $C_0$ and $C_1$ (566, 567) in accordance with a truth table shown in FIG. 16(b). The selection signals $C_0$, $C_1$ and $C_2$ are set as $(C_2, C_1, C_0) = (0, 0, 0)$, $(0, 0, 1)$, $(0, 1, 0)$ and $(1, 0, 0)$ for Y, M, C and Bk, respectively, and also as $(0, 1, 1)$ for monochrome signal. By using these selection signals, it is possible to obtain desired color-compensated color signals. It is assumed here that the selection signals $(C_0, C_1, C_2)$ are set as $(0, 0, 0)$ while switching signal MAREA is set as MAREA="1". In this case, the contents of the registers 87, 88 and 89, i.e., $(ay_1, -bM_1, -cC_1)$ are obtained as the outputs (a, b, c) of the selector 123. On the other hand, the black component signal 574, which is computed from the input signals $Y_i$, $M_i$, $C_i$ as $Min(Y_i, M_i, C_i) = x$ is subjected to a primary conversion conducted by 134 in accordance with a formula of $Y = ax - b$ (a and b are constants), and is delivered to the B inputs of subtracters 124, 125 and 126. The subtracters 124, 125 and 126 compute $Y'_i = Y_i - (ax - b)$, $M'_i = M_i - (ax - b)$ and $C'_i = C_i - (ax - b)$, thus conducting undercolor removal. The outputs are delivered through signal lines 577, 578 and 579 to multipliers 127, 128 and 129 which are adapted to perform masking computation. The selector 135 is controlled by UAREA 566 which is set at "1" or "0" so as to enable a high-speed switching between the mode in which UCR (undercolor removal) is conducted and a mode in which the UCR is not conducted.

The B inputs of the multipliers 127, 128 and 129 receive $(ay_1, -bM_1, -cC_1)$, while the A inputs of the same receive $[Y_i-(ax-b), M_i-(ax-b), C_i-(ax-b)] = [Y'_i, M'_i, C'_i]$. Therefore, as will be understood from the figure, an output data $Y_{out} = Y'_i \times (ay_1) + M'_i \times (-bM_1) + C'_i \times (cC_1)$ is obtained at the output $D_{out}$, on condition of $C_2 = 0$ (Y or M or C selection), whereby an yellow image data which has undergone the masking color compensation and undercolor removal is obtained.

Similarly, $M_{out} = Y'_i \times (-ay_2) + M'_i \times (bM_2) + C'_i \times (-cC_2)$ and $C_{out} = Y'_i \times (-ay_3) + M'_i \times (-bM_3) + C'_i \times (-cC_3)$ are obtained at $D_{out}$. As explained before, the selection of color is controlled by the CPU 22 in accordance with the color sequence of development by selecting signals $(C_0, C_1, C_2)$ in conformity with the content of the truth table shown in FIG. 16B. Registers 105 to 107 and 108 to 110 are used for the purpose of forming monochrome image. As is the case of the masking color compensation explained before, the monochrome signal is obtained by imparting weights to the respective colors as expressed by $MONO = k_i \cdot Y_i + l_i \cdot M_i + m_i \cdot C_i$. As explained before, switching signals MAREA 564 is used for high-speed switching between the coefficient matrixes $M_1$ and $M_2$ of the masking color compensation. RAREA 565 is used for high-speed switching between the mode which employs UCR and the mode which does not employ UCR. KAREA 587 is used for high-speed switching of primary conversion of the black component which is obtained at the output $D_{out}$ through a signal line 569 via the selector 131. Namely, KAREA 587 conducts a high-speed switching of characteristic between $Y = ck - d$ and $Y = ek - f$ (c, d, e and f are constants) for a given black component $k = Min(Y_i, M_i, C_i)$.

It is therefore possible to apply different masking coefficients to different areas on a single copying image frame and/or to apply different amounts of UCR or inking to different areas of the image frame. This makes it possible to synthesize, as in the described embodiment, an image by composing a plurality of images obtained from image input sources having different color separation characteristics or a plurality of images having different levels of black tone.

The area signals MAREA, UAREA and KAREA (564, 565, 587) are generated by area signal generating circuit 51 (see FIG. 2) which will be described later.

Figure 17A:
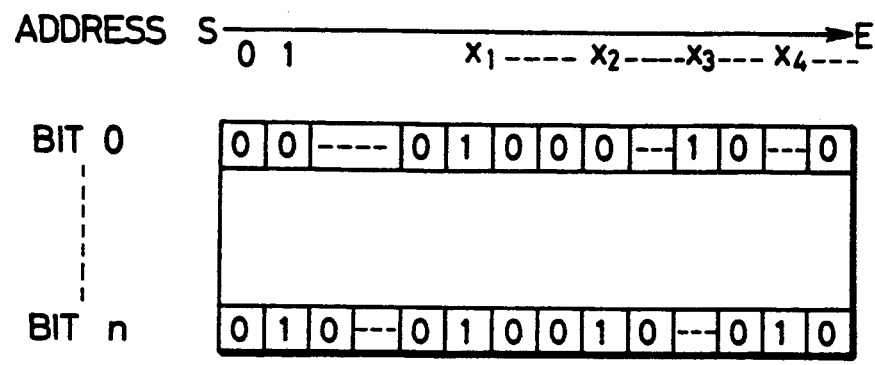
Figure 17B:
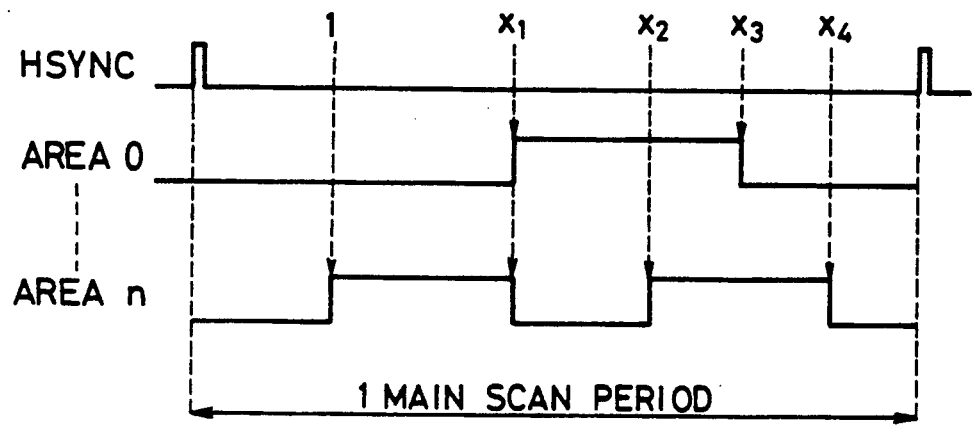
Figure 17C:
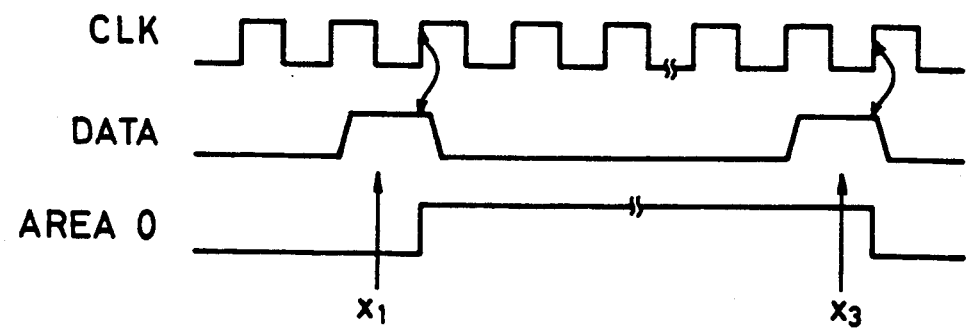

FIGS. 17A to 17G illustrate the manner in which the area signals such as MAREA 564, UAREA 565 and KAREA 587 explained before are generated. The term "area" is used to mean a local area such as that shown by hatching in FIG. 17E. This area is discriminated from other areas by a signal AREA which is formed, as shown in the timing chart of FIG. 17(e), in each of lines within a region between lines A and B. Each region can be appointed by the digitizer 16 shown in FIG. 1. FIGS. 17(a) to 17(d) show an arrangement which enables the CPU 22 to provide plurality of positions of the area signal, area lengths and area numbers in a programmable manner. In this arrangement, a single region signal is constituted by a single bit of RAM which can be accessed by the CPU. For instance, there are two n-bit RAMs so as to provide n-pieces of region signals AREA0 to AREAAn. These RAMs are denoted by 136 and 137 and shown in FIG. 17D. For the purpose of obtaining the area signal AREA0, "1" is set in the bits 0 of the addresses $x_1$, $x_3$ of the RAM, while "0" is set in the bits of other addresses. For obtaining the area signal AREAn, "1" is set in addresses $x_1$, $x_2$ and $x_4$ of the RAM, while "0" is set in the bits n of other addresses. The data in the RAMs are sequentially read in synchronism with predetermined clocks using HSYNC as a reference, so that data "1" is read from the addresses $x_1$ and $x_3$ as shown in FIG. 17C. The thus read data is input to J and K terminals of a J-K flip flops 148-0 to 148-n shown in FIG. 17D, whereby a toggle operation is conducted. Namely, when "1" is read from the RAM while CLK is being received, the output "0" is changed to "1" and the output "1" is changed to "0", whereby a section signal such as AREA0, i.e., an area signal, is obtained. No section, i.e., area, is appointed if "0" is set in all addressed of the RAM.

Figure 17D:
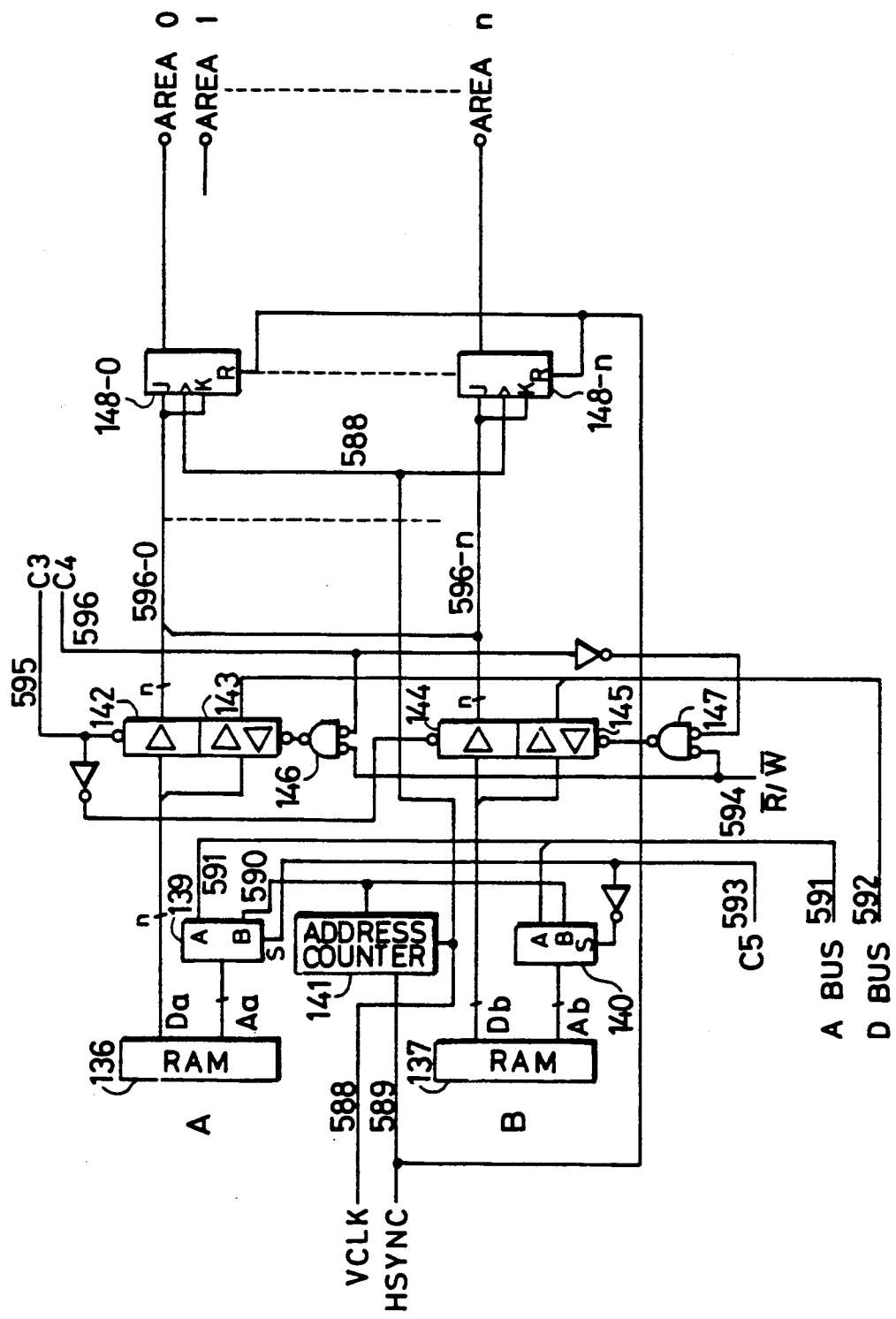
Figure 18A:
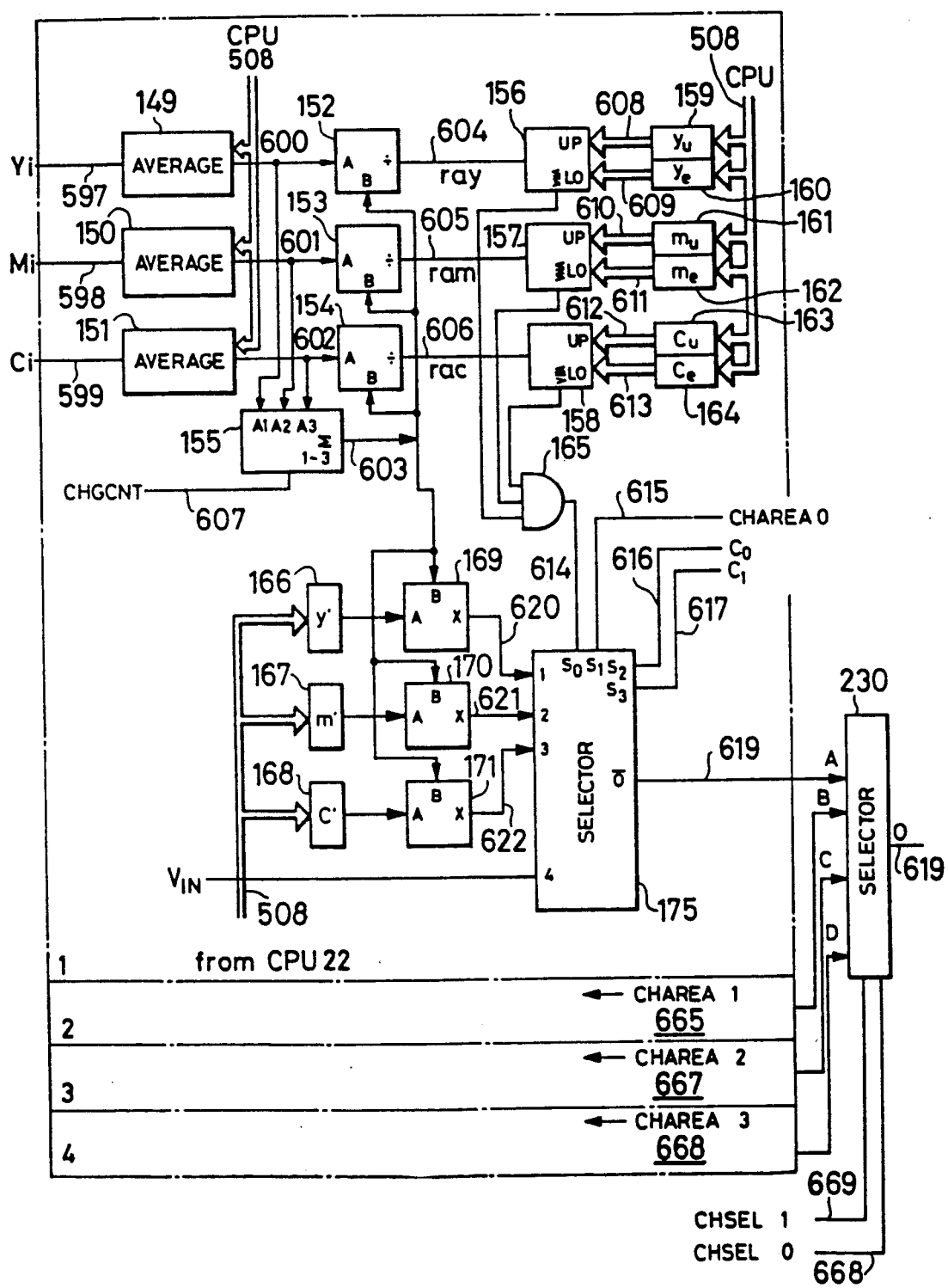
Figure 18F:
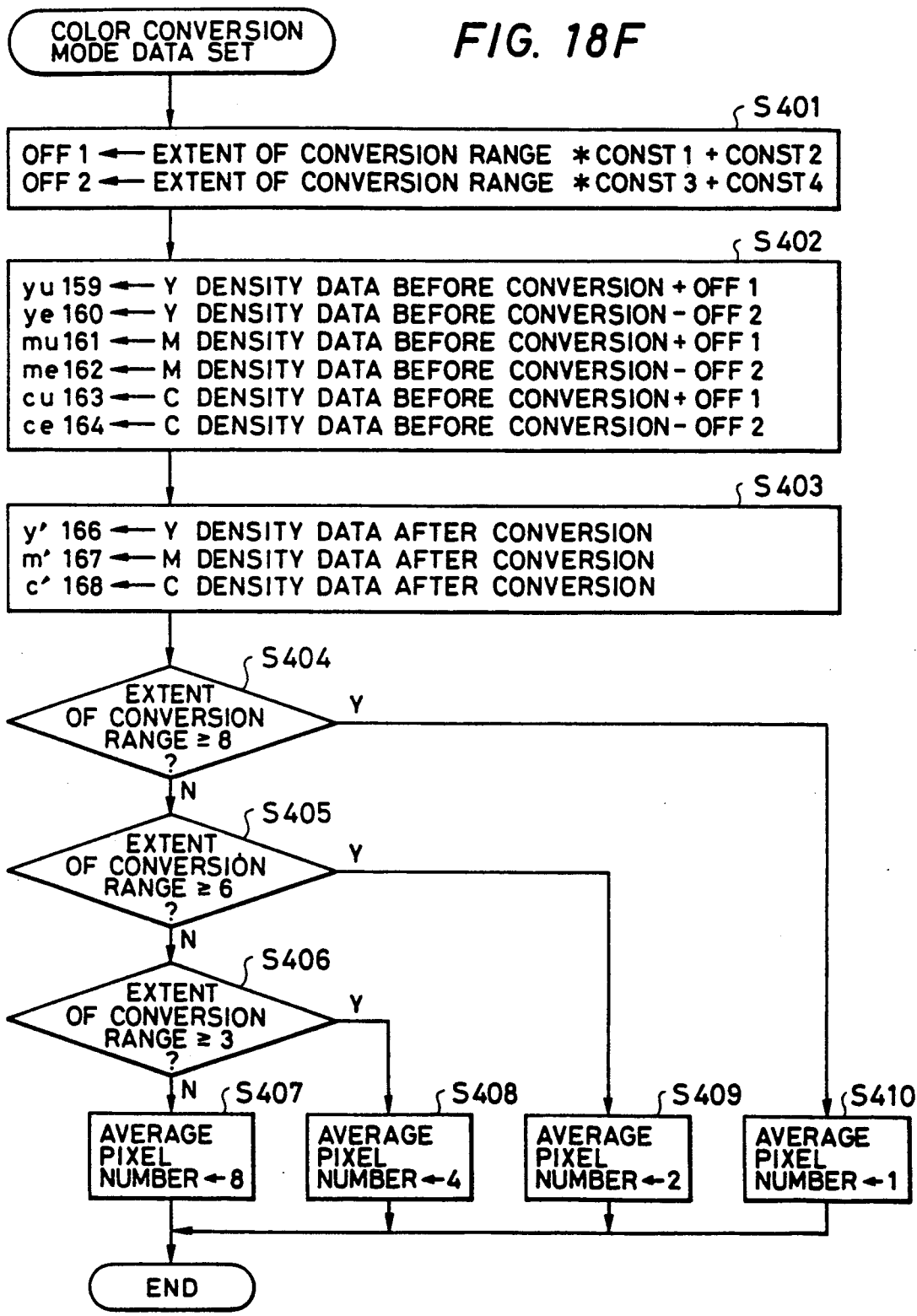

FIG. 17D is a circuit diagram illustrating the construction of a circuit for conducting the above-described operation. The RAMs mentioned before are denoted by 136 and 137. These RAMs are used in such a manner that, while line data is being read from the RAM 136 for the purpose of finding an area signal, the CPU 22 (see FIG. 2) conducts writing of data for appointing a different area, so that a high-speed switching of area can be conducted. Thus, the RAMs 136 and 137 are alternatingly used for the purpose of generation of an area and writing of area data by CPU, thereby realizing a high-speed switching of areas. When areas are appointed as hatched in FIG. 17F, the RAMA, E.G., 136, and the RAMB, E.G., 137, are used alternatingly in a sequence of A→B→A→B→A. This operation is conducted as follows. Referring to FIG. 17D, if the values $(C_3, C_4, C_5)$ are set as $(C_3, C_4, C_5) = (0, 1, 0)$, a counter output counted in terms of VCLK is delivered (Aa) as an address signal to the RAMA 136 through the selector 139. In consequence, the gate 142 is opened while the gate 144 is closed, so that data is read from the RAMA 136 over all bits 0 to n. These data are then input to the J-k flip-flops 148-0 to 148-n, whereby section signals AREA0 to AREAn are generated in accordance with the values set in the respective bits of the RAMA 136. Meanwhile, writing of data in the RAMB 137 by the CPU is conducted through address BUSes A-Bus and data BUSes D-Bus, by means of access signals $\overline{R/W}$. Conversely, generation of section signals in accordance with the data set in the RAMB 137 can be conducted equally by setting the values ($C_3$, $C_4$, $C_5$) as ($C_3$, $C_4$, $C_5$)=(1, 0, 1). Meanwhile, data is written by the CPU 22 in the RAMA 136. These RAMs will be referred to as A-RAM and B-RAM, respectively, hereinafter. Signals $C_3$, $C_4$ and $C_5$ will be referred to as AREA control signals (ARCNT). The AREA control signals $C_3$, $C_4$ and $C_5$ are output from the I/O port of the CPU. Relationships between the bits and the kinds of signals are shown in FIG. 17G.

A description will be made hereinunder as to a circuit arrangement for conducting the color conversion, with reference to FIGS. 18A to 18F. The term "color conversion" is used in this specification to mean an operation for substituting color component data ($Y_i$, $M_i$, $C_i$) of a specific color density or a specific color component ratio by another color. For instance, the color conversion is conducted for converting only a red color area of original (hatched in FIG. 18C) of original into blue.

The color data ($Y_i$, $M_i$, $C_i$) delivered to this color conversion circuit is first input to averaging circuits 149, 150, 151. Averaging pixel numbers are set through a later-mentioned control panel, via a CPU BUS. Actually, the average pixel numbers are set in window comparators 156 to 158 through CPU BUS. The setting of the averaging pixel numbers is conducted in accordance with the width between a comparison upper limit value and a comparison lower limit value. When the width is small, the averaging number of pixels is selected to be large in order to avoid any detection error attributable to, for example, detection of halftone dots. Conversely, when the width is large, the averaging pixel number if reduced so as to eliminate detection error due to, for example, detection of thin lines. The signal outputs from the averaging circuits are delivered to an adder 155 which computes ($Y_i+M_i+C_i$) which is delivered to B inputs of dividers 152, 153 and 154. The outputs of the averaging circuits also are delivered to A inputs of these dividers. These dividers compute, respectively, yellow ratio ray, magenta ratio ram and cyan ratio rac as ray=$Y_i/(Y_i+M_i+C_i)$, ram=$M_i/(Y_i+M_i+C_i)$, ram=$M_i/(Y_i+M_i+C_i)$, and rac=$C_i/(Y_i+M_i+C_i)$. These ratios are derived through signal lines 604, 605 and 606 and are delivered to the window comparators 604, 605 and 606. The window comparators conduct comparison so as to determine whether the computed ratios fall within the ranges between comparison upper limits ($y_u$, $m_u$, $c_u$) and comparison lower limits ($y_l$, $m_l$, $c_l$) of the respective colors. Thus, an output "1" is obtained on condition of $y_l \leq$ ray$< y_u$. Similarly, outputs "1" are obtained on conditions of $m_l \leq$ ram$< m_u$ and $c_l \leq$ rac$< c_u$. The CPU judges that the color is the desired color when all these three conditions are met. In consequence, an AND circuit having three inputs produces an output of "1" which is input to an $S_0$ of a selector 175. The adder 155 produces an output 603=

$$\left[\sum_{1-3}\right] A_i$$

when the signal output from the I/O port of the CPU 22 and carried by a signal line CHGCNT 607 is "1". When the signal output from the I/O port is "0", the adder 155 produces an output 603 which is "1". Thus, when the output from the I/O port is "0", the A inputs of the dividers 152, 153 and 154 are directly delivered as outputs. In this case, color density data are set in the registers 159 to 164 instead of the desired color component ratio. A reference numeral 175 designates a selector having four input lines and one output line. Desired color data after conversion are delivered as Y component, M component and C component to the inputs 1, 2 and 3 of the selector 175, while the input 4 receives data $V_{in}$ which is obtained from the read original image through a masking color compensation and an under-color removal (UCR) operation. The input 4 is connected to the $D_{out}$ shown in FIG. 16(a). The selection input $S_0$ is set "1" when the color detection is "true", i.e., when a predetermined color is detected, otherwise it takes "0". The selection input $S_1$ receives an area signal CHAREA0 615 generated in the area generating circuit shown in FIG. 17D and takes "1" when the detected point is within the appointed area and "0" when the same is out of the appointed area. Color conversion is conducted only when this selection input is "1". The selection inputs $S_2$ and $S_3$ receive inputs $C_0$ and $C_1$ (616, 617) which are the same as the signals $C_0$ and $C_1$ shown in FIG. 16A. Operations of the color printer for forming yellow image, magenta image and cyan image are executed on condition of ($C_0$, $C_1$)=(0,0), (0,1) and (1,0). Truth table representing the function of the selector 175 is shown in FIG. 18B.

The registers 166 to 168 are used for setting the desired color component ratio to be obtained after the conversion or for setting desired color component density data to be obtained after conversion, by the operation of the CPU. When y', m' and c' are color component ratio signals, the signal CHGCNT 607 is set at "1" so that the output 603 of the adder 155 delivers ($Y_i+M_i+C_i$) to the B inputs of the multipliers 169 to 171. In consequence, the selector inputs 1, 2 and 3 receive, respectively, ($Y_i+M_i+C_i$) x y', ($Y_i+M_i+C_i$) x m' and ($Y_i+M_i+C_i$) x c'. In consequence, color conversion is conducted in accordance with the truth table shown in FIG. 18B.

On the other hand, when y', m' and c' are color component density data, the signal CHGCNT is set at "0" so that the output 603 of the adder 155 delivers a level "1", whereby (y', m', c') are directly output from the multipliers 169 to 171 and input to the inputs 1, 2 and 3 of the selector 175, thus accomplishing the color conversion through substitution of the color component density data.

As explained before, the are signal CHAREAO 615 enables the section length and section number to be set freely. It is therefore possible to effect the color conversion only on preselected plurality of areas $r_1$, $r_2$ and $r_3$. By preparing a plurality of circuit arrangements shown in FIG. 18A, it is possible to effect a high-speed real-time color conversion on a plurality of areas independently into different colors. For instance, it is possible to conduct color conversion from red to blue in the area $r_1$, from red to yellow in the area $r_2$ and from white to red in the area $r_3$. More specifically, color detection and conversion circuit same as that explained before is arranged in plural, and required data are selected from the outputs A, B, C and D of the respective circuits by the selector 230 in accordance with the signals CHSEL0 and CHSEL1. The selected data is output through the output line 619The area signals CHAREA0 to CHAREA 3 to be applied to the respective circuits, as well as signals CHSEL0 and CHSEL 1 are produced by the area generating circuit 51 as shown in FIG. 17D. The operator can freely appoint the range of color to be converted, by a later-mentioned area appointing mode.

A description will be made hereinunder with reference to FIGS. 19A to 19F-BK as to a gamma conversion circuit which controls the color balance and color density of the output image. Basically, the gamma conversion is a data conversion conducted in accordance with the contents of a LUT (Look-Up Table). The contents of the LUT can be rewritten in accordance with appointment which is input through the control section. The writing of data in a RAM 177 for the LUT is conducted as follows. The level of a selection signal line RAMSL 623 is set at "0" so that the selector 176 selects the B input, whereby a gate 178 is closed while a gate 179 is opened. As a result, the ABUS and DBUS from the CPU 22 are connected to the RAM 177 thereby allowing data to be written in and read out from the RAM 177. Once the conversion table is formed, the level of the signal on the RAMSL 623 is set at "1" so that video input coming from Din 620 is delivered to the address input of the RAM 177, whereby addressing is conducted in accordance with the video data. In consequence, the desired data is read out of the RAM and is input through the open gate 178 to a magnification control circuit which constitutes the next stage of control operation.

Figure 19A:
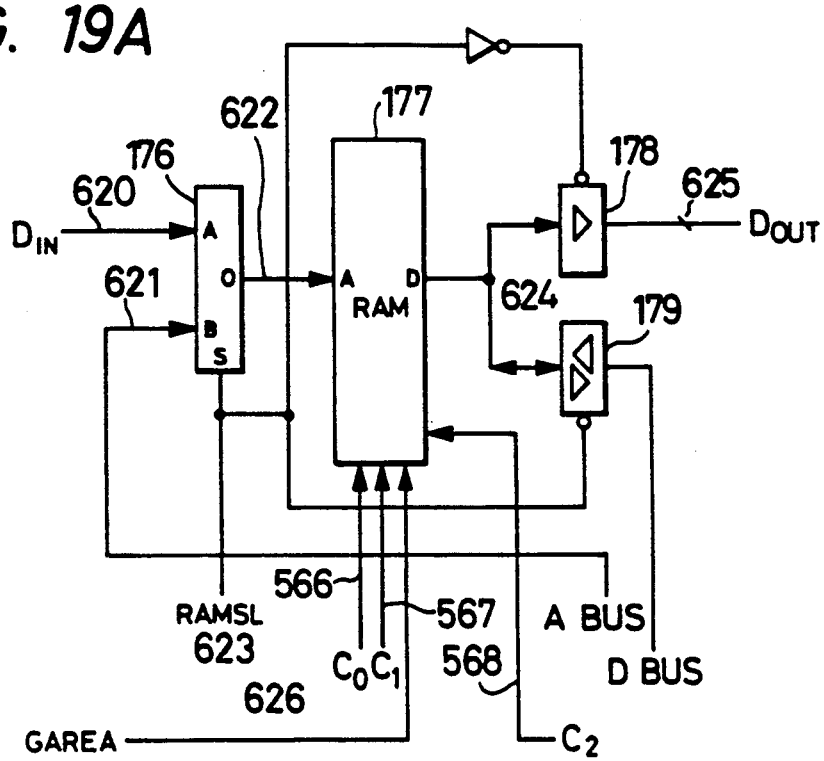
Figures 19B, 19C:
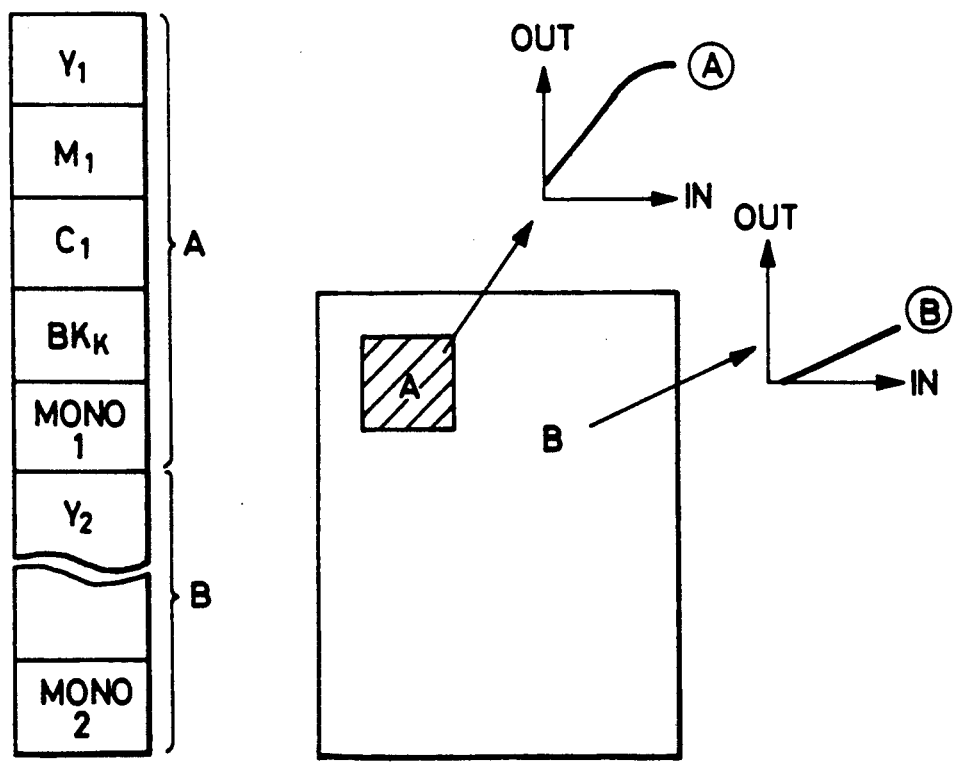

The gamma RAM has at least two sections A and B (see FIG. 19D) each having five areas alloted for yellow, magenta, cyan, black and MONO. As is the case of the operation explained in connection with FIGS. 16A and 16B, the conversion of the respective colors is conducted by the signals $C_0$, $C_1$ and $C_2$ (566, 567, 568). The area generation circuit shown in FIG. 17D also produces a signal GAREA 626 which makes it possible to impart different gamma characteristics to different areas. For instance, it is possible to impart a gamma characteristic A to the area A and a gamma characteristic B to an area B, as shown in FIG. 19C. It is thus possible to obtain a single print including different areas having different gamma characteristics. The gamma RAM used in this embodiment has two sections which store different gamma characteristics A and B which are switchable at high speed in independent areas. It is of course possible to increase the number of sections so as to enable the operator to use a greater number of gamma characteristics which are switchable at high speed. The output $D_{out}$ in FIG. 19A is input to the input $D_{in}$ of the aforementioned magnification control circuit of the next stage shown in FIG. 20A.

Figure 37:
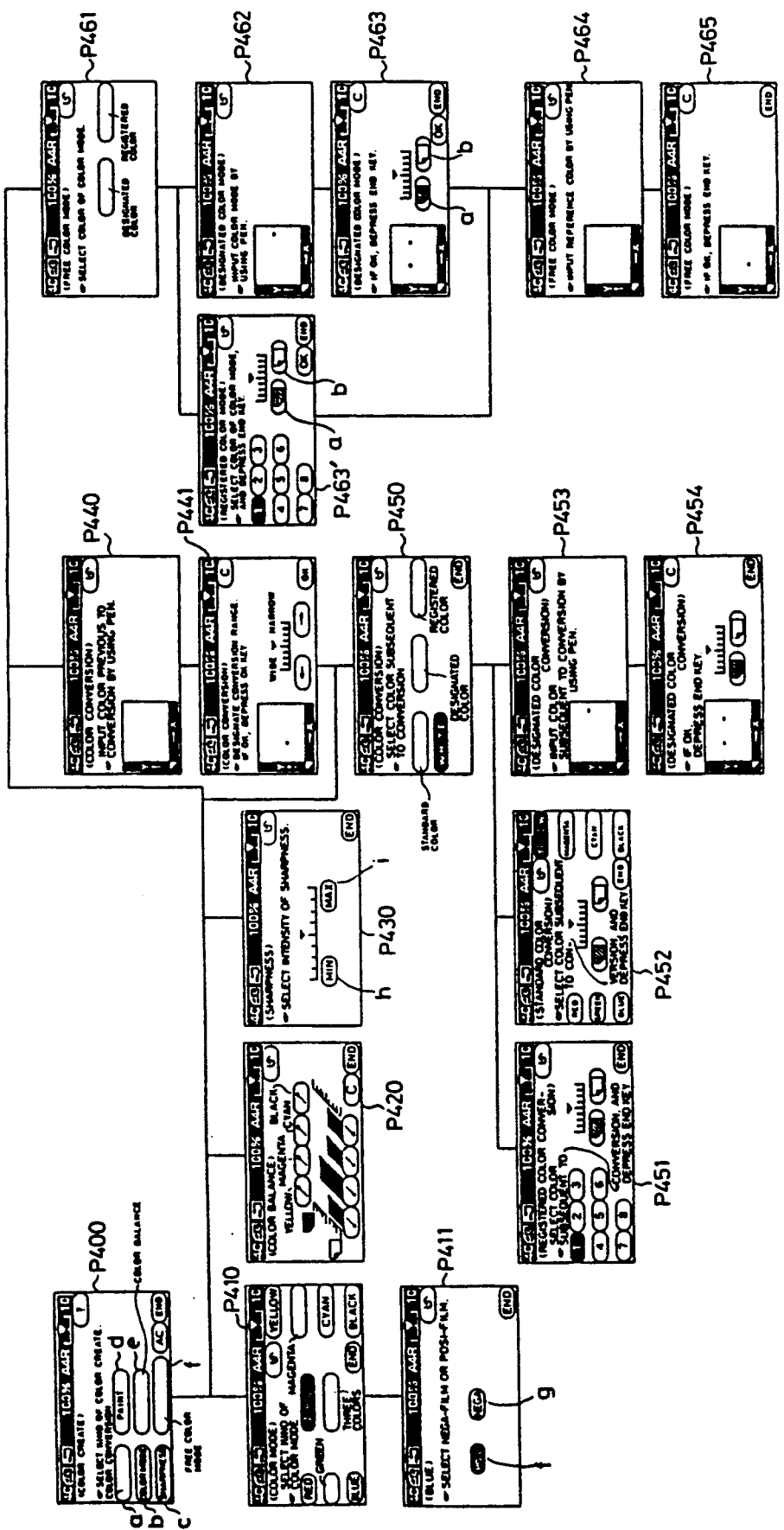
FIG. 37 is an illustration of operation in color create mode.

As will be understood from the drawings, the gamma conversion RAM used in this embodiment is designed to switch the characteristic for each of the colors independently. The content of this RAM can be rewritten by the CPU in response to operation of liquid-crystal touch panel keys on the control panel. For instance, when the operator has touched a density control key e on P000 (standard frame) of FIG. 33, the setting is moved from the center 0 to the left towards $-1$ and then towards $-2$ as shown in FIGS. 19D and 19E, and the characteristics in the RAM 177 also is shifted laterally as 0 to $-1$, $-1$ to $-2$, $-2$ to $-3$ and $-3$ to $-4$ so as to be rewritten. Conversely, when the operator touches a density control key f, the characteristic is changed from 0 to $+1$, $+1$ to $+2$, $+2$ to $+3$ to $+4$ whereby the content of the RAM 177 is rewritten. Thus, by touching the e or f key on the standard frame, it is possible to rewrite the content of the whole table (RAM 177) of Y, M, C. Bk and MONO, whereby the image density can be varied without changing color tones. Referring now to FIG. 37, a frame 420 is used for color balance control in <color create> mode. In this case, areas for the independent colors Y, M, C and Bk of the RAM 177 are rewritten so as to enable a control of the color balance. For instance, when it is desired to change the color tone of the yellow component, the operator touches a touch key $y_1$ in the frame 420 so that the black belt is extended upward whereby the conversion characteristic is moved in the direction $y_1$, i.e., in such a direction as to increase the density of the yellow component, as shown in FIG. 19F-Y. Conversely, when a touch key $y_2$ is touched, the characteristic is moved in such a direction $y_2$ as to decrease the density of the yellow component. Thus, this operation enables adjustment of density of single color component. The same operation is possible also on other colors M, C and Bk.

Figure 36:
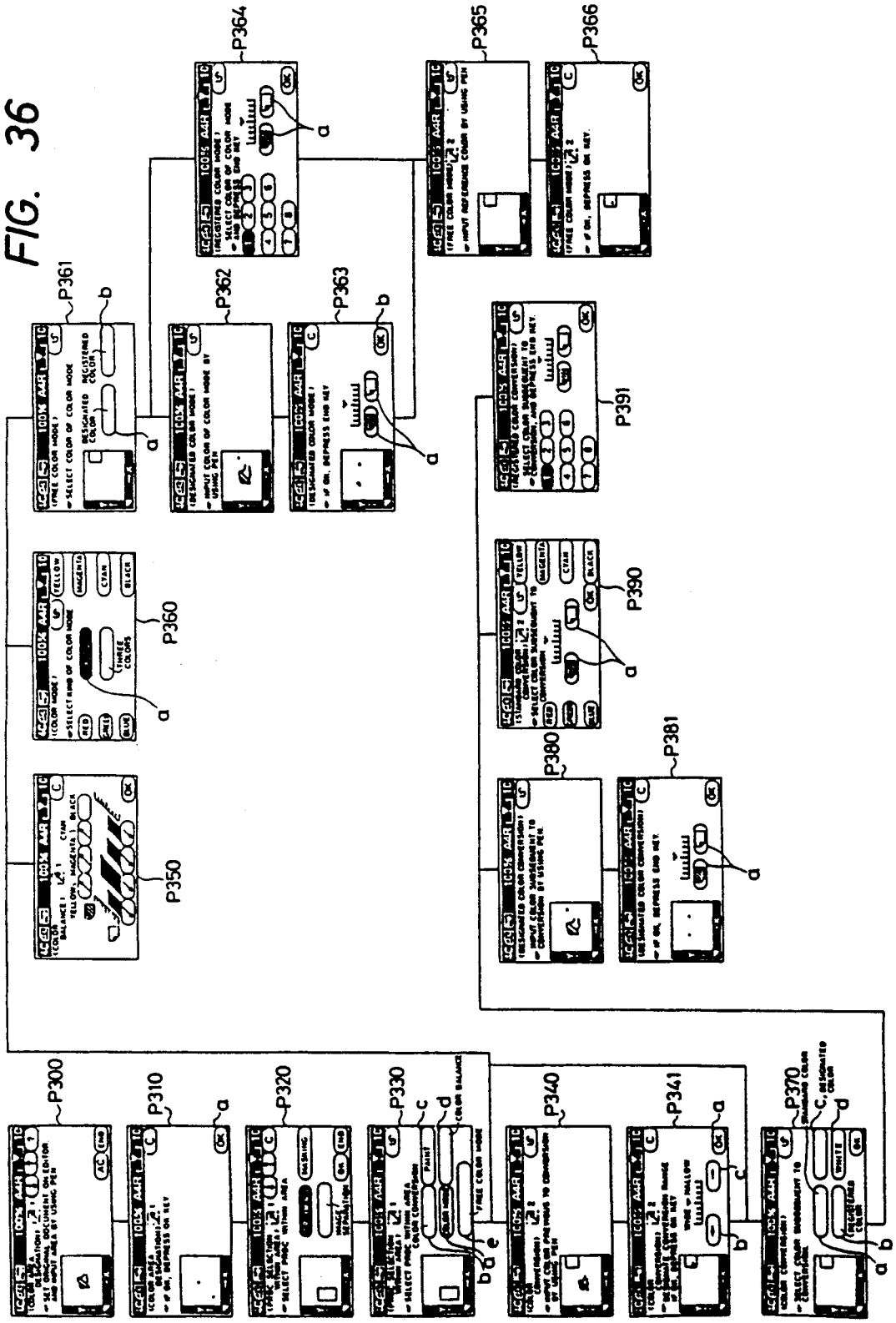
FIG. 36 is an illustration of operation in area appointing mode.

A frame P361 in FIG. 36 is used in free color mode in <area appoint> mode. This free color mode is realized by rewriting the content of the gamma conversion RAM in a manner which will be explained later.

The free color mode is an operation for obtaining a gradation image of any desired single color, similar to black gradation image which is obtained when a full-color original is copied by a monochromatic copier.

A description will be made hereinunder as to the manner in which the free color mode is realized, with reference to FIG. 54-A. The description will be made on an assumption that the user wishes to obtain a single-color gradation image of blue color. The appointment of the hue of color to be used is conducted by reading a color on an original displayed on a frame P362 in FIG. 36 or by selecting one from a plurality of colors registered on the frame P364 shown in FIG. 36.

Figure 54A:
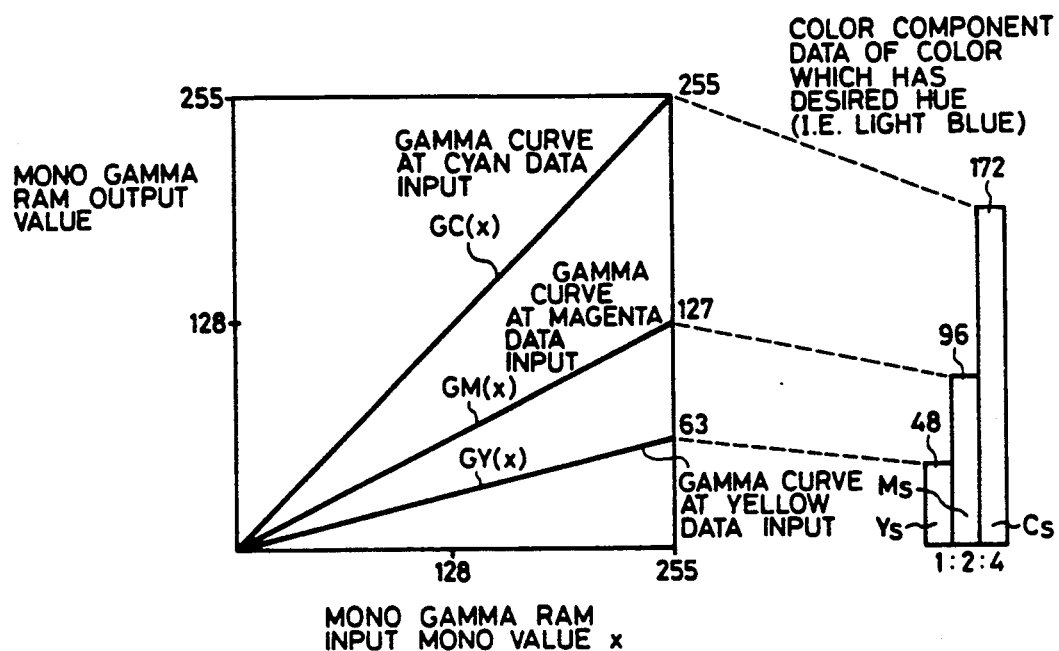
FIGS. 54A, 54B, 54C, 54D and 54E are illustrations of operation in free-color mode.

The graph appearing on a right-side portion of FIG. 54A shows color component data ($Y_s$, $M_s$, $C_s$) of a color which has a hue appointed through the frame P364. This color is, in this case, a light blue color. From this data, it is understood that the desired hue (blue color) has a component ratio of $Y_s$: $M_s$: $C_s = 1 : 2 : 4$. A graph appearing on left portion of FIG. 54A shows gamma characteristics which are set in the MONO gamma RAM at the time of formation of yellow, magenta and cyan colors.

Representing the maximum value amongst $Y_s$, $M_s$ and $C_s$ by MAX, the gamma characteristic functions GY(x), GM(x) and GC(x) of yellow, magenta and cyan colors are formed by the following procedure.

$$GY(x) = x \cdot \frac{Y_s}{MAX}$$

$$GM(x) = x \cdot \frac{M_s}{MAX}$$

$$GC(x) = x \cdot \frac{C_s}{MAX}$$

(Note that MAX is not zero in these formulae, as well as in the following description).

The aforementioned monochromatic image data (MONO) is made to pass through the thus formed MONO gamma RAM, while varying the gamma characteristics for yellow, magenta and cyan colors, thereby realizing the free color mode. In fact, the following conditions are met by all MONO values x, so that the formed image has a single hue with a gradation which has the same proportion to all the colors yellow, magenta and cyan.

$$GY(x):GM(x):GC(x) = x \cdot \frac{Y_s}{MAX} \cdot x \cdot \frac{M_s}{MAX} \cdot x \cdot \frac{C_s}{MAX}$$
$$= Y_s:M_s:C_s$$

Figure 54B:
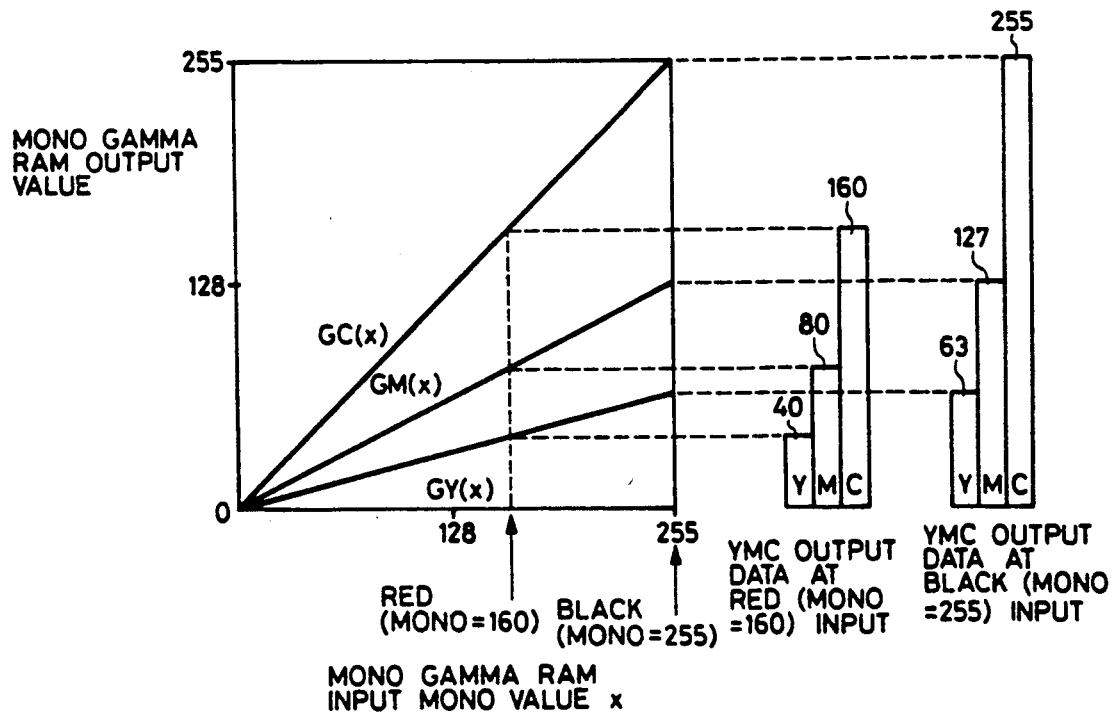

FIG. 54B sh s the color component of the image formed in the described free color mode when a single original has a black portion (MONO=255) and a red portion (MONO=160). It will be seen that these portions are represented by the same hue with such a gradation that the portion having greater MONO value exhibits a higher density than the portion having the smaller MONO value.

This operation alone, however, cannot make it possible to attain the desired density at a desired portion on the original. For instance, it may be required to change the black portion of the original into a color of the desired hue with small color density, while representing the red portion in the same hue with high density.

Figure 54C:
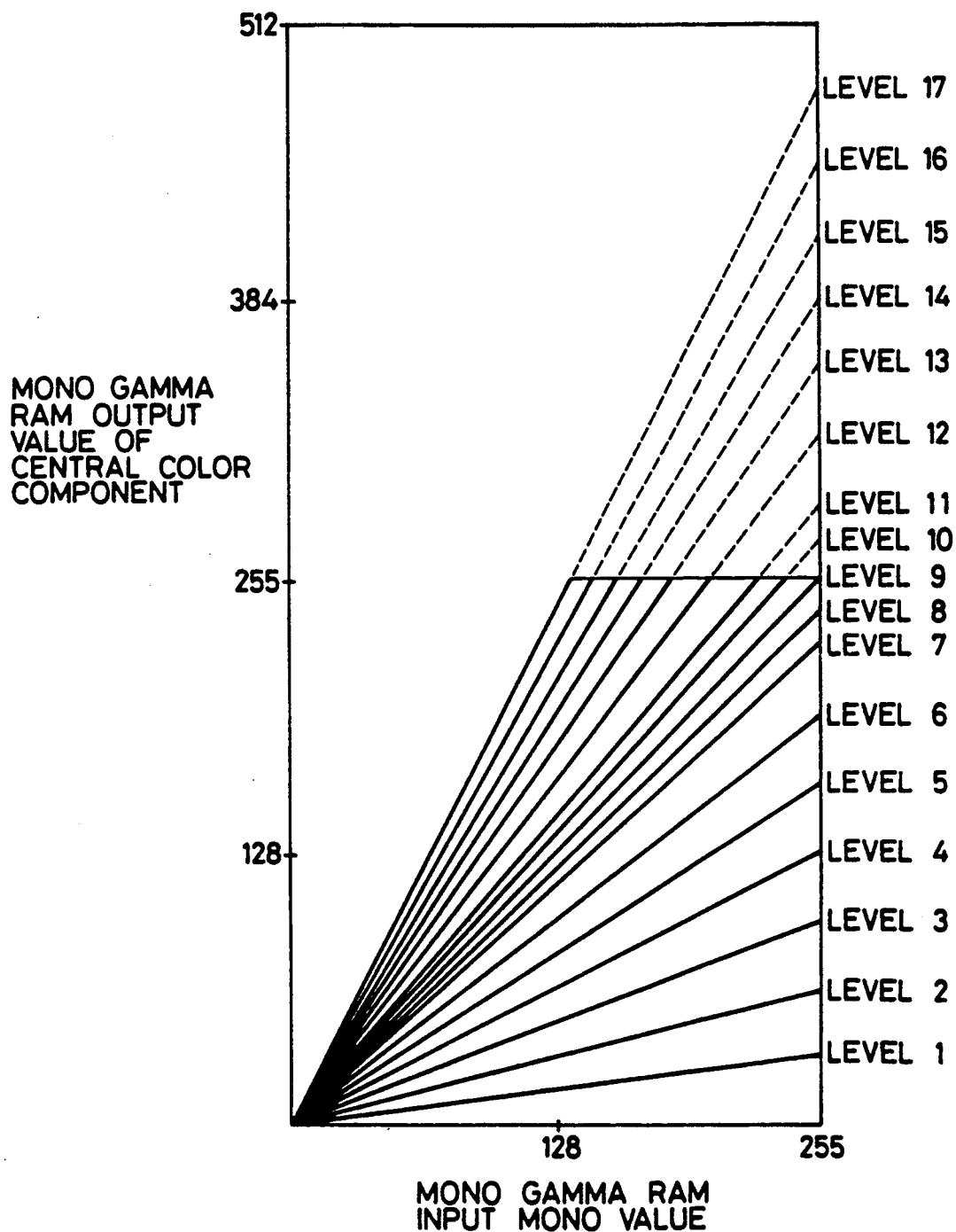

Such a control is possible by means of a density control key a on the free color mode in <area appoint> mode on the frame P363 or P364 in FIG. 36. This key a enables the density level to be change stepwise from level 1 to level 17 and vice versa. In accordance with the appointed density level, the gamma curve of the color component having the greater proportion (referred to as "central color component" hereinunder) is changed as shown in FIG. 54C. The standard density level is set at level 9. When this standard level has been selected, the gamma curve of the central color component coincides with the gamma curve shown in FIG. 54A.

Constants are alloted to the respective density levels $M_0$ to $M_{17}$. Te constant alloted to $M_8$ is 255. The gamma characteristic function GMAINi of the central color component is then determined as follows.

$$data = x \cdot \frac{Mi}{255}$$

$$GMAINi(x) = \begin{cases} data & (data \leq 255) \\ 255 & (data > 255) \end{cases}$$

In this embodiment, the gamma RAM provides 8-bit output (0 to 255) so that the upper limit is set at 255.

Thus, the gradient of the gamma curve of the central color component is changed in accordance with the density level, and the gradients of gamma curves of other colors are changed such as to maintain the same proportions, whereby the density level can be freely controlled in the same hue.

Figure 54D:
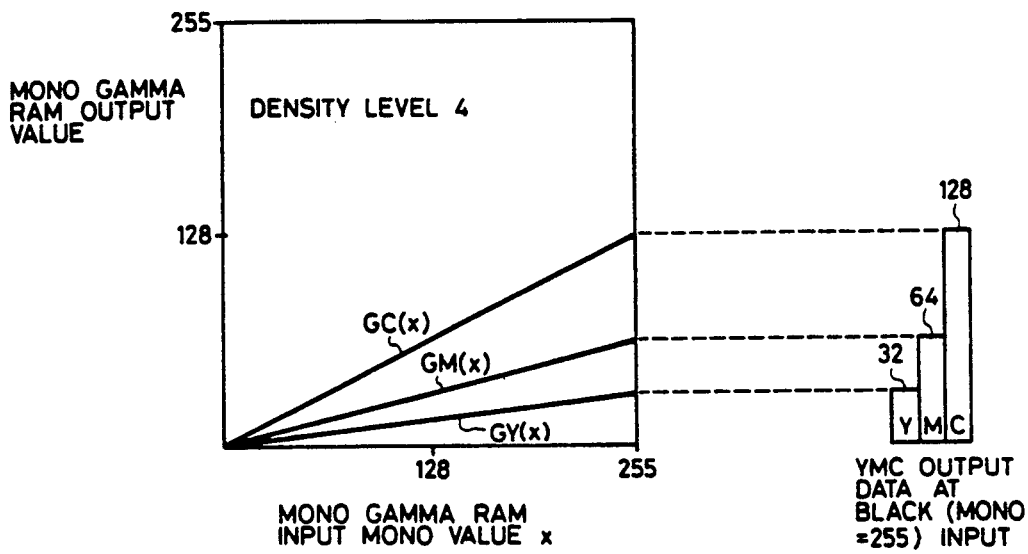

FIG. 54D shows a gamma curve which is obtained when the density level has been changed to the level 4 from that shown in FIG. 54A. It will be understood that the black portion of the original is represented by the color of the same hue with reduced density, without changing the component ratios of Y:M:C=1:2:4.

Figure 54E:
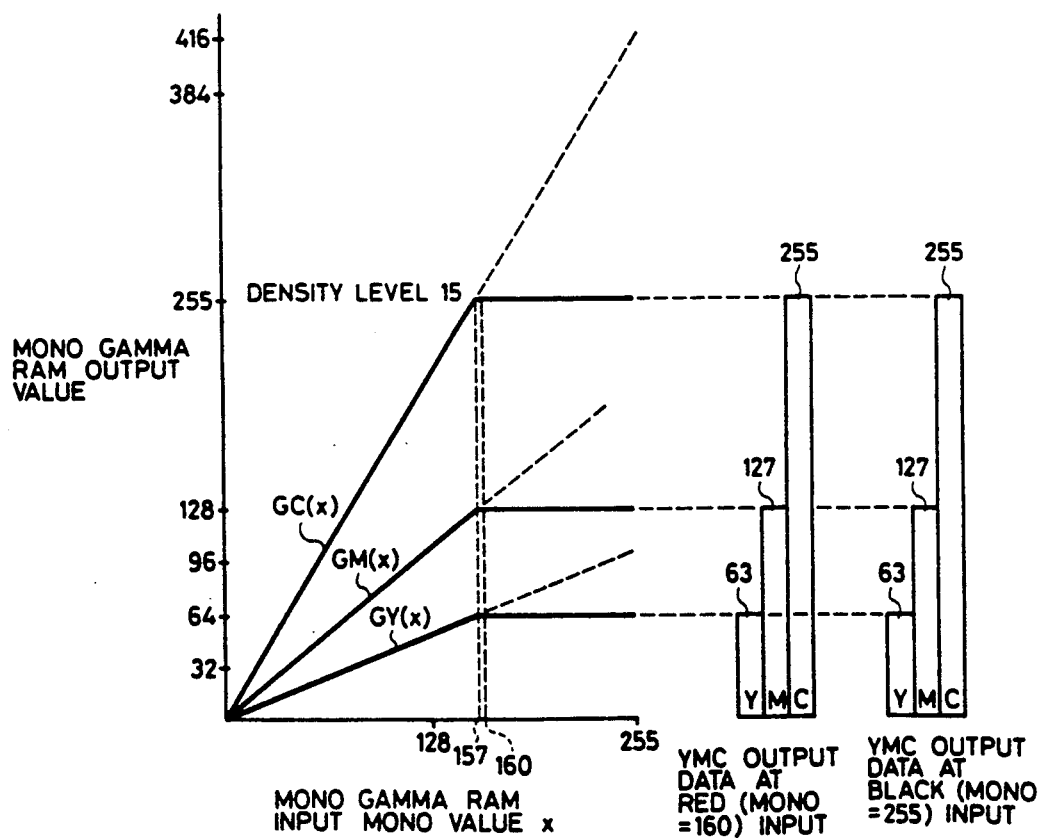

FIG. 54E shows a gamma curve which is obtained when the density level has been changed to the level 15 from that shown in FIG. 54A. In order to maintain the component ratio, when the upper limit value (255 in this case) is reached by the central color component, this color component is kept constant as well as other color components. It will be understood that the red portion of the original is represented by the color of the same hue with increased density. Needless to say, the component ratios of Y:M:C=1:2:4 is maintained without being changed.

The free color mode in the <area appoint> mode on the frame P365 shown in FIG. 36 also makes it possible to conduct the following control. Namely, the operator can change the density of a desired point to the same level of density as the color ($Y_s$, $M_s$, $C_s$) having the hue appointed on the frame P362 or P364 shown in FIG. 36, by appointing such a point on the original.

To effect such a change in the density, the MONO value (reference MONO value) of the point appointed on the original is read, and the gamma curves of the respective color components in the MONO gamma RAM are set such that $Y_s$, $M_s$ and $C_s$ are output when the read MONO value is input. When the reference MONO value is small, the gradients are large as shown in FIG. 54E, whereas, when the reference MONO value is small, the gradients are small as shown in FIG. 54D.

As will be understood from the foregoing description, the free color modes can be realized only through three image forming cycles for Y, M and C colors. When this free color mode is used together with other mode or modes, it may become necessary to conduct image formation in BK. This can be attained by setting the gamma curve for BK such that 0 is output in response to all inputs.

Figure 20A:
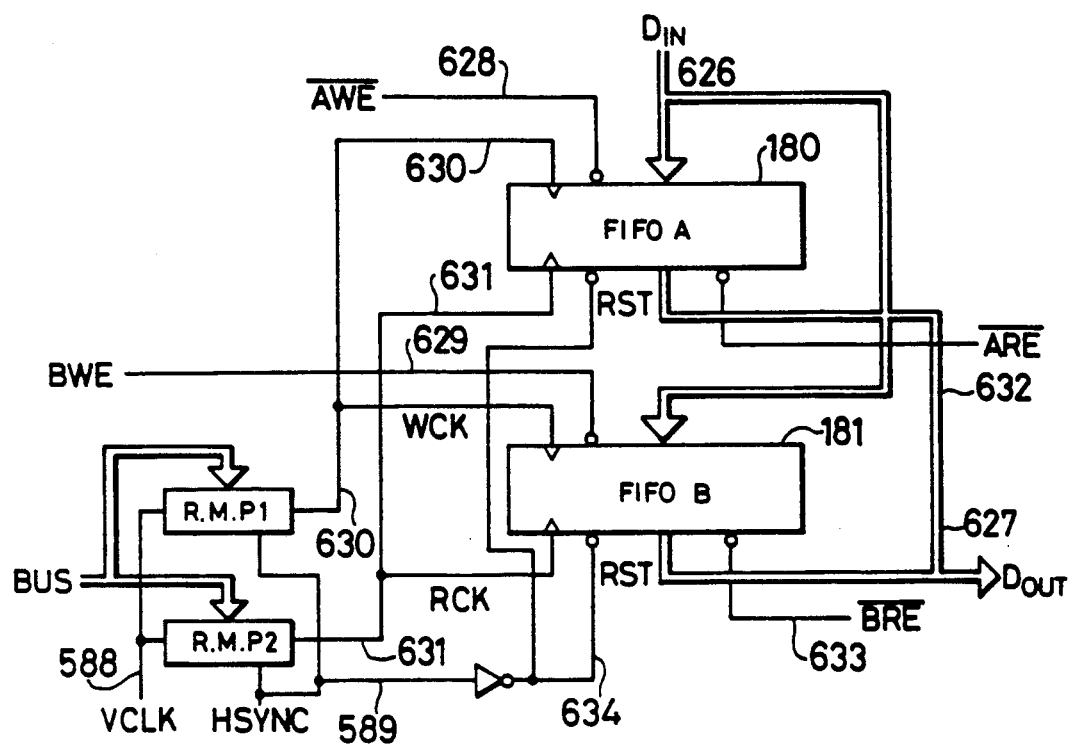
FIGS. 20A, 20B, 20C, 20D, 20E, 20F and 20G are illustrations of magnification variation control.
Figure 20B:
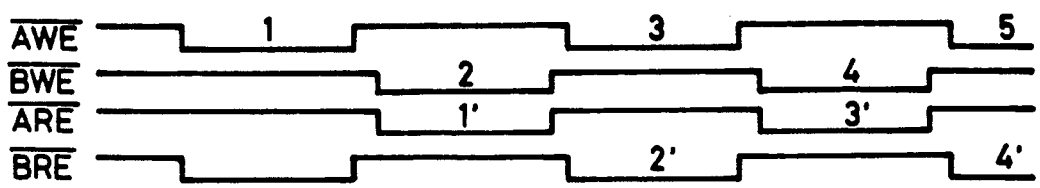
Figure 20C:
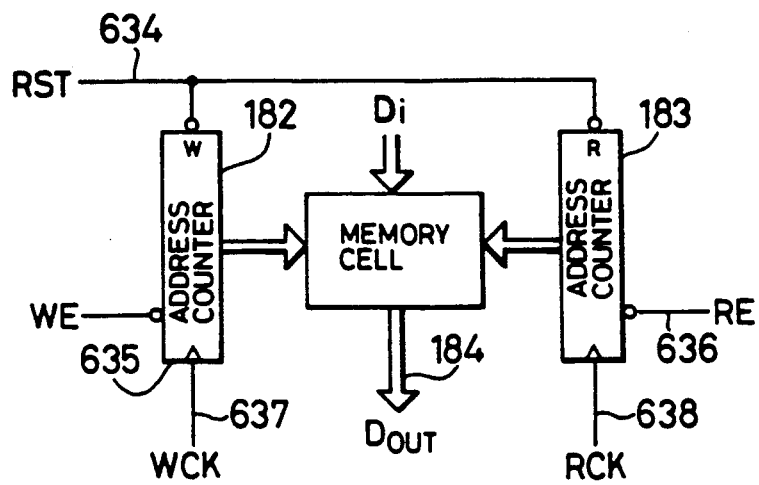
Figure 20D:
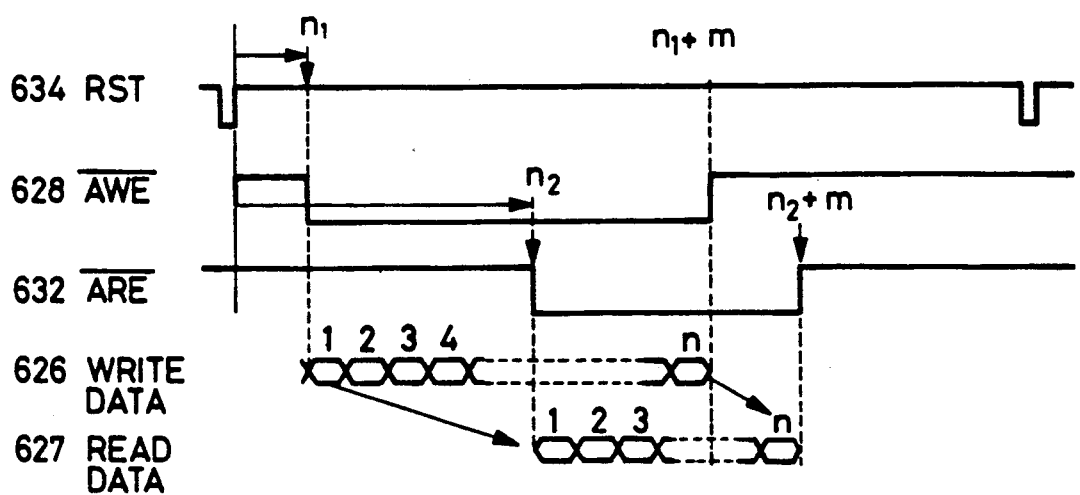
Figure 20E:
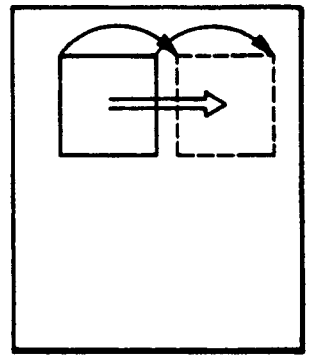
Figure 20F:
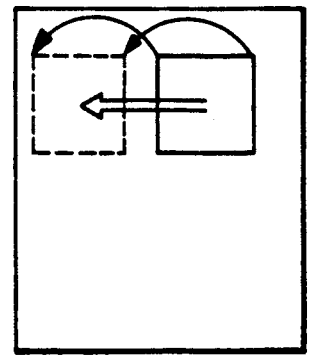
Figure 20G:
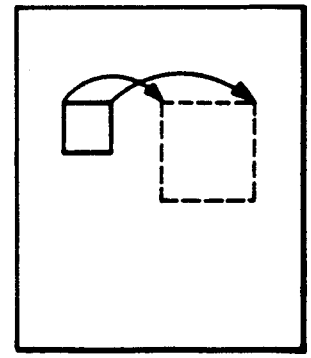

Referring to FIG. 20A, each of FiFo memories 180 and 181 has a capacity corresponding to 4752 pixels (16×297=4752) so as to cover a scan line length of 297 mm corresponding to the length of A-4 size paper, with pixels arranged at a pitch of 16 pel/mm. As shown in FIG. 20B, each FiFo memory conducts writing in the memory in the period of $\overline{AWE}$ or $\overline{BWE}$="Lo", and reading of data from memory in the period of $\overline{ARE}$ or $\overline{BRE}$="Lo". When a condition of $\overline{ARE}$="Hi" is met, a high-impedance state is obtained in the output from the memory A. When a condition of $\overline{BRE}$="Hi" is met, a high-impedance state is obtained for the output from the memory B. Wired OR of these outputs from the memories is delivered as an output $D_{out}$ 627. Each of the FiFo memories 180 and 181 (A and B) has a write address counter and a read address counter (see FIG. 20C) which operates in accordance with clocks WCK and RCK so as to cause an internal pointer to step. It is a well known measure to supply the WCK with clocks CLK which is formed by demultiplying an internal video data transfer clock VCLK 588 by a rate multiplier, while supplying the RCK with the VCLK without demultiplication. In such a case, the data stored in this circuit is contracted when it is output. Conversely, when the WCK is supplied with the VCLK without demultiplication while the RCK receives the demultiplied CLK, the data is expanded when output. FiFo memories A and B are adapted to alternatingly conduct the read and write operations. The W address counter 182 and R address counter 183 in each of the FiFo memories 180 and 181 is adapted to upcount in accordance with the clock only when the enable signal (We, RE . . . 635, 636) is "Lo", and is adapted to be reset and initialized on condition of RST (634)="Lo". An example of the writing and reading operation will be explained with reference to FIG. 20D. After a reset RST which is conducted by main scan synchronizing signal $\overline{HSYNC}$ in this embodiment, the signal $\overline{AWE}$ (or $\overline{BWE}$) is set at "Lo" for a period corresponding to m pixels as counted from the $n_1$-th pixel so as to enable the pixel data to be written, while the signal $\overline{ARE}$ (or $\overline{BRE}$) are set at "Lo" for a period corresponding to m pixels as counted from the $n_2$-th pixel so as to enable the pixel data to be read out. In consequence, the data is shifted from the position represented by WRITE DATA to the position represented by READ DATA in FIG. 20D. By controlling the position of generation and duration of the signals $\overline{AWE}$ (or $\overline{BWE}$) and $\overline{ARE}$ (or $\overline{BRE}$) in the described manner, it is possible to move the image in the direction of the mains can to any desired position as shown in FIGS., 20E, 20F and 20G. It is also possible to freely combine the movement of the image with contraction or enlargement, by combining the image moving operation with the demultiplication of the WCK signal or RCK signal explained before. The signals $\overline{AWE}$, $\overline{ARE}$, $\overline{BWE}$ and $\overline{BRE}$ which are input to this circuit are all generated by the area generation circuit shown in FIG. 17D.

Figure 21A:
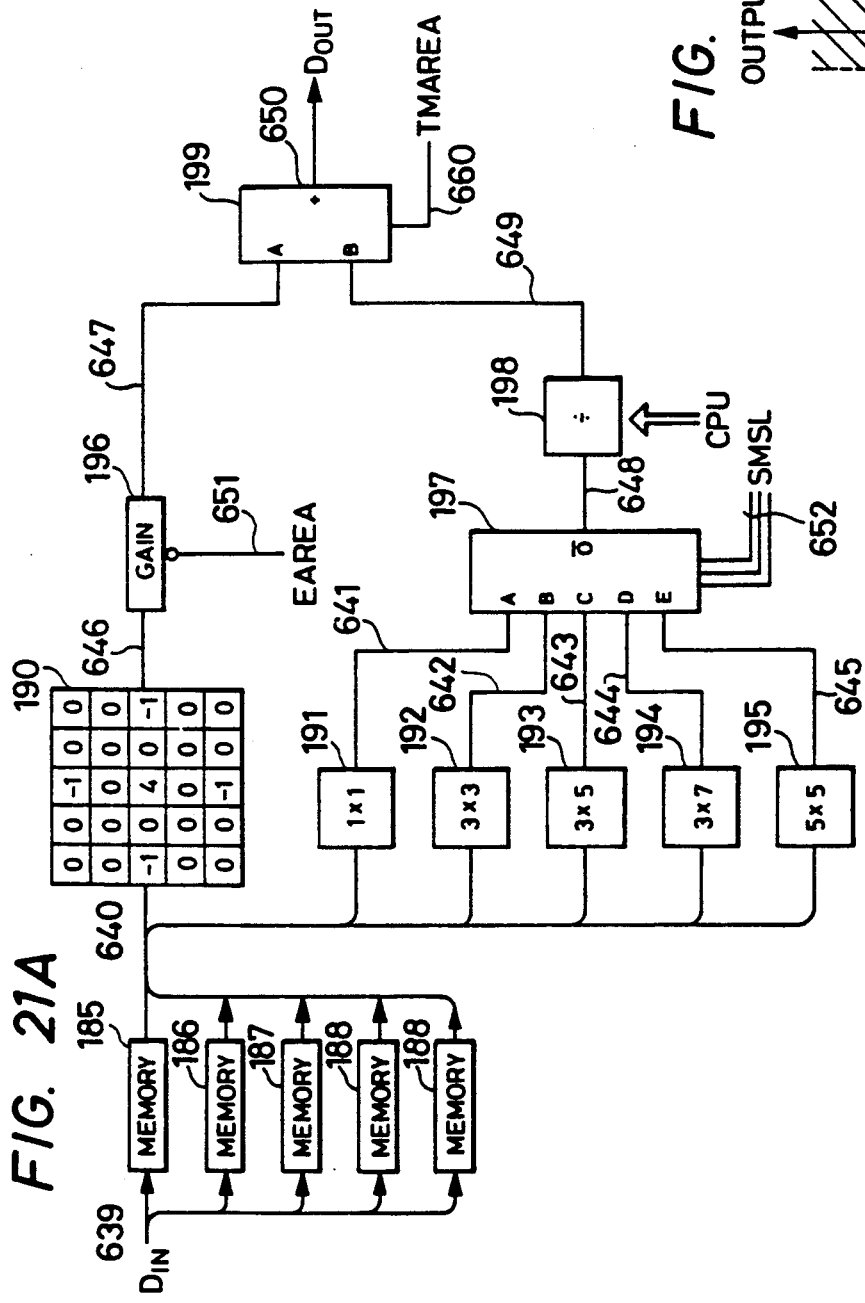
FIGS. 21A, 21B, 21C, 21D, 21E, 21F and 21G are illustrations of edge emphasizing and smoothing operations.
Figure 21B:
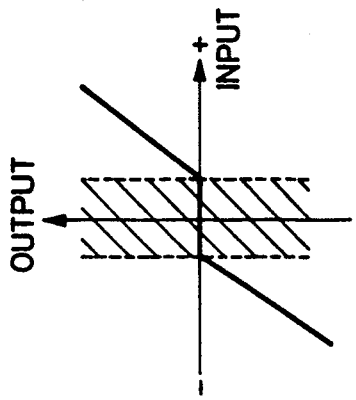

After the enlarging or contracting operation is conducted in the direction of the main scan as desired, edge stressing and smoothing operation is conducted in a manner which will be explained hereinunder with reference to FIGS. 20A to 20G. FIG. 21A is a block diagram of a circuit for conducting this operation. This circuit has plurality of line memories 185 to 189 each having a capacity corresponding to the length of line in the direction of main scan. These line memories are arranged to form a FiFo structure which enables data of five successive lines to be cyclically stored and read in parallel. A reference numeral 190 denotes a quadratic differentiation spatial filter which is used ordinarily. This filter detects edge component of the image and the output 646 thereof is processed with a gain having a characteristic as shown in FIG. 21B. The hatched area in FIG. 21B of the differentiation output is clamped in order to remove small components in the edge stressing output, i.e., to remove noise components. The buffer memory outputs corresponding to five lines are delivered to smoothing circuits 191 to 195 whereby averaging is conducted with five types of pixel blocks having different sizes including the smallest size of $1 \times 1$ and the greatest size of $5 \times 5$. The desired smoothing signal is selected from among the outputs 641 to 645 from these smoothing circuits. An SMSL signal 651 is output from the I/O port of the CPU 22 and is controlled in relation to the appointment from the control panel, as will be explained later. A reference numeral 198 designates a divider. When a smoothing size of $3 \times 5$, for example, has been selected, the CPU 15 operates to set "15", whereas, when a smoothing size of $3 \times 7$ has been selected, the CPU operates to set 21, and the averaging is conducted in accordance with these numbers.

Figure 21C:
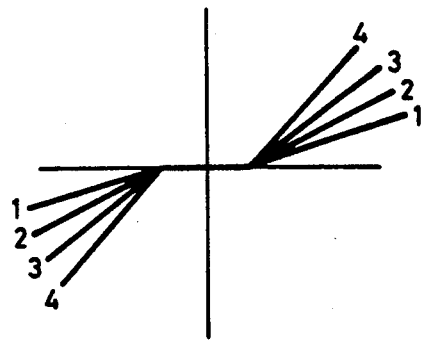
Figure 21D:
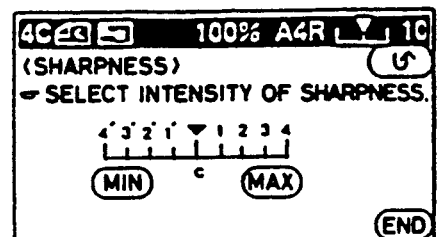
Figure 21E:
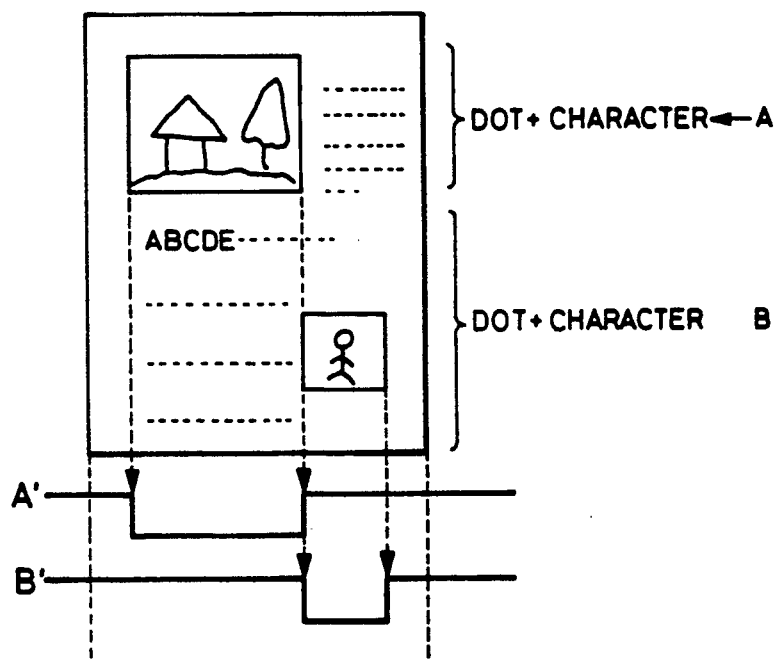
Figure 21F:
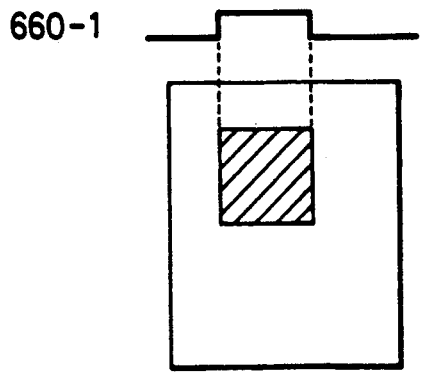
Figure 21G:
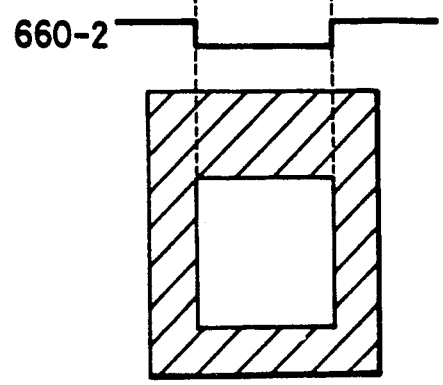

The gain circuit 196 has a look-up-table type construction (LUT) construction, constituted by a RAM in which data is written by CPU 22 as in the case of the gamma circuit explained in connection with FIG. 19A. The arrangement is such that, when the input EAREA 652 is set at "Lo", the gain circuit 196 outputs "0". The edge stressing control and the smoothing control explained above are related to the liquid-crystal touch panel frame on the control panel. As the operator operates the touch panel on the frame P430 in FIG. 37 to press <SHARPNESS> on the frame, the gain characteristic is rewritten by CPU 22 as shown in FIG. 21C, as the sharpness number is increased from 1 to 2, 2 to 3, 3 to 4 and so on. Conversely, if the panel is operated in the direction for weakening the <SHARPNESS> AS 1' TO 2', 2' TO 3' AND 3' TO 4', THE SWITCHING SIGNAL SMLSL 652 of the selector 197 operates to progressively increase the size of the blocks as from $3 \times 3$, $3 \times 5$, $3 \times 7$ up to $5 \times 5$. At the central point C, the block size $1 \times 1$ is selected and the gain circuit input EAREA 651 is set at "Lo". In this case, therefore, the input $D_{in}$ is output as $D_{out}$ without any smoothing and edge stressing, and is delivered to the output of the adder 199. In this embodiment, the Moire generated when the original has halftone dots can be eliminated by the smoothing. In addition, the sharpness of the image is increased as a result of edge stressing operation effected on the letters and lines. A problem is encountered when halftone dot portion and line or letter portion exist in the same original. In such a case, a smoothing for eliminating Moire inevitably reduce the sharpness to make the lines and letters obscure, while an edge stressing for attaining a higher sharpness causes Moire to become strong. This problem is overcome by the described embodiment as follows. Namely, in this embodiment, the EAREA 651 and SMSL 652 produced in the area generating circuit shown in FIG. 17D are suitably controlled such that SMSL 652 selects the smoothing size of $3 \times 5$, while EAREA 651 is formed as A' and B' in FIG. 21E. When this control is conducted on the original which has both halftone dot image and line or letter image, Moire is suppressed on the halftone dot image while the sharpness is improved in the region of line or character image. As is the case of the signal EAREA 651, the signal TMAREA 660 is generated by the are a generating circuit 51, so that an output $D_{out}$="A+B" is obtained on condition of TMAREA="1" and an output $D_{out}$="0" is obtained on condition of TMAREA="0". Therefore, when the TMAREA 660 is controlled such as to generate a signal 660-1 as shown in FIG. 21F, the hatched area (area inside rectangle) is trimmed, whereas, when a signal 660-2 as shown in FIG. 21G is formed, the hatched area (area outside rectangle) is trimmed, i.e., white blanking of the area in the rectangle is conducted.

Figure 22:
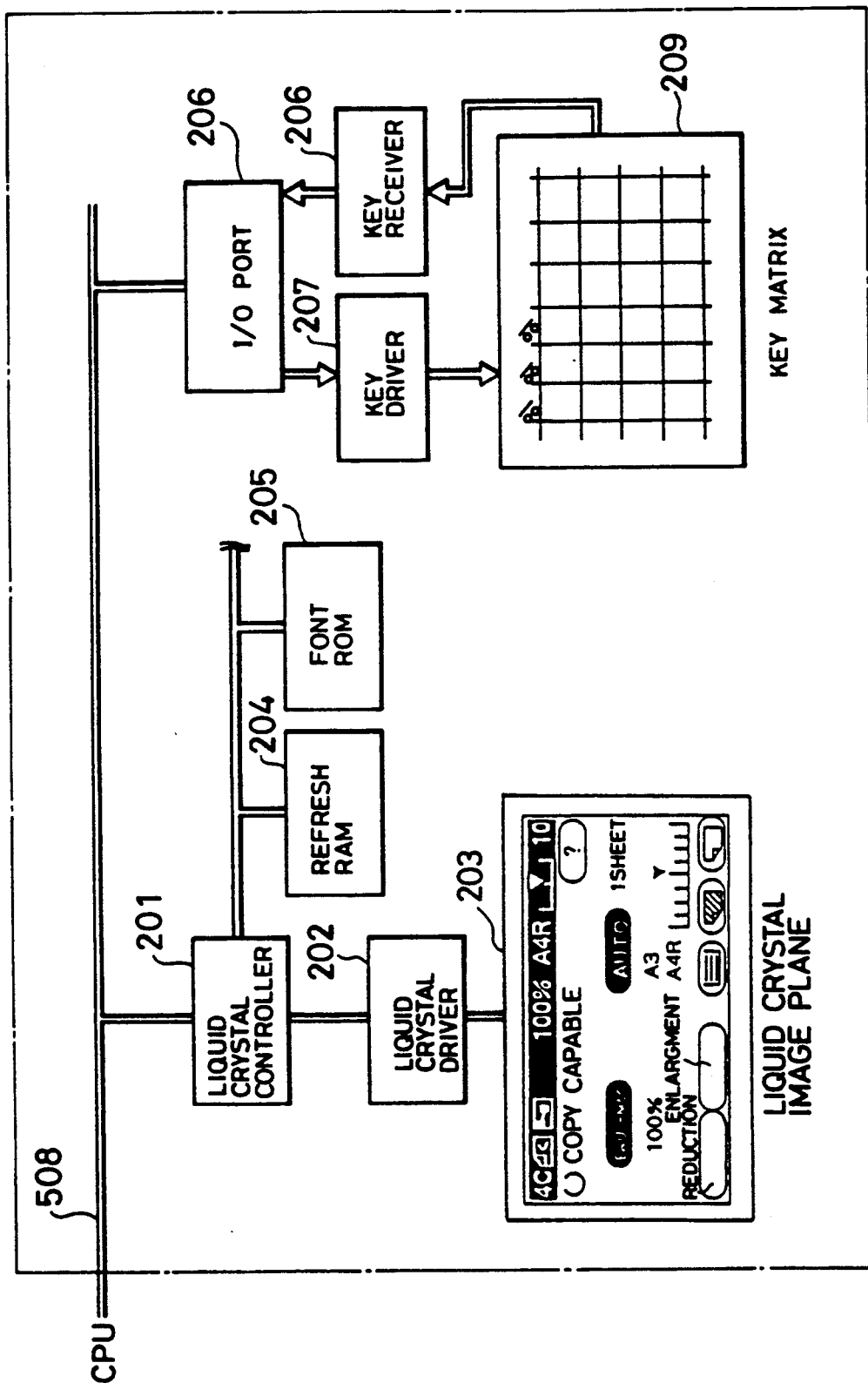
FIG. 22 is a circuit diagram of a control circuit in a control panel.

In FIG. 22, a reference numeral 200 denotes an original coordinates reconginition circuit adapted for recognizing coordinates of four corners of the original set on the original plate. The recognized coordinates are held in an internal register (not shown). After a preparatory scan for recognizing the original position, the CPU 22 reads the coordinate data from the register. This circuit is disclosed in the specification of U.S. patent application Ser. No. 946093 filed on Dec. 23, 1986 so that description thereof is omitted in this specification. In the preparatory scan conducted for the purpose of recognition of the original position, the black-level and white-level correction are executed as explained in connection with FIGS. 10 and 11A and, thereafter, the masking computing coefficients shown in FIG. 16A are set at $k_1$, $l_1$, $m_1$ for monochromatic image data are selected and, at the same time, $C_0$, $C_1$ and $C_2$ are set as (0.1,1). In addition, the signal UAREA 565 is set at "Lo" so that the UCR (undercolor removal) may not be conducted. The image data obtained under these conditions is input as monochromatic image data to the original position recognition circuit 200.

FIG. 22 shows the control panel, especially a liquid-crystal frame control portion and a key matrix. The control panel is connected to the CPU 22 through a CPU BUS 508. The control panel has a liquid display controller 201 controlled by an instruction given through the BUS 508, and a key matrix 209 for key-input and touch-key-input controlled through an I/O port 206. Fonts to be displayed on the liquid crystal display are stored in a font ROM 205 and are successively transferred to a refresh RAM 204 in accordance with the program given by the CPU 22. The liquid-crystal controller delivers a display date to the liquid-crystal display 203 through the liquid-crystal driver 202. On the other hand, all the key-inputs are controlled through I/O port 206. A key scan operation which is known per se is conducted to detect any pressed key and a signal corresponding to the pressed key is supplied to the CPU 22 through a receiver 208 via the I/O port.

Figure 23:
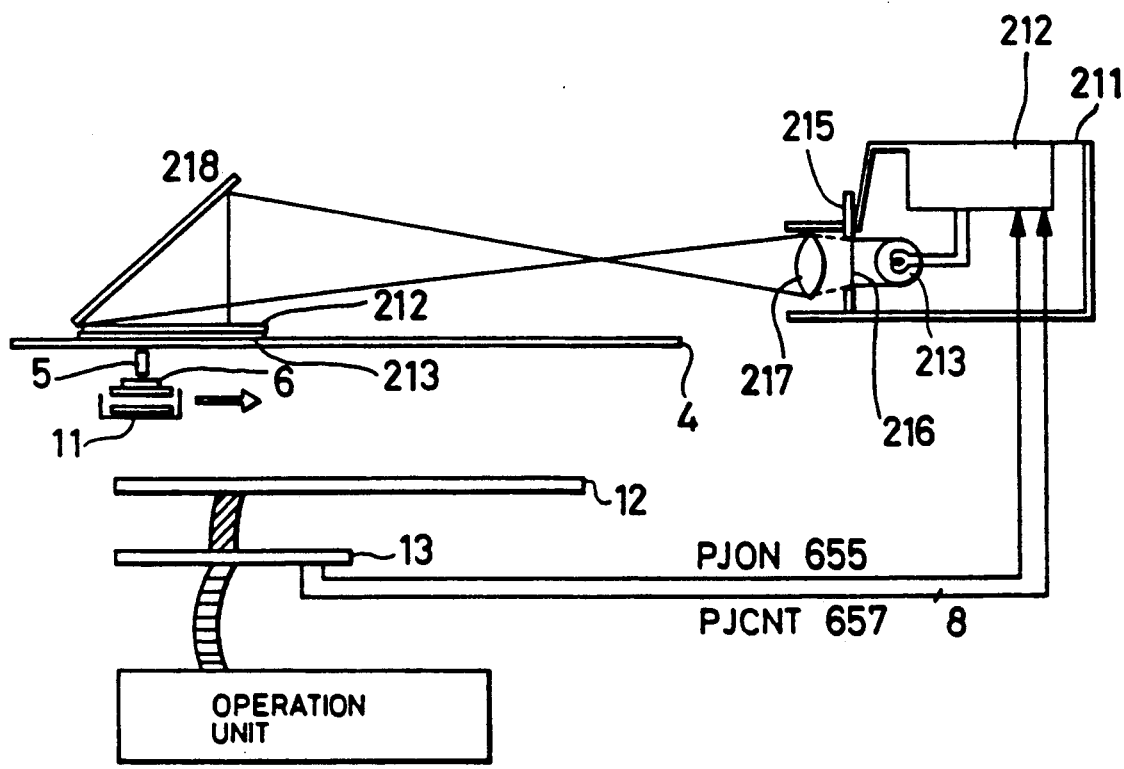
FIG. 23 is an illustration of the construction of a film projector.
Figure 24:
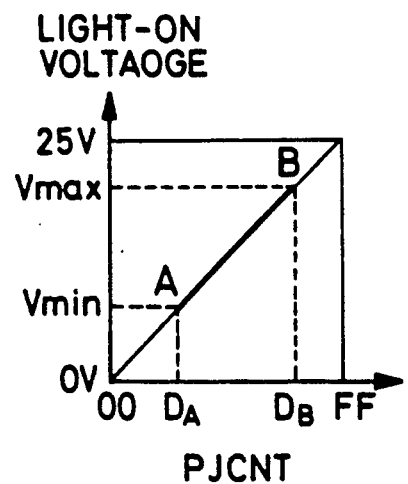
FIG. 24 is a diagram showing the relationship between a film exposure control input and lighting voltage.
Figure 25A:
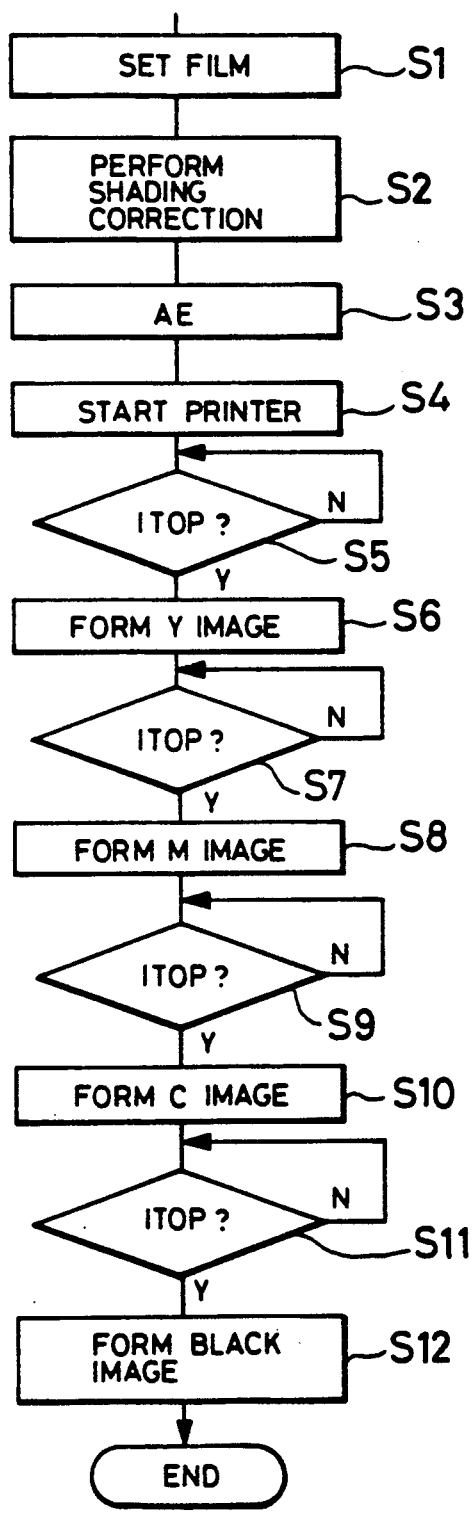
FIGS. 25A, 25B and 25C are illustrations of the manner in which the film projector is used.
Figure 25B:
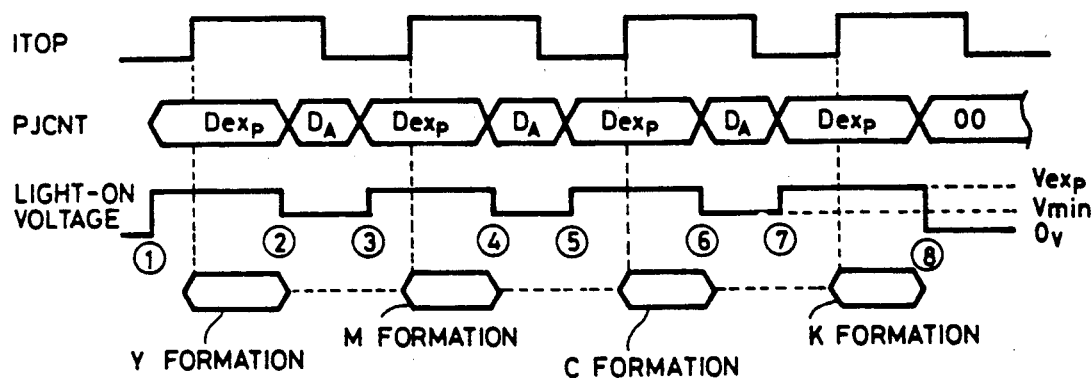

FIG. 23 shows an arrangement in which a film projector 211 is mounted on and connected to the system of the invention shown in FIG. 1. In this Figure, the same reference numerals are used to denote the same parts as those in FIG. 1. A mirror unit composed of a reflection mirror 218, a Fresnel lens 212 and a diffusion plate 213 is mounted above the original plate 4. The image of light transmitted through a film 216, projected from the film projector 211, is scanned in the direction of the arrow by the original scanning unit explained before, so that the light image is read in the same manner as that in the reading of an original placed on the original plate. The film 216 is fixed by a film holder 215, while a lamp controller 212 controls on and off, as well as lighting voltage, of a lamp 212, under the control of signals PJON 655 and PJCNT 657 which are delivered through the I/O port of the CPU 22 (see FIG. 2) of the controller 22. The lamp controller 212 is adapted to control the lamp lighting voltage within a range between Vmin and Vmax as shown in FIG. 24, in accordance with the 8-bit input PJCNT 657. The input digital data in this state is represented by $D_A$ to $D_B$. FIG. 25A shows the flow of operation for reading the image from the film projector and copying the read image, while FIG. 25B is a timing chart showing the timing of this operation. In Step S 1, the operator sets a film 216 on the film projector 211 and operates the control panel in a sequence which will be explained later so that the lamp lighting voltage Vexp is determined after a shading correction (Step S 2) and AE (Step S 3). Then, the printer is started in Step S 4. In advance to the ITOP (image end synchronizing signal) from the printer, the level of the signal PJCNT is set at Dexp which corresponds to optimum exposure voltage, whereby a stable light quantity is obtained when the image is formed. A Y image is formed by the ITOP signal and thereafter the lighting voltage is kept at a level $D_A$ corresponding to the minimum exposure voltage so as to maintain the lamp in a dark state until the next exposure is conducted. With this arrangement, it is possible to suppress degradation of the filament due to rush current which occurs when the lamp is turned on, thereby prolonging the life of the lamp. Then, similar steps are followed to form M image, C image and Bk image (Steps S 7 to S 12). Thereafter, the signal PJCNT is set at "00", thereby turning the lamp off.

The procedures of the AE operation and shading correction in the projector mode will be explained hereinunder with reference to FIGS. 29A and 29B. After selecting the projector mode through the control panel, the operator confirms whether the film used is a color negative film, a color positive film, a monochromatic negative film or a monochromatic positive film. When the film is a color negative film, the operator sets in the projector a film carrier having a cyan color compensation filter, and sets the unexposed portion (film base) of the film in a film holder. The operator then presses a shading start button while making selection of the ASA value of the film between 100 to 400 and above 400. In consequence, the projector lamps lits on with the standard lighting voltage $V_1$. The cyan filter cuts the orange base of the color negative film so as to attain a color balance of the color sensor which is provided with R, G and B filters. By picking up the shading data from the unexposed portion of the film, it is possible to obtain a wide dynamic range even when the film used is a negative film. When a film other than a negative color film is used, a film carrier 2 having an ND filter or having no filter is set and the shading start key on the liquid-crystal touch panel is pressed so that the projector lamp lights up with another standard lighting voltage $V_2$. The arrangement may be such that, once the operator has discriminated the type of film between negative and positive and selected the type of the film carrier, the switching between the standard lighting voltages $V_1$ and $V_2$ is conducted automatically upon recognition of the type of the film carrier. Subsequently, a scanner unit is moved to a region near the center of the image projection area, and the data corresponding to one CCD line or mean value of data over a plurality of CCD lines is picked up as the shading data and stored in the RAM 78' shown in FIG. 11A. The projector lamp is then turned off.

Then, the film 216 carrying the image to be copied is set on the film holder 215. If a focusing operation is necessary, the projector lamp is turned on by a lamp start button on the control panel and the focusing is conducted through a visual check of the focused image. Then, the lamp is turned off by the lamp start button.

Figure 25C:
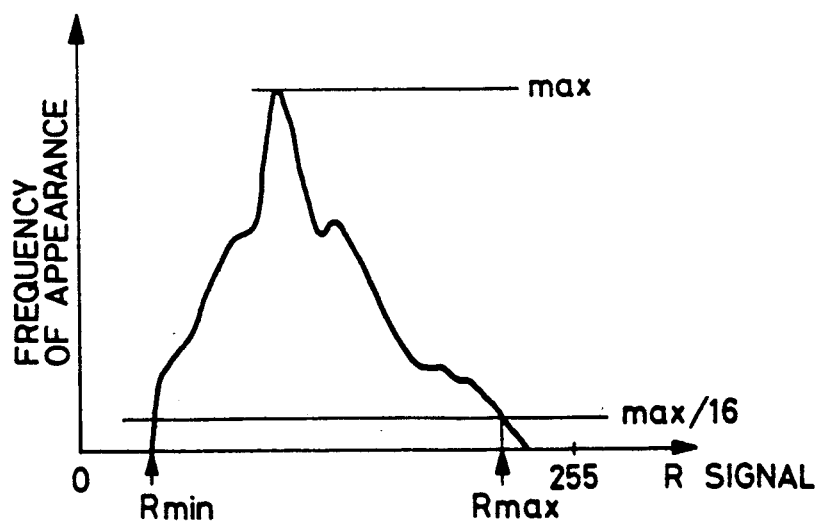

As a copy button is turned on, the projector lamp lights up with the standard voltage $V_1$ or $V_2$ depending on the result of discrimination of the film type between color film and other films, and a pre-scan (AE) of the image projecting portion is conducted. The pre-scan is effected in accordance with the following procedure for the purpose of judging the level at which the film as the copying object was exposed. R signals from predetermined plurality of lines in the image projection region are input through the CCD and data concerning the appearing frequency of the R signal are accumulated so as to form a histogram as shown in FIG. 25C (histogram forming mode in FIG. 11). The max value in this histogram is determined as illustrated and the points where a line of a level which is 1/16 of the maximum value is crossed by the histogram are determined as the maximum and minimum R signal values Rmax and Rmin. Then, the lamp light quantity multiplication factor $\alpha$ is computed in accordance with the type of the film initially selected by the operator. The value of the factor $\alpha$ is determined as $\alpha = 255/\text{Rmax}$ in case of a color or monochromatic positive film, $\alpha = C_1/\text{Rmin}$ in case of a monochromatic negative film, $\alpha = C_2/\text{Rmin}$ in case of a color negative film having ASA value of 400 or less, and $\alpha = C_3/\text{Rmin}$ in case of a color negative film having ASA value above 400. The factors $C_1$, $C_2$ and $C_3$ are beforehand determined in accordance with the gamma characteristic of the film, and are usually set between 40 and 50 or so out of 255 levels. The factor $\alpha$ is converted through a predetermined look-up table into an output data to be delivered to a variable voltage power supply for the projector lamp. The projector lamp lits on with the thus determined lamp lighting voltage V, and the logarithmic conversion table shown in FIG. 3A and the masking coefficients shown in FIG. 16A are suitably set so as to enable the apparatus to conduct ordinary copying operation. As shown in FIG. 3A, it is possible to select one out of eight tables 1 to 8 by mans of a 3-bit change-over signal as shown in FIG. 3A. Thus, the table 1 may be used for the reflection type original, while tables 2, 3, 4, 5 and 6 are used, respectively, for color positive films, monochromatic positive films, color negative films (ASA below 400), color negative films (ASA 400 or above) and monochromatic negative films. The contents of these tables should be settable for the respective colors R, G and B independently. An example of the contents of the table is shown in FIG. 13B.

The copying operation is thus completed. Before the copying of the next film is commenced, the operator checks for any change in the nature of the film, i.e., negative/positive and color/monochromatic and so forth. If there is any change in the nature of the film, the process returns to (A) in FIG. 29A. When there is no change, the process returns to (B) in FIG. 19A. Thereafter, the described operation is performed.

It is thus possible to obtain print outputs corresponding to the types of the film, i.e., negative, positive, color and monochromatic, set on the film projector 211. As will be seen from FIG. 23, in the illustrated embodiment, the film image is projected on the original plate in a greater scale. The enlarged image projected on the original plate naturally has fewer small letters. In the described embodiment, therefore, a gradation process is executed which is different from that conducted for the print output obtained from a reflective original. This is executed by a PWM circuit 788 in the print controller.

Figure 26A:
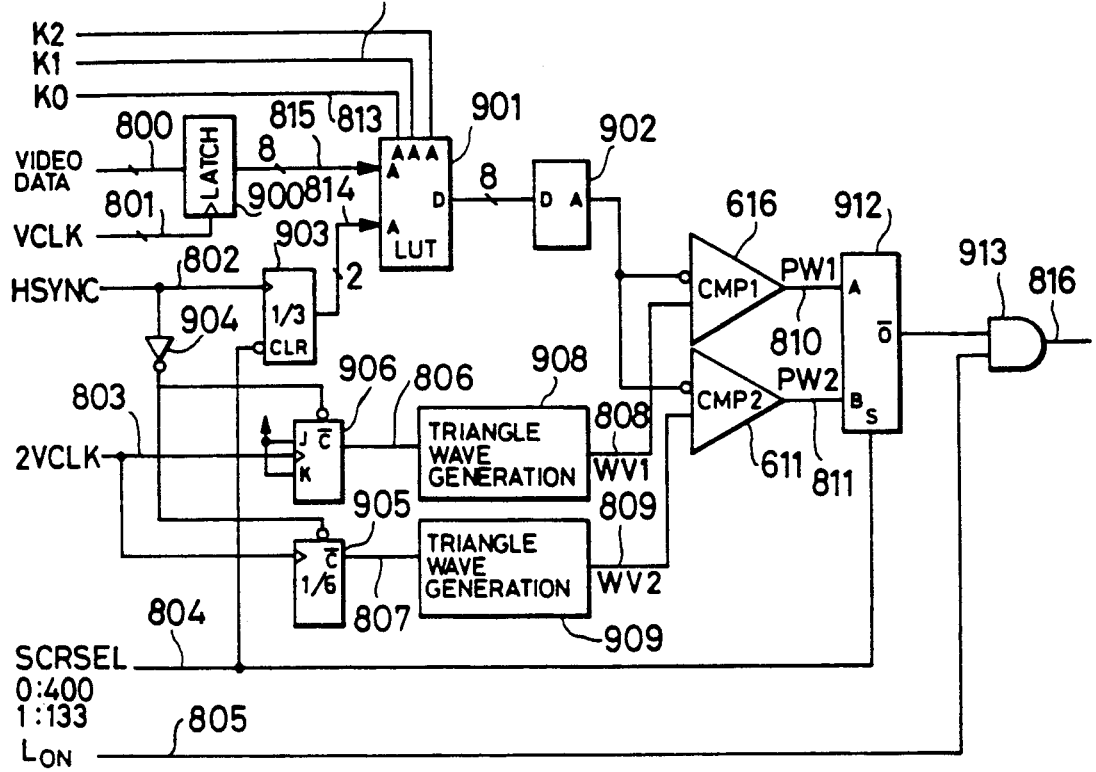
FIGS. 26A, 26B and 26C are illustrations of a PWM circuit and its operation.

The detail of this PWM circuit will be described hereinunder. FIG. 26A is a block diagram of the PWM circuit, while FIG. 26B is a timing chart illustrating the timing of operation of this circuit.

Figure 26B:
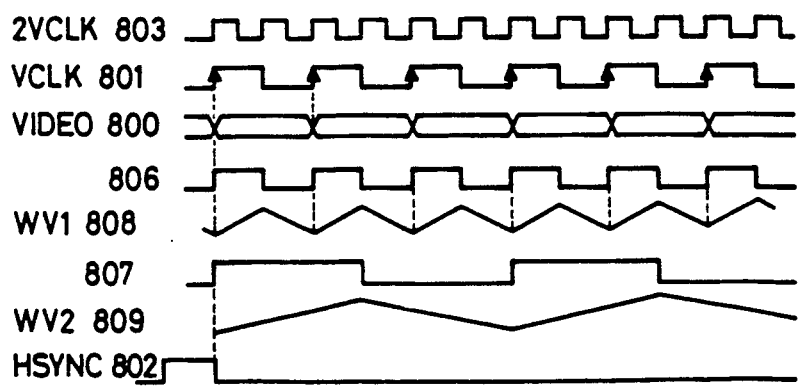
Figure 26C:
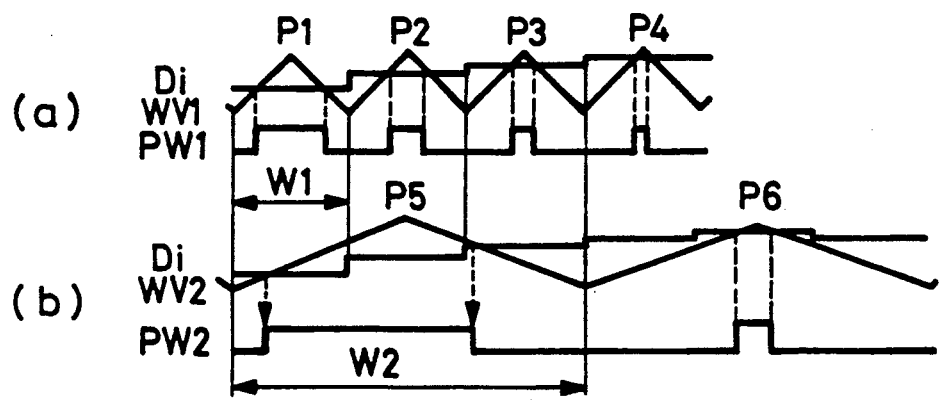

The input VIDEO DATA 800 is latched by the latch circuit 900 at the time of rise of the VCLK 801 and is synchronized with clocks (see 800 and 801 in FIG. 26B). The VIDEO DATA 815 output from the latch is delivered to a LUT (Look-Up Table) 901 composed of a ROM or a RAM, where a gradation compensation is effected. The gradation-compensated signal is then converted into a single analog video signal through a D/A converter 902, and the thus formed analog signal is input to comparators 910 and 911 so as to be compared with a later-mentioned triangular weave. The comparators 910 and 911 receive, at their other inputs, signals 808 and 809 which are triangular waves synchronized with VCLK and formed independently. More specifically, one of these two triangular waves is a wave WV1 which is generated by a triangular wave generating circuit 908 in accordance with a triangular wave generation reference signal 806 obtained by demultiplying, by a J-K flip-flop 906 for example, into ½ a synchronizing clock 2VCLK 803 which has a frequency twice as high the frequency of the clock VCLK 801. The other triangular wave is a wave WV2 which is generated by another triangular wave generating circuit 909 in accordance with a signal 807 (see FIG. 26B) which is obtained by demultiplying the signal 2VCLK into 1/6 by a demultiplying or frequency dividing circuit 905 designed to output 1/6 of the input frequency. As will be seen from FIG. 26B, the triangular waves and the VIDEO DATA are all synchronous with the VCLK. In addition, a signal inverted from the horizontal synchronizing signal HSYNC is applied to the circuits 905 and 906 so as to initialize these circuit at the timing conforming with the signal HSYNC, thereby causing the triangular waves and the VIDEO DATA to be synchronized with the signal HSYNC which also is generated in synchronization with VCLK. As a result of this operation, signals of pulse widths variable in accordance with the value of the input VIDEO DATA 800 are obtained at the outputs 810 and 811 of the comparators 910 and 911, respectively. Thus, in this system, the laser lights up when the level of the output from the AND gate 913 shown in FIG. 26 is "1" so that dots are printed on the print paper. When the level of the output from the AND gate 913 is "0", the laser does not operate so that no dot is printed. It is therefore possible to control the turning off of the lamp by LON 805. FIG. 26C shows a change in the level of the video signal D from "black" to "white" in the rightward direction. White and black levels are input to the PWM circuit as FF and 00, respectively, so that the output of the D/A converter 902 is changed as shown by a curve $D_i$ in FIG. 26C. On the other hand, the triangular waves are as shown by WV1 and WV2 in (a) and (b) of FIG. 26C. Therefore, the pulse widths of the outputs from the comparators CMP1 and CMP2 are progressively narrowed as the video signal level is shifted from "black" towards "white", as will be seen from curves PW1 and PW2. When the PW1 is selected, the pitch of the dots on the print paper is progressively changed as $P_1$ to $P_2$, $P_2$ to $P_3$ and $P_{43}$ to $P_4$. Thus, the variance of the pulse width has a dynamic range represented by W1. On the other hand, when PW2 is selected, the dot pitch is changed from $P_5$ to $P_6$. In this case, the dynamic range of the pulse width is W2 which is about three times as large as PW1. For instance, the printing density (resolution) is set to be about 400 lines/inch when PW1 is selected and about 133 lines/inch when PW2 is selected. From this fact, it will be understood that the resolution obtained when PW1 is selected is about 3 times as high as that obtained when PW2 is selected. On the other hand, when PW2 is selected, a remarkable improvement in the gradation is attained because the dynamic range of the pulse width in this case is about three times as wide as that obtained when PW1 is selected. Therefore, a signal SCRSEL 804 is supplied from an external circuit so as to select PW1 when a high resolutions required and to select PW2 when high degree of gradation is desired. In FIG. 26A, numeral 912 denotes a selector which selects the input A when the level of the signal SCRSEL 804 is "0" thereby selecting PW1 and, when the level of this signal is "1" selects PW2. PW1 or PW2 thus selected is output from the output terminal O and the laser is activated for a period corresponding to the finally obtained pulse width, thereby printing dots.

The Look-Up Table LUT 901 is constituted by a table-changeable ROM which is used for the purpose of gradation compensation. Upon receipt of address signals $K_1$, $K_2$ (812 and 813), as well as table change-over signal 814 and video signal 815, the LUT 901 produces corrected VIDEO DATA. For instance, when the signal SCRSEL 804 is set at "0" for allowing PW1 to be selected, all the outputs from the ternary counter 903 becomes "0" so that the correction table for PW1 in LUT 901 is selected. Levels of signals $K_0$, $K_1$ and $K_2$ are varied in accordance with the color of the signal to be output. For instance, outputs of yellow, magenta, cyan and black are obtained on conditions of $(K_0, K_1, K_2)=(0,0,0)$, $(K_0, K_1, K_2)=(0,1,0)$, $(K_0, K_1, K_2)=(1,0,0)$ and $(K_0, K_1, K_2)=(1,1,0)$, respectively. Thus, the gradation compensation characteristic is changed in accordance with the color of the image to be printed, thereby compensating for deviation of gradation characteristic attributable to a variation of image reproducing characteristic exhibited by the laser beam printer according to colors. It is possible to effect gradation compensation for wider range by combining $K_2$ with $K_0$, and $K_1$. For instance, it is possible to change the gradation characteristics of the respective colors in accordance with the type of the input image. When the signal SCRSEL is set at "1" for selecting PW2, the ternary counter 603 counts the synchronizing signals of the lines and repeatedly outputs "1"→"2"→"3" to the address 814 of the LUT. In consequence, the gradation compensation table is changed according to the lines, whereby a further improvement in the gradation characteristic is obtained.

Figure 27A:
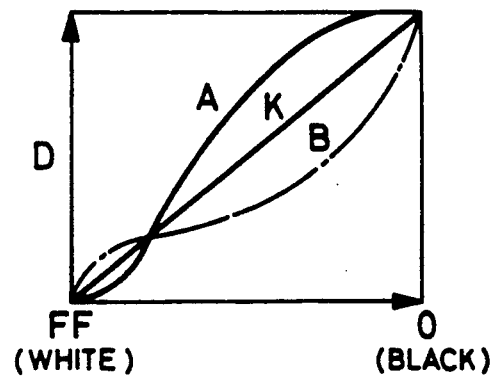
FIGS. 27A and 27B are characteristic charts showing gradation correction characteristics.
Figure 27B:
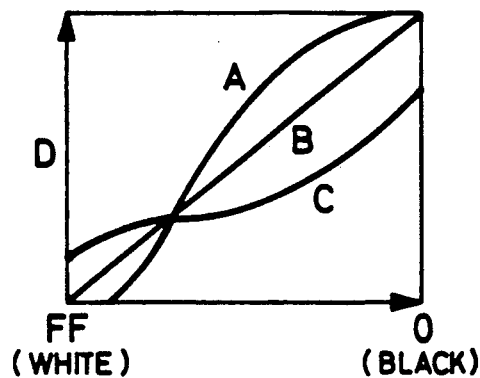
Figure 28A:
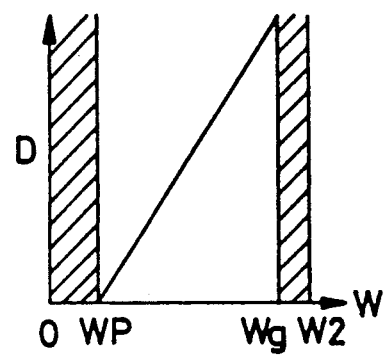
FIGS. 28A and 28B are illustrations between a triangular wave and laser lighting time.
Figure 28B:
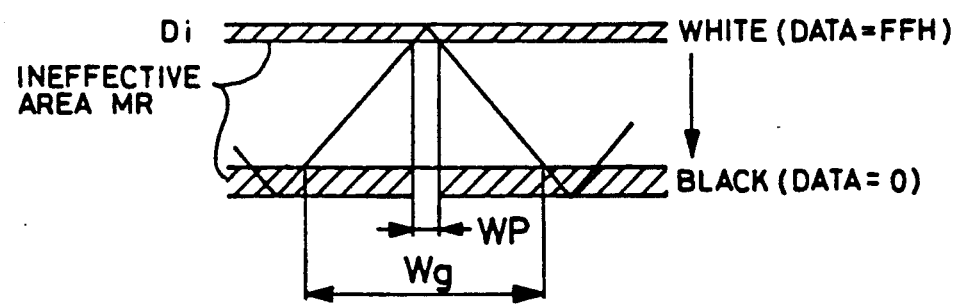

This operation will be described in detail with reference to FIGS. 27A and 27B. A curve A in FIG. 27A is a characteristic curve which shows the relationship between the input data and the printing density as obtained when the PW1 has been selected with the input data changed from "FF", i.e., white, to "0", i.e., black,. Preferably, this relationship is linear as shown by K. Therefore, a characteristic as shown by a curve B, which is an inverse to the curve A, is set in the gradation compensation table. FIG. 27B shows gradation correction characteristics A, B and C of the respective lines, as obtained when PW2 has been selected. The pulse width is changed by the triangular waves in the direction of main scan by the laser, and the gradation is varied in three stages in the direction of sub-scan, thereby improving the gradation characteristics. Namely, where the density change is steep, the characteristic A is dominant so as to provide a steep reproducibility, whereas gentle gradation is reproduced in accordance with the curve C. The curve B reproduces a gradation effective for the reproduction of intermediate level. It is thus possible to obtain an appreciable level of gradation at high resolution even when PW1 has been selected. In addition, an extremely high degree of gradation is obtained when PW2 has been selected. In regard to the pulse width when PW2 has been selected, the pulse width W ideally meets the condition of $0 \leq W \leq W2$. Actually, however, there is a region of pulse width which does not enable dots to be printed ($0 \leq W \leq wp$ in FIG. 28A, as well as a region in which printing is saturated ($wq \leq W \leq W2$ in FIG. 28A), due to restriction imposed by the electrophotographic characteristic of the laser beam printer and response characteristics of the laser driving circuit and other portions. The pulse width is therefore determined to fall within the range of $wp \leq W \leq wq$ which provides a linear relation between the pulse width and the density. Thus, when the input data is changed from "0" (black) to FFH (white) as shown in FIG. 28B, the pulse width changes from wp to wq, thus assuring a high linearity between the input data and the density.

The video signal thus converted into pulse width is delivered to the laser driver 711L through the line 224 so as to modulate the laser beam LB.

The signals $K_0$, $K_1$, $K_2$, SCRSEL and LON as shown in FIG. 26A are output from a control circuit (not shown) provided in the printer controller 700, on the basis of the serial communication between the reader portion 1 and the controller. The signal SCRSEL is set at "0" and "1", respectively, when an image on a reflective original is read and when a film projector is used, thus providing a higher smoothness of the gradation.

<Image Forming Operation>

The laser beam LB modulated in accordance with the image data is reflected by the polygon mirror 712 rotating at a high speed so as to scan horizontally at high speed with a scanning width indicated by arrows A-B, and is focused on the surface of a photosensitive drum 715 through the $f/\theta$ lens 13 and the mirror 714, thereby effecting dot exposure corresponding to the image data. One horizontal scan of the laser beam corresponds to one horizontal scan of the original. In this embodiment, this corresponds to the width of 1/16 mm in the direction of feed, i.e., in the direction of sub-scan.

The photosensitive drum 715 is rotating in the direction of an arrow L at a constant speed. Thus, the main scan on the drum surface is effected by the scanning of the laser beam, while the sub-scan is effected by the rotation of the photosensitive drum, so that the drum surface is progressively exposed to form a latent image. The photosensitive drum surface has been uniformly charged in advance of the exposure, by means of the charger 717. Toner images is formed as a result of a series of operation including the uniform charging, exposure and development by toner on a developing sleeve 731. For instance, if the development is conducted by yellow toner on the developing sleeve 731Y in response to the first exposure in the color reader, a toner image corresponding to the yellow component of the original 3 is formed on the surface of the photosensitive drum 715.

Then, by a transfer charger 729 provided in the region of contact between the photosensitive drum 715 and the transfer drum 716, the yellow toner image is transferred to a paper 754 which is wound on the transfer drum 716 with its leading end gripped by the gripper 751. The described operation is conducted also for the M (magenta), C (cyan) and Bk (black) images so that the toner images of different colors are superposed on the paper 754, whereby a full-color image is formed by toners of four colors.

Subsequently, the transfer paper 791 is separated from the transfer drum 716 by a movable separation claw 750, and is introduced to an image fixing section 743 where heat and pressure are applied by means of heat-pressing rollers 744, 745 thereby to melt and fix the toner image.

<Description of Control Section>

Figure 31:
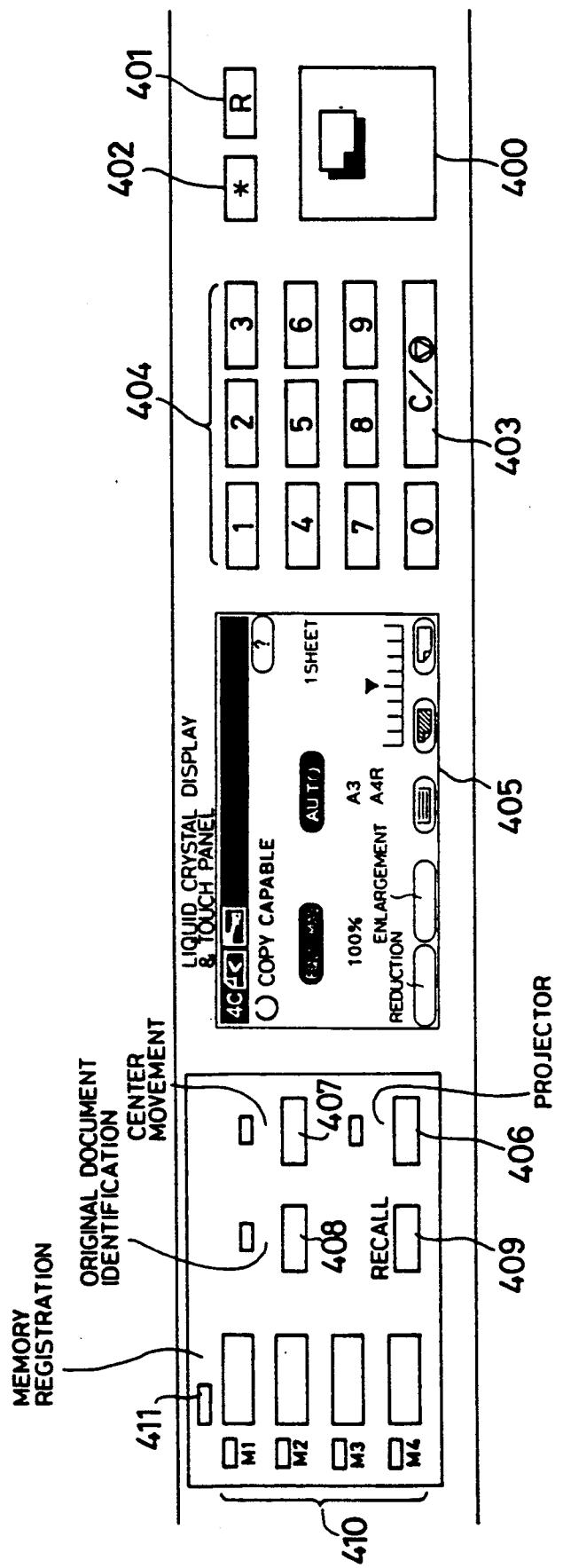
FIG. 31 is a top plan view of a control section.

FIG. 31 illustrates the control panel in the control section of the color copying apparatus of the invention. The control panel has a reset key 401 for resetting the operating condition to a standard mode, enter key 402 for allowing setting of a registration mode or service mode which will be explained later, ten-key device 404 for setting numerical values such as number of copies to be obtained, clear/stop key 403 for clearing the remaining number of copies or dismissing continuous copying mode, and a device 405 which permits setting of various modes through a touch panel key and for displaying the state of the printer. A center shift key 407 is used for appointing a center shifting operation in a shifting mode which will be explained layer. An original recognition key 408 is used for automatically detecting the original size and original position when copying. A numeral 406 denotes a projector key for appointing the projector mode. A recall key 409 is used for recovering previously set copying condition. Numeral 410 represent memory keys (M1, M2, M3, M4) for storing or recalling set values of various modes which are beforehand programmed. A numeral 411 denotes a registration key for allowing data to beset in the respective memories.

<Digitizer>

Figure 32:
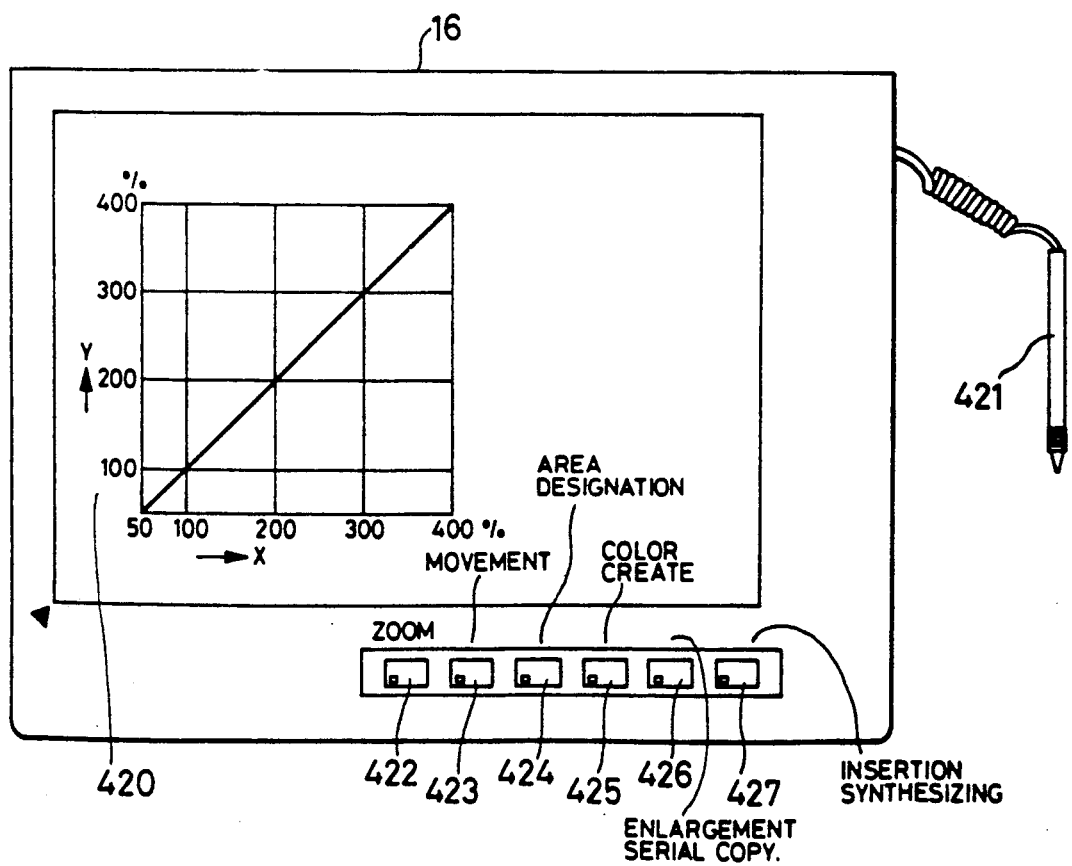
FIG. 32 is a top plan view of a digitizer.

FIG. 32 shows the appearance of the digitizer 16. The digitizer 16 has entry keys 422, 423, 424, 425, 426 and 427 for setting various modes which will be explained later. The digitizer further has a coordinates detection plate 420 for appointing a desired area on the original and for setting magnification. A point pen 421 is used for the purpose of appointing the coordinates. The inputs through these keys and the coordinates input data are exchanged between the CPU 22 and the digitizer through a BUS 505, so that these data are stored in the RAMs 24 and 25.

<Description of Standard Frame>

Figure 33:
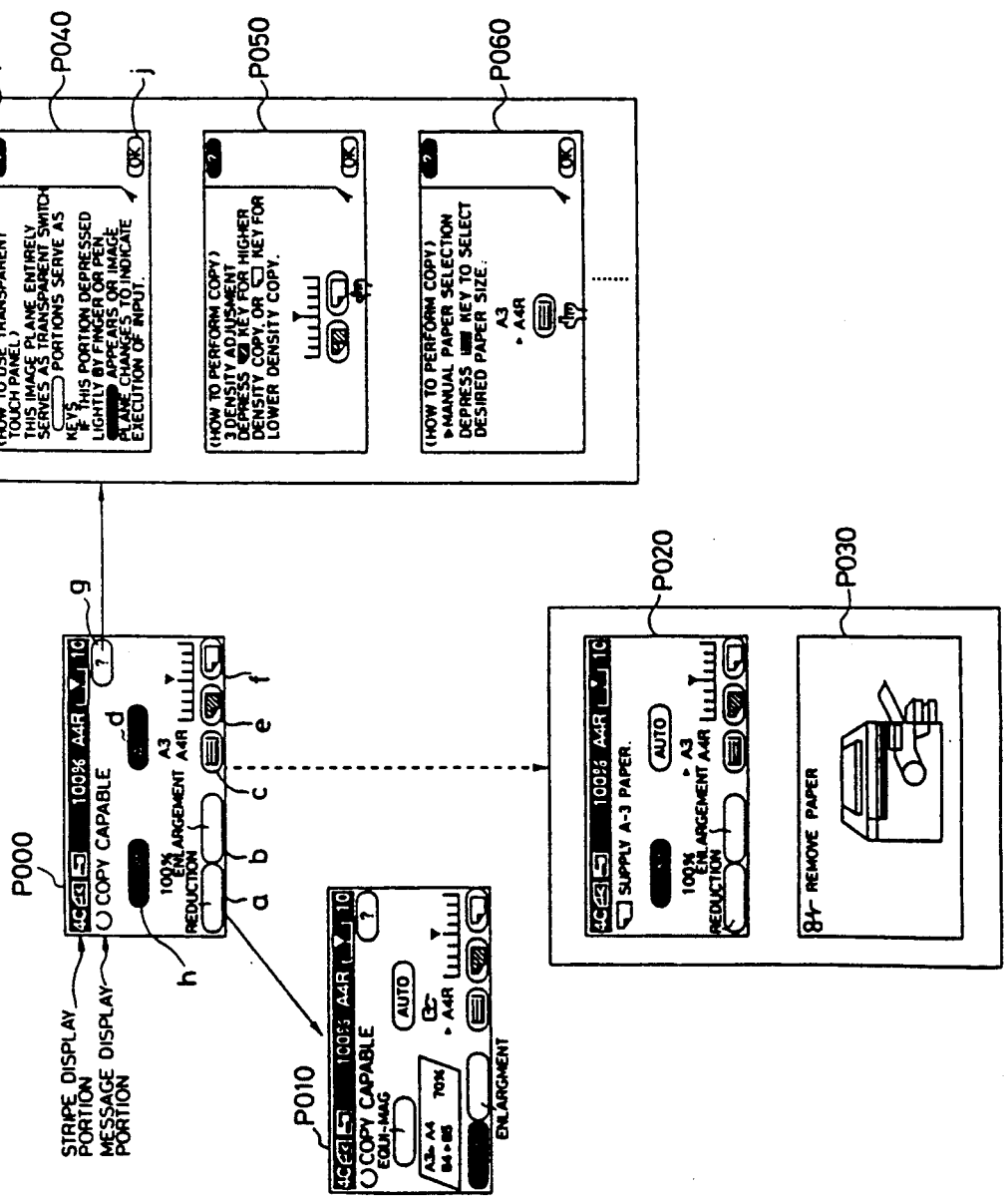
FIG. 33 is an illustration of a standard display pattern of liquid crystal display.

FIG. 33 illustrates a standard frame. The frame P000 is displayed during copying or when no setting is being conducted. This frame enables the user to set the magnification, as well as to select the type of paper and to adjust the density. The area on the left lower corner of the frame enables the user to appoint a so-called constant magnification mode. For instance, when a touch key a (contraction) is pressed, the change in the size and the magnification are displayed as shown in the frame P010. Conversely, when a touch key b (enlargement) is pressed, the size and the magnification are displayed similarly. The color copying apparatus of this embodiment enables the user to select one of three stages of contraction and three stages of enlargement. When it is desired to recover the real-size mode, a touch key h (real size) is pressed so that the real size (100%) is recovered. Selection between an upper cassette and a lower cassette is possible by means of a touch key c which is provided at the center of the display. The user also can select APS (Auto Paper Select) mode in which the cassette containing paper of the size matching with the original size is automatically selected, by pressing a touch key d. Touch keys e and f on the right part of the display are for effecting adjustment of density. These keys are operable even during copying. When a touch key g is pressed, a display is made as to the functions of the touch keys and the method of operating the copying apparatus. The operator therefore can easily control the apparatus upon consultation with the content of this display. Frames explanatory of later-mentioned setting modes are also prepared so as to be looked into during operation in these setting modes.

A black striped display on upper part of the frame displays the states of various modes which are being used, so as to eliminate any possibility of wrong operation and confirmation of the setting.

A message display area under the black striped display is adapted for displaying various messages e.g., the state of the color copying apparatus such as that shown in the frame P020, messages concerning wrong operation, and so forth. In the event of a paper jam or shortage of a toner, the whole portion of the printer is displayed on the frame so as to enable the operator to know at a glance where the paper is jamming and what color of toner is needed.

<Zooming Mode>

The zooming mode M100 is a mode which enables the size of the print to be varied for fixed sizes of original. The zooming mode includes a manual zooming mode M110 and an auto-zooming mode M120. When the manual zooming mode M110 is selected, the user can vary the magnification for every 1% both in the direction of main scan (Y direction) and in the direction of sub-scan (X direction), through an editor or the touch panel. The auto-zooming mode M120 is a mode which automatically computes and adopts optimum magnification in accordance with the size of the original and the size of the paper selected. The auto-zooming mode includes four types of sub-modes, i.e., XY independent auto-zooming mode, XY equal zooming mode, X auto-zooming mode and Y auto-zooming mode. When the XY independent auto-zooming mode is selected, the magnifications in the X and Y directions are automatically controlled and set such that the whole or an appointed region on the original are copied in the full size of the selected paper. When the XY equal auto-zooming mode is selected, the magnifications are computed for both of the X and Y directions and the actual magnification is selected equally in both directions in conformity with the smaller one of the computed magnifications. In the X auto-zooming mode and the Y auto-zooming mode, magnifications are determined only in X direction and Y direction, respectively.

Figure 34:
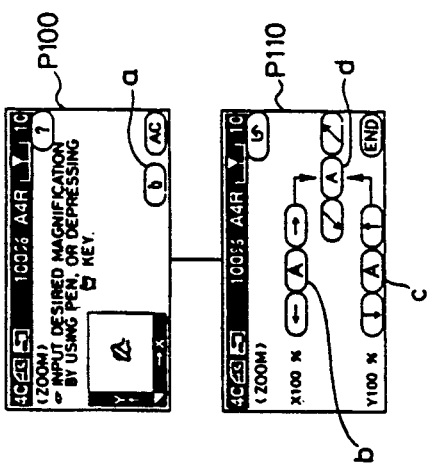
FIG. 34 is an illustration of operation in zoom mode.

The method of operation in the zooming mode will be described with reference to the liquid-crystal panel. When a zoom key 422 on the digitizer 16 is pressed, the display is changed to the frame P100 shown in FIG. 34. When the user wishes to effect manual zoom setting, he points by the point pen 421 the point where the rows of magnifications in X and Y directions written on the coordinates detection plate 420 cross each other. In consequence, the display is changed to the frame P110 and the appointed magnifications in X and Y directions are displayed. For effecting a further fine adjustment of magnification, if the fine adjustment is to be conducted only in X direction, the operator presses one of up and down keys which are provided on the left and right sides of the touch key b. When the fine adjustment is to be made both in X and Y directions at an equal rate, the operator uses keys which are on the left and right sides of the touch key d. In this case, the displayed magnification factors in X and Y directions are changed at an equal rate. For the purpose of selecting the auto-zooming mode, the operator proceeds the display from the frame P100 to P110 by pressing the touch key a or by using the digitizer 16. The operator can then appoints one of the four types of sub-modes, i.e., the XY independent auto-zooming mode, XY equal auto-zooming mode, X auto-zooming mode and Y auto-zooming mode, by pressing touch keys b, c, touch key d, touch key b and touch key c, respectively.

<Shifting Mode>

Figure 43:
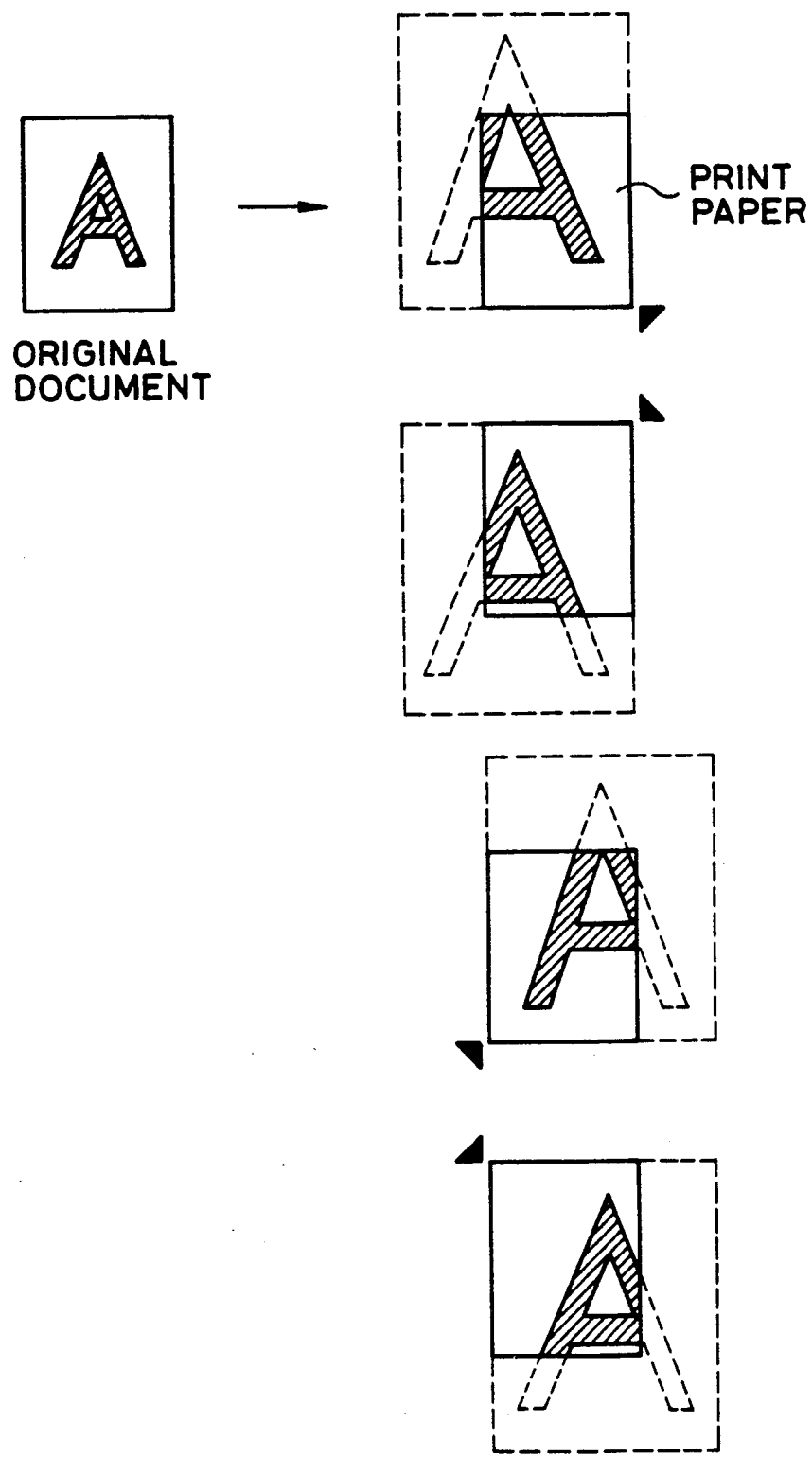
FIG. 43 is an illustration of the print image as obtained when the corner moving operation is conducted.

The shifting mode M200 includes four modes: namely, center shifting mode M210, corner shift mode M230, position appointing shifting mode M230 and binding margin shifting mode M240. The center shifting mode is a mode which enables the image of the whole or appointed region on the original to be copied in the central region of the copy paper. The corner shifting mode M220 is a mode which enables the image on the whole or an appointed region of the original to be copied near one of four corners of the copy paper. This mode is performed even when the size of the print image is greater than the paper size as shown in FIG. 43, so as to position the copy image with reference to the appointed corner. The position appointing shifting mode M230 is a mode which enables the image of the whole or an appointed region of the original to be copied on any desired portion of the copy paper. When the binding margin shifting mode M240 is selected, the image is shifted such as to leave binding margin on the left and right sides of the copy paper as viewed in the direction of paper feed.

The actual operating method for shifting copy position on this color copying apparatus will be explained hereinunder with reference to FIG. 35A. When the operator presses a shift key 423 of the digitizer, the display is changed to the frame 200 which presents four modes for selection by the operator.

The center shifting mode can be appointed and accomplished by pressing the touch key a on the frame P 200. When it is desired to conduct corner shifting, the operator presses the touch key b so that the display is changed to the frame P230 so as to enable the operator to appoint one of four corners. The relationship between the direction of shifting on the actual copy paper and the direction of appointment on the frame P230 is such that as shown in FIG. 35B, the paper of the selected cassette is directly placed on the digitizer 16 without changing its orientation.

When the operator wished to conduct the position appointing shifting, he presses the touch key c on the frame P 200 so that the display is changed to frame P 210 so as to enable the user to appoint the destination by means of the digitizer 16. In this case, the display is changed to the frame P 211 so that the operator can further effect fine adjustment by means of the up and down keys. For conducting the shifting in binding margin mode, the operator presses the touch key d and then appoints the size of the margin through up and down keys on the frame P 220.

<Description of Area Appointing Mode>

The area appointing mode M 300 enables the operator to appoint one or more regions on the original. There are three modes, i.e., a trimming mode M 310, a masking mode M 320 and an image separation mode M 320 are available for each of the appointed areas. The trimming mode M 310 is a mode which enables only the region inside the appointed area to be copied, while the masking mode M 320 is a mode for producing a copy while placing a white image or mask on the area inside the appointed region. The image separation mode M 330 is is further divided into sub-modes including a color mode M 331, a color conversion mode M 332, a paint mode M 333, a color balance mode M 334 and a free color mode M 335. The color mode M 331 enables the operator to apply to the appointed region one from nine modes: namely, a four-color mode, three-color mode, Y color mode, M color mode, C color mode, Bk color mode, RED color mode, GREEN color mode and BLUE color mode.

The free color mode M 335 enables the operator to obtain monochromatic image of a color other than the above-mentioned seven mono-colors, in the appointed region of the image.

The color conversion mode is a mode which a selected color portion of a predetermined range of density in the appointed region to be copied in a desired different color.

The paint mode M 333 is a mode which produces the copy such that whole area of the appointed region is painted in a desired different color. The color balance mode M 334 is a mode which effects controls of densities of Y, M. C and Bk colors in the appointed region so as to produce a copy in which the appointed region exhibits a color balance (color tone) different from that in other regions.

The practical method of the operation in area appointing mode M 300 will be explained with reference to FIG. 36.

The liquid crystal display is changed to show a frame P 300 as the operator presses the area appointing key 424 on the digitizer. The operator then places the original on the digitizer 16 and appoints the designated region by the point pen 421. When two points in the region are pointed, the display is changed to the frame P310. If the designated region has been correctly appointed, the operator presses the touch key a on the frame P 310. Then, the operator selects one of the trimming mode, masking mode and image separation mode, by pressing the corresponding key displayed on the frame P 320. If the appointed mode is the trimming mode or the masking mode, the operator presses the touch key a on the frame P 320 and appoints the next region. However, when the image separating mode is selected, the display is changed to a frame P 330 so as to enable the operator to select one from the color conversion mode, paint mode, color mode, color balance mode and the free color mode. For instance, if the operator wishes to print the image in the appointed region in four-full-color having Y, M. C and Bk components, he touches the touch key a (color mode) on the frame P 330 and then touches the touch key a in the frame P 360, whereby the operation for appointing four-full-color printing of the designated region is completed.

When the operator has pressed the touch key b on the frame P 330 to appoint the color conversion, the display proceeds to a frame P 340 so that the operator can point, by means of the point pen, a point which is inside the appointed region and which has the color data which the operator wishes to change into another color.

The color conversion is therefore conducted. The operator is allowed to vary the range of color to be converted, by means of a conversion range appointing key which is on the center of the frame P 341. The term "range of conversion" is used to mean the tolerance or range of the color data which can be regarded as being identical to the color data of the appointed point. If the conversion range is widened by means of the touch key b, the color conversion is effected over a wide area which includes points of color data considerably different from that of the appointed point. Conversely, when the conversion range is narrowed by means of the touch key c, the color conversion takes place only a restricted area carrying color data close to that of the appointed point.

If the position has been appointed correctly, the operator presses the touch key a on the frame P 341 so that the display proceeds to a frame P 370. This frame P 370 is intended for allowing the operator to select the designated color, i.e., color to which the color of the appointed region is to be changed. The operator can select one from standard color mode, designated color mode, registered color mode and white color mode. When the designated color is to be selected from standard colors, the operator touches the touch key a on the frame P 370 so that a frame P 390 is displayed to present seven colors, i.e., yellow, magneta, cyan, black, red, green and blue. The operator can therefore appoint one of these colors. Thus, the standard colors are color data which are inherently possessed by the color copying apparatus. In the illustrated embodiment, color component ratios are set as shown in FIG. 45, so as to provide a moderate density level of the print image. It is quite natural that the operator sometimes wishes to obtain a color which is slightly thinner or thicker than a standard color. To comply with such a demand, a density appointing key on the center of the frame P 390 is adapted to be pressed by the operator so as to provide the desired color density.

When the operator has touched the touch key c on the frame P 370, the display proceeds to the frame P 380. The operator then points a point having the color data which he wishes to obtain after the color conversion. Then, the display proceeds to a frame P 381. If it is desired that the color conversion be effected through a change in the density solely, the operator presses the density control key a on the center of the frame P 381, so that the color conversion is effected with the desired color density.

When the desired color cannot be found on the frame P 370 nor on the original, the user can conduct the color conversion by making use of color data. To this end, the operator touches the touch key c on the frame 370 so that the display is changed to a frame P 391 which show a plurality of registered colors. The operator then presses the touch key corresponding to the color in which he is interested. In this case also, the conversion can be conducted by changing the density of the registered color, without changing the color component ratio. When the operator has pressed the touch key c (white) in the frame P 370, the same effect as that produced by in the masking mode M 310 is obtained.

When the user wishes to appoint the paint mode M 333 in the image separation mode, he touches the touch key c on the frame P 330 so that the display proceeds to the frame P 370. Then, the color with which the painting is to be made is appointed in the same manner as that explained with reference to the frame P 370 in connection with the color conversion mode M 332.

When it is desired to print only the area within the appointed region at a desired color balance (color tone), the operator touches the touch key d (color balance). As a result, the display is changed to a frame P 350 which enables the operator to adjust the densities of the toner components of the printer, i.e., yellow, magenta, cyan and black, by making use of an up and down touch keys. The state of appointment of the density is represented by black bar graph on the frame P 350. In order to facilitate the judgment of the density, a scale is placed along the bar graph.

When the touch key e for appointing the free color mode is pressed on the frame P 330, the display proceeds to a frame P 361 which enables the operator to a mono-color either from the designated colors or the registered colors.

When the touch key a is touched on the frame P 361 so as to select the designated color mode, the display proceeds to a frame P 362 which enables the operator to appoint a point of the desired mono-color data by means of the point pen. In this case also, it is possible to conduct the color conversion in the free color mode by varying the density solely, without changing the color component ratio, by pressing the density control key a on the frame P 363.

Then, as the operator touches an OK key b on the frame P 363, the display proceeds to a frame P 365. In this state, it is possible to conduct the color conversion in free color mode, by inputting the position of the reference color data which is to be changed into the color data appointed in the frame P 362.

When the operator has pressed the touch key b on the frame P 361 so as to select the registered color mode, the display proceeds to a frame P 364 which presents a plurality of registered color data for selection by the operator. In this case also, the color conversion may be effected by changing the density solely, without varying the color tone.

It is also possible to proceeds the display to the frame P 365 by pressing the OK key on the frame P 364, so as to enable the operator to select the free color mode which make the density of the reference color appointed on the frame P 365 coincide with that of the registered color appointed on the frame P 364.

<Description of Color Create Mode>

In the color create mode M 400 shown in FIG. 37, it is possible to select one or more of six types of mode: namely, a color mode M 410, a color conversion mode 420, a paint mode M 430, a sharpness mode M 440, a color balance mode M 450 and a free color mode M 460. Amongst these six modes, the color mode M 410, the color conversion mode 420, the paint mode M 430, the color balance mode M 450 and the free color mode M 460 are the same as corresponding modes M 331, M 332, M 333, M 334 and M 335 in the area appointing mode M 300, except that the modes in the color create mode M 400 apply to the whole area of the original, in contrast to the functions of the position appointing mode which function only on the appointed region or regions of the original. These five modes, therefore, are not described.

The create color mode has the sharpness mode M 440 which enables the operator to adjust the sharpness of the image. This adjustment is effected by, for example, conducting edge stressing operation for stressing edges of character images or by imparting a smoothing effect on halftone dot image. The sharpness mode M 440 is a mode which enables permits the adjustment of the edge stressing an smoothing effects.

The manner in which the color create mode (1) is set will be explained with reference to FIG. 37. When the color create mode key 425 on the digitizer is pressed, the display proceeds to a frame P 400. The display further proceeds to a frame P 410 as the touch key (color mode) on the frame P 400 is pressed. The color mode to be copied is selected on the frame P 410. When a mono-color mode, i.e., a mode other than four-color and three-color modes is selected as the desired mode, the display proceeds to a frame P 411 which allows selection between negative and positive. When the touch key c (sharpness) on the frame P 400 is pressed, the display is changed to a frame P 430 so that the operator can adjust the sharpness of the copy image.

When a touch key i for strengthening the edge stressing effect is pressed on the frame P 430, the amount of edge stressing is increased as explained before so that fine lines such as lines of characters or letters can be copied with a high degree of sharpness. On the other hand, when a touch key h is pressed, smoothing of the peripheral image portion is enhanced to provide a greater smoothing effect so as to reduce the tendency of generation of Moire which tends to appear when the image has halftone dots.

The operations in the color conversion mode M 420, paint mode M 430 and the color balance mode M 450 are not described before they are materially the same as those in the area appointing mode.

<Description of Fitting Synthesizing Mode>

Figure 42A:
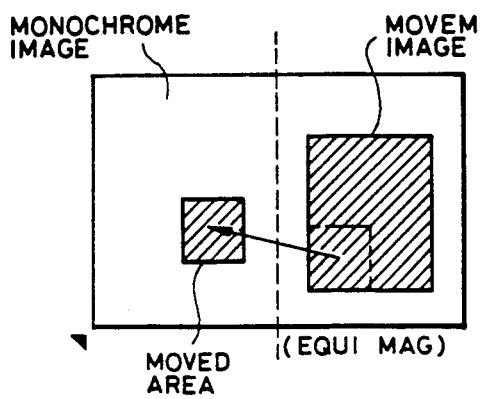
FIGS. 42A to 42G are illustrations explanatory of the fitting synthesizing mode.
Figure 42B:
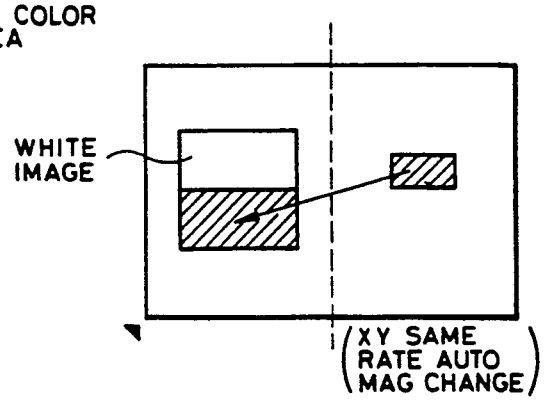
Figure 42C:
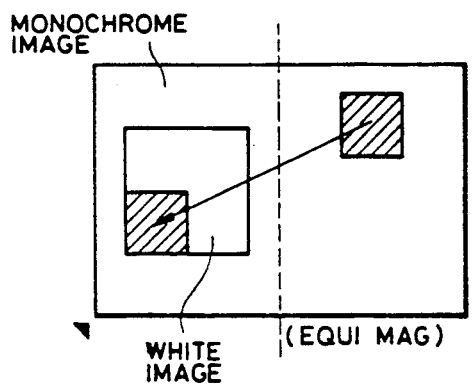
Figure 42D:
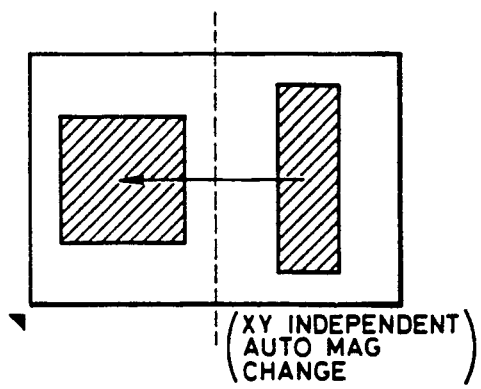
Figure 42E:
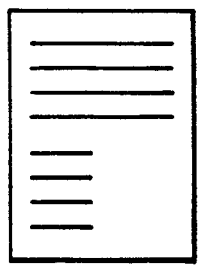
Figure 42F:
Figure 42G:
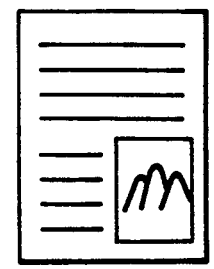

The fitting synthesizing mode M 6 is a mode in which an appointed color image region of an original such as that shown in FIG. 42F is fitted into an appointed monochromatic or color image region of another original such as that shown in FIG. 42E in real-size or in a differenct scale, so as to form a synthetic print image such as that shown in FIG. 42G.

Figure 39:
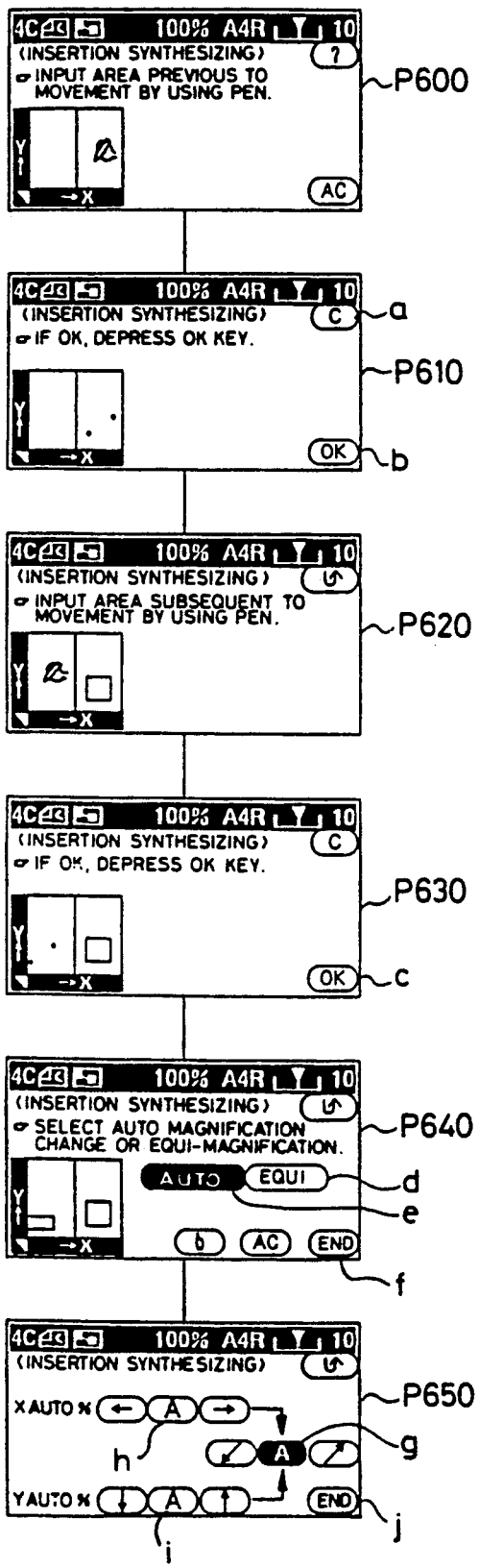
FIG. 39 is an illustration of operation in fitting synthesizing mode.

The method for setting this mode will be explained with reference to the illustration on the liquid panel and the touch key operation. As the first step, the original is placed on the coordinates detection plate of the digitizer 15 and a fitting synthesizing key 427 which is the entry key of this mode is pressed, so that the liquid crystal display is changed from the standard frame P000 shown in FIG. 33 to a frame P 600 shown in FIG. 39. Then, the color image region to be moved is appointed by pointing two points on a diagonal line of this region by means of the point pen 421. As a result, dots are displayed at two points on the liquid crystal display P 610 which are substantially the same as the appointed points. If another region is to be appointed, the operation presses a touch key a on the frame 610 so as to appoint a new pair of points. If the desired region is correctly appointed, the operator presses the touch key b and, thereafter, appoints two points on a diagonal line of the destination monochromatic image region by means of the point pen 421. If the destined region is correctly appointed, the operator presses the touch key c on the frame P 630 so that the display is changed to a frame P 640 which enables the user to appoint the magnification of the color image to be moved. If the color image is to be moved in real-size, the operator presses a touch key d, thereby completing the touch-key input. If the size of the image region to be moved is greater than the size of the destined region as shown in FIG. 42A, the moved image is fitted in accordance with the form of the destined region, whereas, when smaller than that of the destined region, a white blank is formed in the synthesized image, as shown in FIG. 42B. Such fitting operation is conducted automatically.

When it is desired to fit the appointed color image region in the destined region after changing the size of the image region, the operator touches a touch key e on the frame P 640. As a result, the display is changed to frame P 650 which enables the user to freely select magnifications both in the X direction (sub-scan direction) and Y direction (main scan direction), in the same manner as that explained before in connection with the zooming mode. It is possible to automatically change the size of the moved image region at the same rate in both directions X and Y, the key display is reversed by pressing a touch key g on the display frame P 650. When it is desired to print the moved color image region in the same size as the destined region, the key display is reversed by touching both the touch keys h and i. It is also possible to effect manual setting of the size of the moved image region only in X direction, only in Y direction or in both directions with the same size changing ratio, by means of the up and down touch keys.

After completion of the setting in the manner described, the operator presses a touch key j so that the display is reversed to the standard frame P0000, thus completing the setting for the fitting synthesizing operation mode.

<Enlarging Continuous Copying Mode>

The enlarging continuous copying mode M 500 is a mode in which the whole or selected region of the original to be copied is automatically divided into two areas and the sections of the original image are copied on different sheets of copy paper, when the size of the copy image magnified with a desired magnification exceeds the size of the copy paper. The operator can form a complete copy image of a size greater than that of the copy paper size, by adhering these sheets of copy paper without difficulty.

Figure 38:
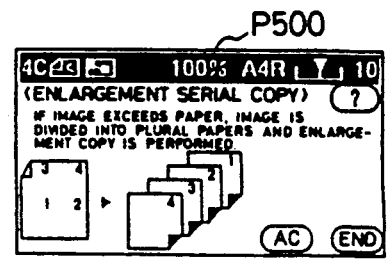
FIG. 38 is an illustration of operation in an enlarging continuous copying mode.

This operation is commenced first by pressing the enlarging continuous key 426 on the digitizer 16, and then by pressing a completion key a on the frame P 500 shown in FIG. 38, thus completing the setting. The operation is then conducted after appointment of the magnification and the paper size.

<Registration Mode>

The registration mode M 700 includes three modes: namely, a color registration mode M 710, a zoom program mode M 720 and a manual paper feed size appointing mode M 370. The color registration mode M 710 enables the registration of the designated color to be appointed in the color conversion mode and the paint mode in each of the color create mode M 400 and area appoint mode M 300 explained before. The zoom program mode M 720 is a mode in which an appropriate magnification is automatically, when the size of the original and the size of the copy paper are input. The computed magnification is displayed on the standard display frame P000 and the copying operation is executed with this magnification. In the color copying apparatus of this embodiment, the feed of the copy paper can be conducted both manually and automatically from the upper and lower paper cassettes. When the apparatus is to be used in so-called APS (Autopaper select) mode with manual paper feed, the manual paper feed size appointing mode M 730 appoints the size of the paper to be fed manually.

Figures 1, 40:
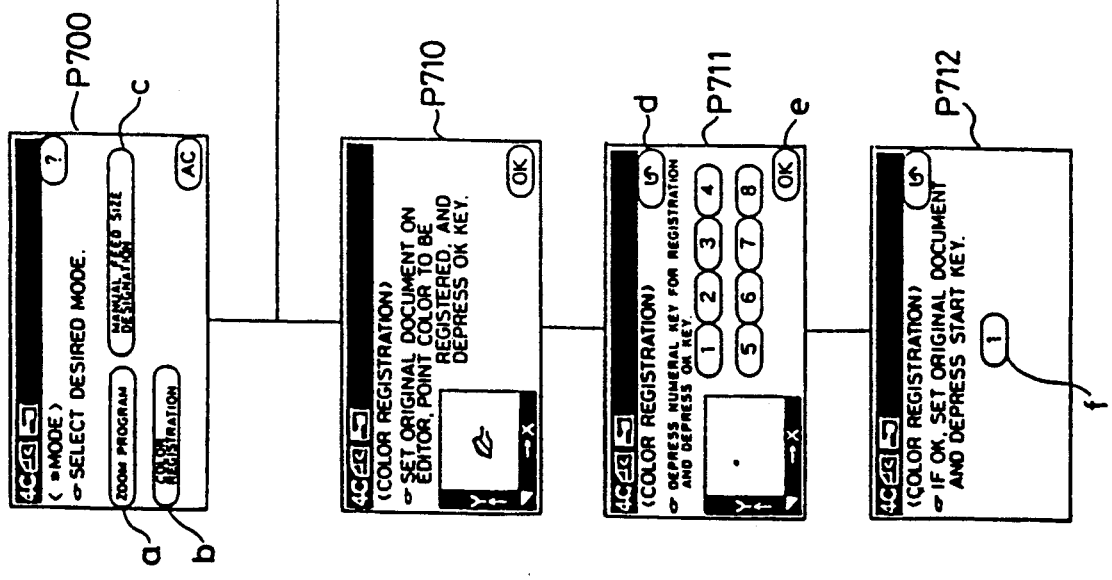
Figures 2, 40:
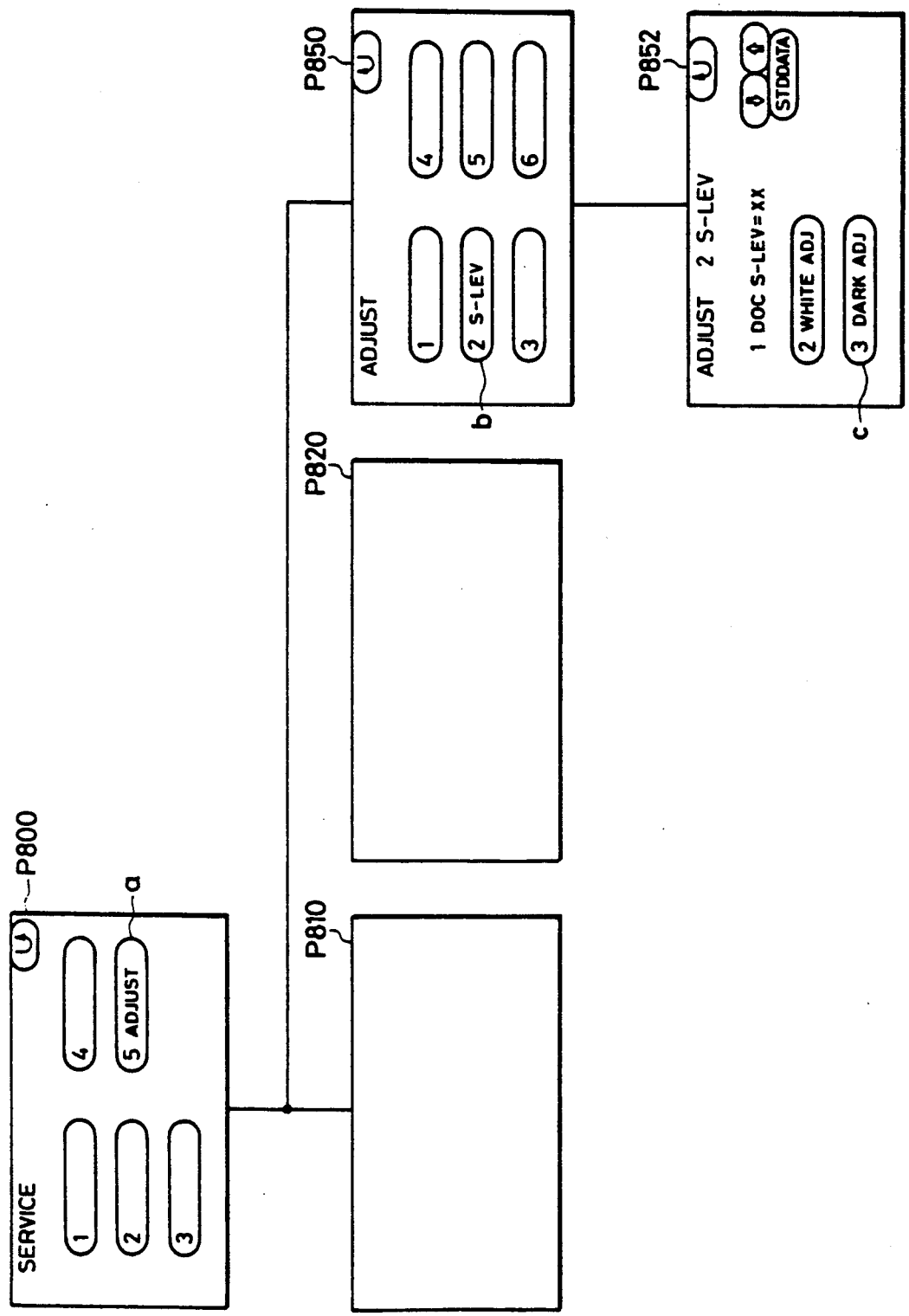
Figure 41:
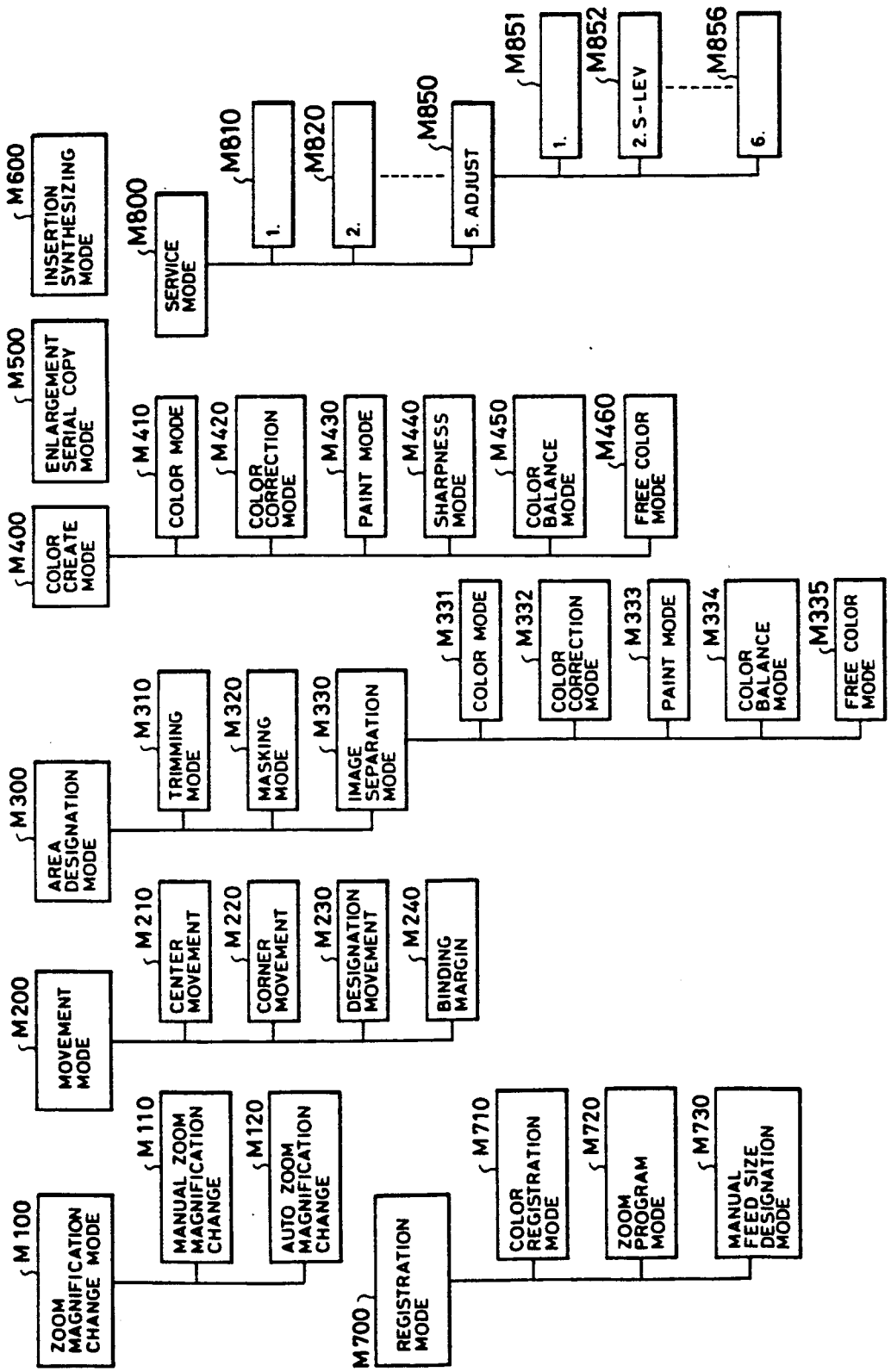
FIG. 41 is an illustration of functions of a color copying apparatus embodying the present invention.

As a *key 402 on the control section shown in FIG. 31 is pressed, the display is changed to a frame P 700 shown in FIG. 40-1. If the operator wishes to select the color registration mode M 710 for the purpose of registering a color, he presses the touch key a on the frame P 700 so as to put a frame P 710 into display, and the original having the color region of the color to be registered is placed on the digitizer. Then, he appoints the color region by the point pen 421. As a result, the display is reversed to the frame P 711 so that the operator can determine the registration identification No. of the registered color by pressing the key of the identification No. When registration of another color is necessary, the display is changed again to the frame P 710 in response to pressing of the touch key d on the frame P 711, so that the operator can conduct the same color registering operation. When the input of the coordinates to be registered is finished, the operator presses the touch, key e to bring a frame P 712 into display and presses a touch key f which is a start key for starting reading.

Figure 44:
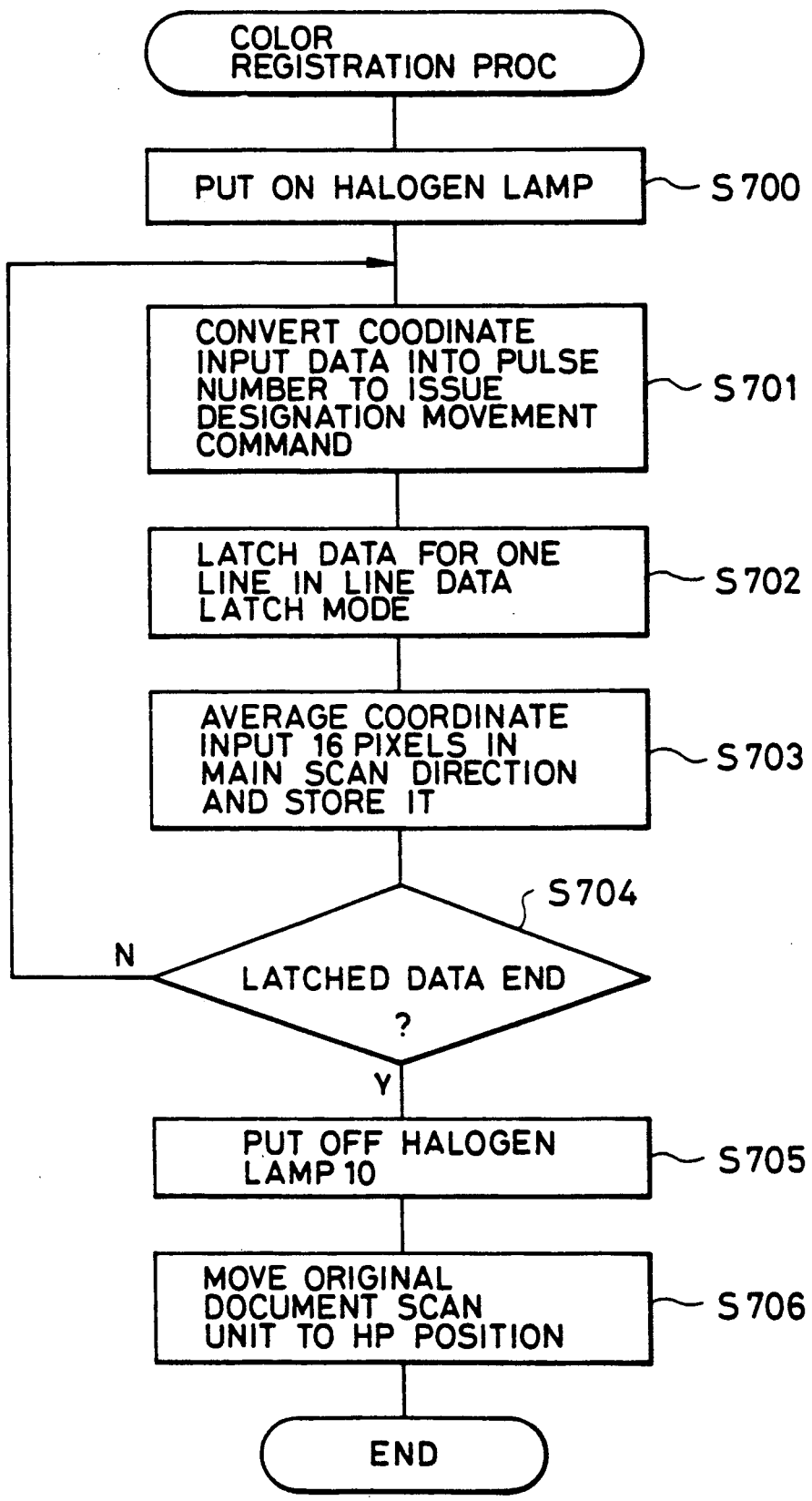
FIG. 44 is a flow chart of a control executed in operation of the apparatus in color registration mode.

A process shown by the flow chart in FIG. 44 is started as the touch key f is pressed. In Step S 700, the halogen lamp 10 lights up. In Step S 701, the number of pulses to be supplied to the stepping motor is computed in accordance with the coordinates value (sub-scan direction) appointed in Step S 701, and the original scanning unit 11 is moved as the aforementioned shifting command is issued. In Step S 702, the line-data pickup mode is executed so that the data on one line at the position of sub-scan is picked up and stored in the RAM 78' shown in FIG. 11-1. In S 703, average value of the data carried by 8 pixels around the coordinates-appointed main scan position is computed by the CPU 22 on the basis of the line data read from the RAM 78'. The computed average value is stored in the RAM 24. In Step S 704, judgment is conducted as to whether the registration coordinates of all the appointed positions have been read or not. If there is any coordinates which have not been read yet, the process returns to Step S 701 so that the described operation is repeated until all the appointed coordinates are read. After the completion of reading of the appointed coordinates to be registered, the halogen lamp 10 is turned off in Step S 705 and the original scanning unit is returned to the home position in Step S 705, thus completing the registering operation.

Then, the operator presses the touch key a (zoom program) on the frame P 700, so that the display is changed to a frame 720 which allows the operator to set the length of the original and the copy size. The set value is displayed on the frame P 720 together with the ratio copy size/original size in terms of %. The result of the ratio computation is displayed at the magnification display area on the standard frame P000, thus setting the copying magnification.

Then, the touch key c (manual paper feed size appoint) is pressed on the frame P 700, so that the process proceeds to a frame P 730 which enables the operator to appoint the size of the copy paper to be fed manually. This mode makes it possible to conduct APS mode and the auto-zooming mode to be executed in combination with the manual paper feed mode.

Numerical values and data set through the touch panel or through coordinates input by the digitizer in various modes are stored in predetermined regions in the RAMs 24 and 25 under the control of the CPU 22, and are read as desired so as to be used as parameters in subsequent copy sequence.

A description will be made hereinunder as to the service mode. The * key 402 on the control section shown in FIG. 31 is pressed so that the frame P 700 shown in FIG. 40-1 is put into display. As the * key is pressed once again, the display is changed to a frame P 800 shown in FIG. 40-2. When it is desired to conduct the black level adjustment, the operator press the touch key a on the frame P 800 so that the display is changed to a frame P 852. A judgment is conducted as to whether the present mode is for picking up and storing one-line black level signal into the black level RAM 78 in advance of the copying operation, by means of the touch key c on the frame P 850 and the display C. If the state as shown in FIG. 40-2 is confirmed through the display C, a mode which does not pickup the black level data is set in the RAMs 24 and 25. Conversely, if the characters on the display C have been reversed as a result of the input through the touch key c, a mode for picking up the black level data is set in the RAMs 24 and 25. The touch key c conducts a toggle action. Other service modes are not described because they do not constitute any critical portion of the invention.

Figure 51:
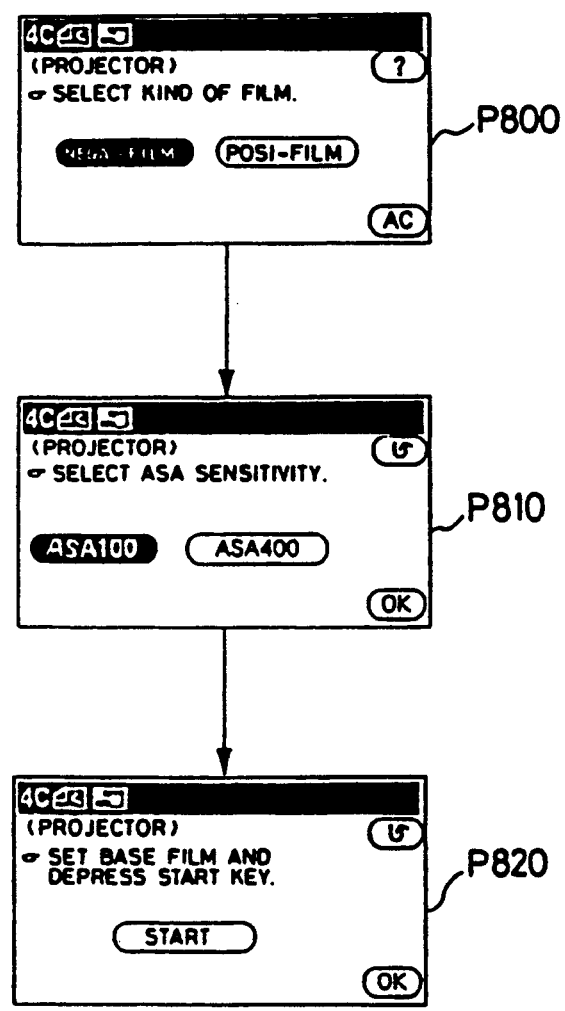
FIG. 51 is an illustration of operation of the projector.

FIG. 51 shows the procedure of operation of the control section when the apparatus is used in combination with the film projector 211 (see FIG. 24). As the projector mode selection key 406 (see FIG. 31) is pressed after the film projector 211 is connected, the display on the liquid crystal touch panel is changed to a frame P 800 which allows the operator to make selection between negative and positive films. When negative film is selected, the display is hanged to a frame P 810 for allowing the operator to select the film sensitivity (ASA value). It is assumed here that ASA 100 is selected. Then, as explained before in connection with FIG. 29, the negative base film is set and the shading start key on the frame P 820 is pressed so that the shading correction is conducted. Then, the negative film to be copied is set on the holder 215 and the copy button 400 (see FIG. 31) is pressed so that image forming processes are conducted to form yellow, magenta, cyan and black color images in sequence in a manner explained in connection with FIG. 25A, after the AE operation for determining the exposure voltage.

Figure 46:
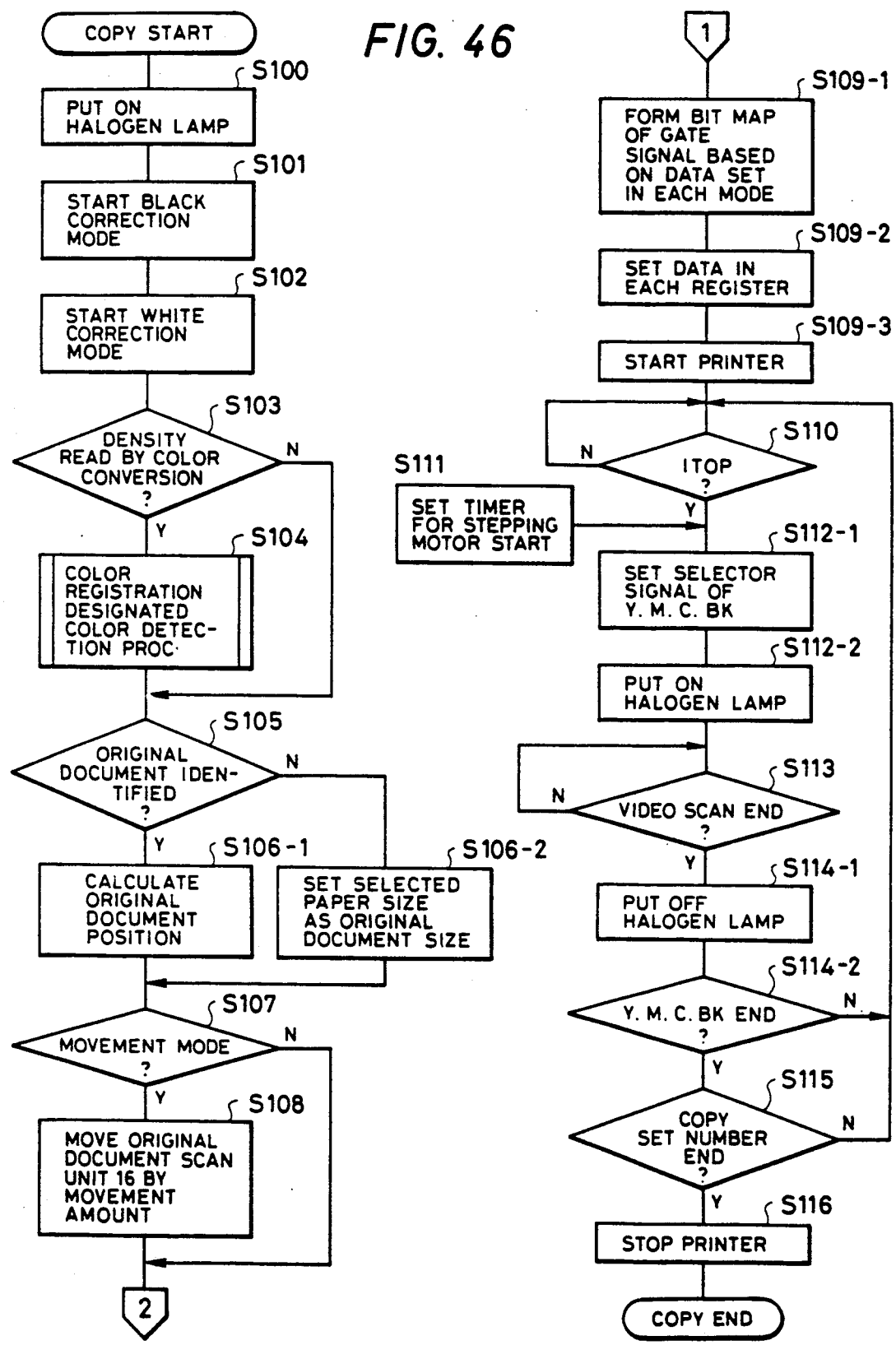
FIG. 46 is a control flow chart illustrating the control of the whole system.

FIG. 46 shows a flow chart illustrating the sequence control of the color copying apparatus of this embodiment. Referring to this flow chart, the halogen lamp 10 lights up in Step S 100 in response to pressing of the copy key, and the aforementioned black correction mode and white correction mode are executed in Steps S 101 and S 102, respectively.

A detailed description will be made as to the black correction mode. As explained before in connection with FIGS. 10A, 10B, 10C and 10D, the black correction mode includes a black reference level pickup mode, black level data computing mode and black correction mode for correcting actual image data. The black level data picked up in the black reference level pickup mode tends to be affected by noises as explained before, so that a process for reducing the influence of noise in the direction of main scan by CCD is conducted in the computing mode. However, a fluctuation of the level inevitably takes place between adjacent CCD channels during repetition of the main scan by the CCD, although the amount of fluctuation is small. The deviation of the picked-up black level data between the adjacent channels causes a color offset between adjacent channels. In order to obviate such an offset of color, the touch key c is pressed in the DARK ADJ mode of the ADJUST mode M 852 in the aforementioned service mode M 800 (see FIG. 40-2) so as to set in the RAMs 24 and 25 the mode which picks up the black level signal into the black level RAM 78. The mode set in the RAMs 24 and 25 is judged in Step S 101-1 of Step S 101 in the black correction mode. Then, the black level signals is picked up in Steps S 101-2 and S 101-3 and then the copy image is confirmed. When any offset of color between CCD channels is found during the confirmation of the copy image, the copying operation is conducted once again followed by conformation of the image.

When black level data which does not cause color offset between CCD channels has been picked up, the touch key c is pressed once again in the DARK ADJ mode in the service mode M 800 so as to reverse the display C. As a result, the mode which does not cause the black level signal to be stored in the black level RAM 78 is set in the RAMs 24 and 25. Thereafter, the black correction is executed in Step S 101-4 on the basis of the picked-up black level, while skipping over Steps S 101-2 and S 101-3.

If a demand for color conversion has been set in the color conversion mode or in the paint mode, color registration and reading of the appointed color are conducted and the color-separated density data of the appointed coordinates is stored in predetermined areas depending on the registration mode and the appointed color detection, in the manner described in connection with FIG. 44. In Step S 105, whether the original recognition mode has been set or not is judged. If this mode has been set, the process proceeds to Step S 106-1 in which the scanning unit 16 is moved by a distance of 435 mm which corresponds to the maximum original detection length. Then, the position and the size of the original are detected through the CPU BUS, by the aforementioned original recognition function 200. If the original recognition mode has not been set yet, the process proceeds to Step S 106-2 in which the size of the selected copy paper is recognized as the original size and the data concerning the thus recognized size is set in the RAM 24. Then, in Step S 107, a judgment is conducted as to whether the shifting mode has been set. If the answer is YES, the original scanning unit 11 is moved by an amount corresponding to the amount of shifting of the image.

In Step S 109, a bit C map for output gate signals for various functions generated by RAMA 136 or RAMB 137 is formed in accordance with the data set by the respective modes.

Figure 49:
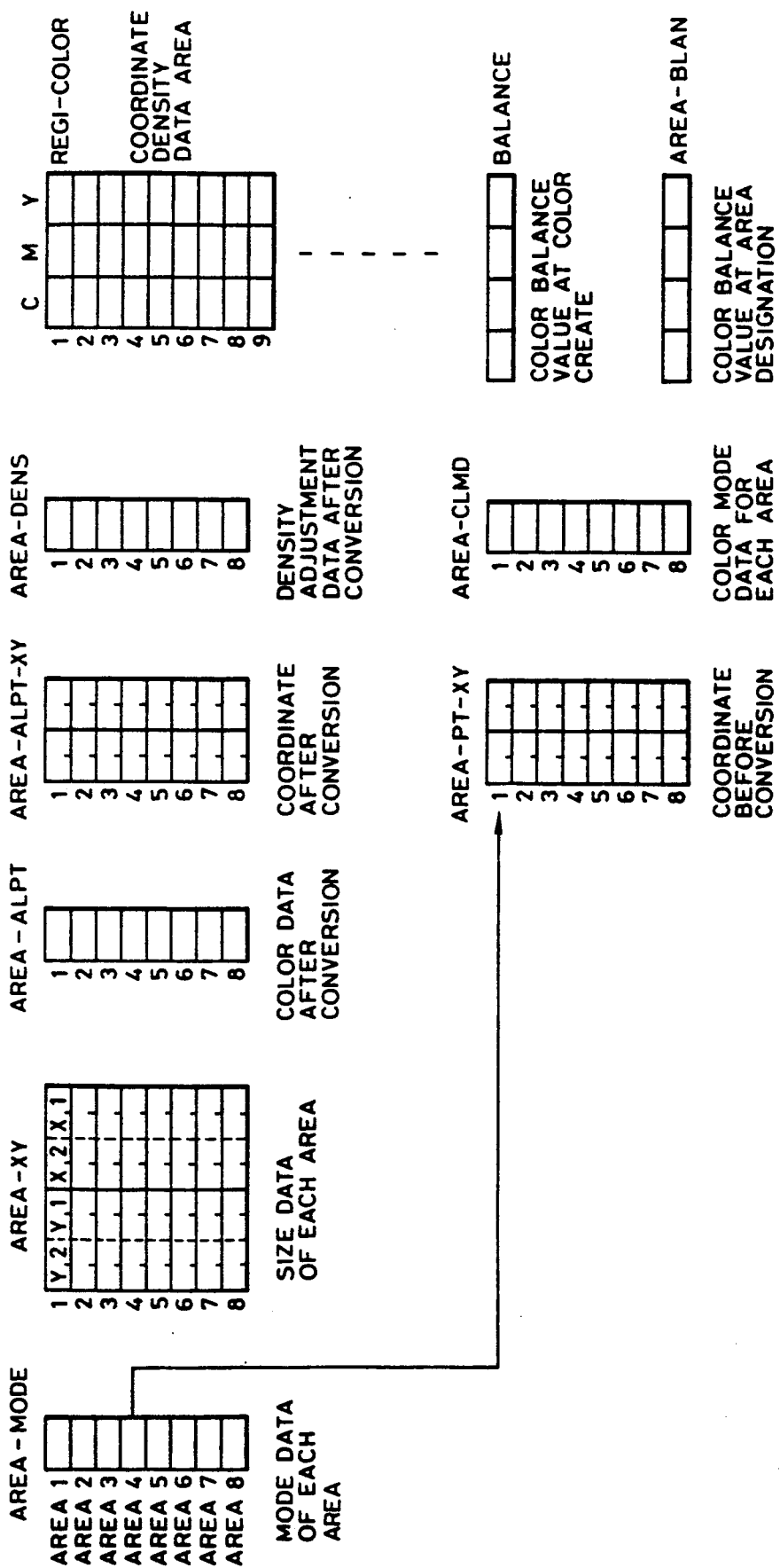
FIG. 49 is an illustration of a memory map in a RAM.

FIG. 49 is a RAM map representing the data set in the RAMs 24 and 25 by the respective modes. AREA__MODE represents an area which stores data for identifying the function or mode such as painting, trimming and so forth. AREA__XY stores size data such as the original size and the sizes of the respective areas. AREA__ALPT stores data concerning the color after the color conversion, e.g., whether the color to be obtained after conversion is a standard color, a designated color or a registered color. AREA__ALPT__XY is a data area for storing the data concerning color coordinates when the content of the area AREA__ALPT represents a designated color. AREA__DENS is an area for storing data concerning the density adjustment after the conversion. AREA__PT__XY is an area for storing data concerning the coordinates of the color before the conversion in the color conversion mode. AREA__CLMD stores color mode data in the original or in an appointed region.

REG__COLOR stores various color data registered in the color registration mode. These data are used as the registered colors. This area is stored in a back-up memory of the RAM 25 so that the content of this area is maintained even when the power supply is cut-off accidentally.

Figure 50:
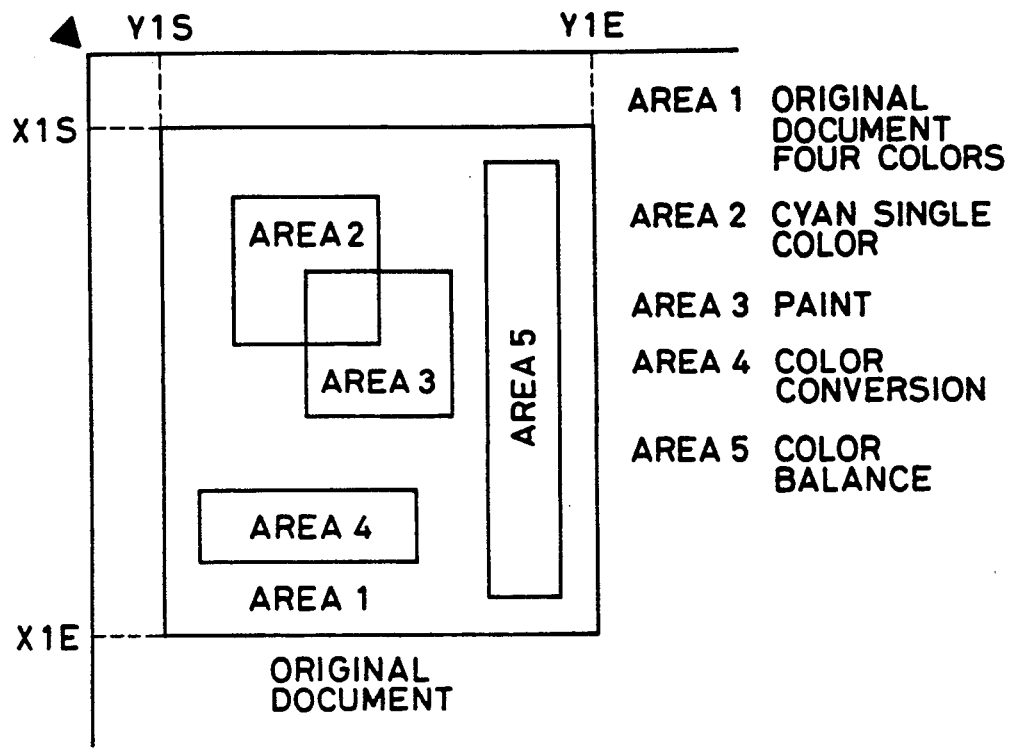
FIG. 50 is an illustration of a bit map.

A bit map as shown in FIG. 50 is formed by using the above-mentioned stored data. As the first Step, coordinates data in the sub-scan direction as derived from the AREA__XY storing the size data concerning the respective regions are sorted from the smaller one to the greater ones in the X__ADD area. The same sorting is conducted also in the direction of main scan.

Subsequently, "1" is set in the BIT__MAP at positions corresponding to the start and end points of the respective regions in the direction of the main scan. The bit positions where "1" is set correspond to the respective gate signals generated by the RAMA 136 and the RANB 137. Thus, the bit positions are determined by the mode in the region. For instance, the region 1 which is an original region corresponds to TMAREA 660, while the region 5 for appointing color balance corresponds to GAREA 626. In the described manner, bit map corresponding to the regions is formed in the BIT__MAP area shown in FIG. 50.

Then, in Step S 109, the following process is conducted for the mode in each region. The region 2 stores cyan mono-color mode, and provides a monochromatic image corresponding to four-color image on the original. If video data is transmitted when this region 2 is developed in cyan color, the image in this region 2 is printed to have only the cyan component, and images of other colors such as yellow and magenta are not printed. Therefore, the following coefficients are set, by the masking coefficient register shown in FIG. 16A, in the register which is selected when MAREA 564 has become active, in order to provide an ND image when the area in an appointed region has been selected in mono-color mode.

$$\begin{pmatrix} \alpha Y1, & \alpha Y2, & \alpha Y3 \\ \beta M1, & \beta M2, & \beta M3 \\ \gamma C1, & \gamma C2, & \gamma C3 \\ k2, & l2, & m2 \end{pmatrix} = \begin{pmatrix} 0, & 0, & 0 \\ 0, & 0, & 0 \\ \frac{1}{3}, & \frac{1}{3}, & \frac{1}{3} \\ 0, & 0, & 0 \end{pmatrix}$$

Figure 2:
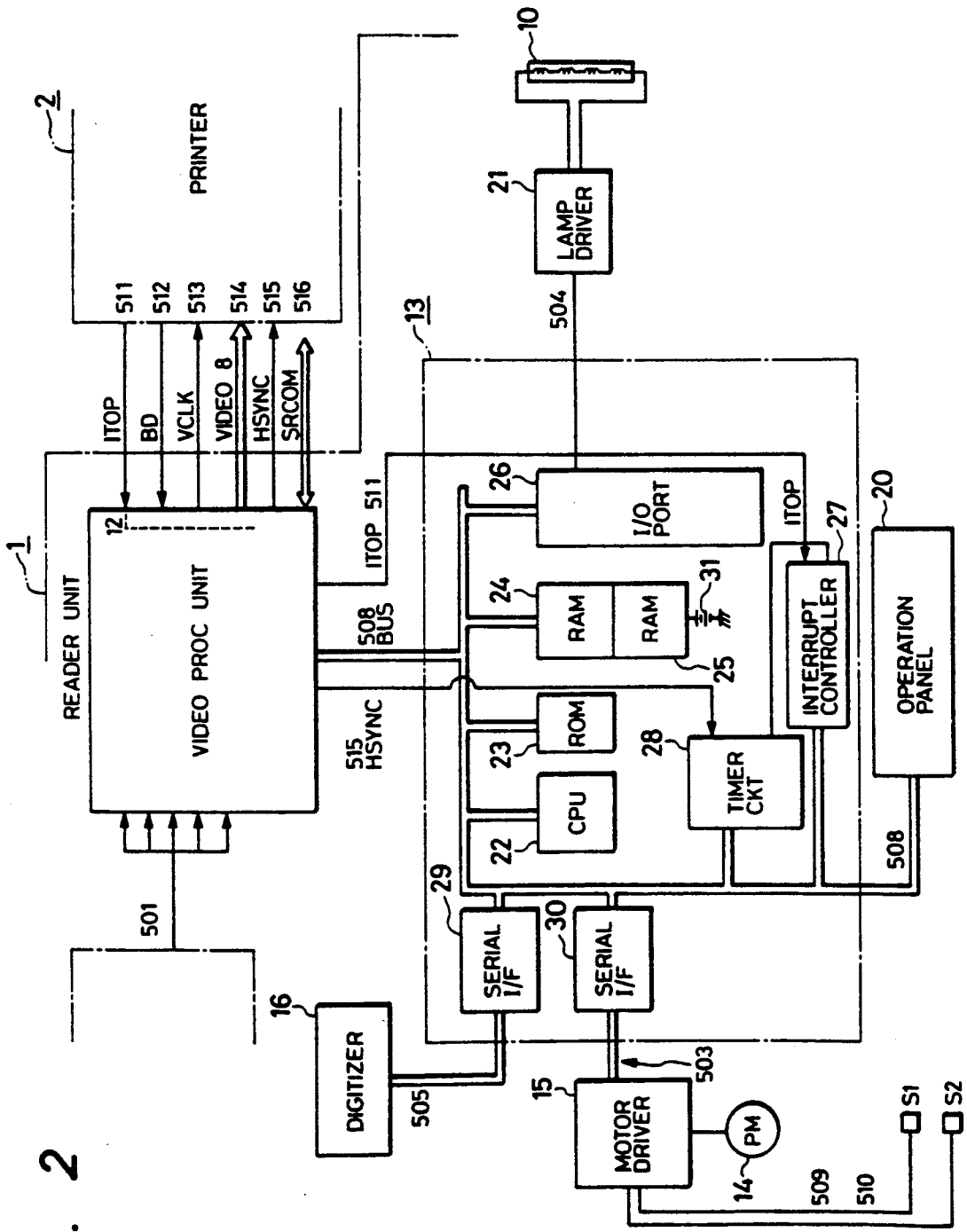
FIG. 2 is a control block diagram of a controller of a reader portion of the copying apparatus.

Then, the data of four or three color mode stored in the RAM 23 shown in FIG. 2 are set in the masking coefficient register which is selected when the MAREA 564 has become "0". Subsequently, the registers shown in FIG. 18A selected by the gate signals CHAREA0. 1. 2. 3 corresponding to the bits of the area of the aforementioned BIIMAP area are set for the region 2 which has been appointed in paint mode. In order to enable conversion for all the input video data, FF is set in $Y_u$ 159, 00 is set in $y_l$ 160, FF is set in $M_u$ 161, 00 is set in $m_l$ 162, FF is set in $C_u$ 163 and 00 is set in $c_l$ 164. Then, the color data concerning the colors after conversion, which have been stored in the process explained in connection with FIG. 49, are loaded from AREA__ALPT or from REGI__COLOR, and the respective color data are multiplied with the coefficients of density control data derived from the AREA__DENS, whereby the density data concerning the densities after conversion are set in y' 166, m' 167 and c' 168. In regard to the color conversion for the region 4, values are obtained by adding a certain offset value to the density data before conversion shown in FIG. 49, and the thus obtained values are set in the aforementioned registers $Y_u$ 159, $c_l$ 164. Then, the density data after the conversion are set in the same manner as that described above. It is to be understood that the above-mentioned offset value is variable in accordance with parameters which are settable by the conversion range appointing key in the frame P 341 shown in FIG. 36.

It is also to be noted that, in response to the setting of the above-mentioned parameters, the number of pixels used in the averaging in the averaging circuits 149, 150 and 151 (see FIG. 18A) are determined and set in the respective averaging circuits 149 to 159. This operation will be explained with specific reference to a flow chart shown in FIG. 18F, In Step S 401, OFF 1 and OFF 2 are computed in accordance with the "width of the conversion range" set by the conversion range setting key in the frame P 341 in FIG. 36 and also in accordance with fixed values CONST 1 to CONST4 which are determined by the system. The "width of conversion range" is a variable which is set at "9" when the "widening" end is detected in the frame P 341 and at "1" when the "narrowing" end is detected in the same. Initially, this variable is set at "5". In consequence, the OFF 1 and OFF 2 are varied in proportion to the "width of conversion range". In Step S 402, upper limit values of conversion object are determined by adding the OFF 1 to the respective density data pertaining to the densities before conversion, and the thus determined upper limit values are set in $y_u$ 159, $m_u$ 161 and $C_u$ 163, respectively. Similarly, lower limit values of the conversion object are determined by subtracting OFF 1 from the respective density data pertaining to the densities before the conversion, and are set in $y_l$ 160, $m_l$ 162 and $c_l$ 164, respectively. In consequence, the difference between the upper limit value and the lower limit value, i.e., the width of the conversion range, corresponds to the value appointed by the conversion range appointing key in the frame P 341. In Step S 403, the color data after conversion as stored in the process shown in FIG. 49 are loaded from AREA_ALPT or REGI_COLOR, and the respective color data are multiplied with coefficients of the density adjusting data in AREA_DENS, and the thus obtained density data after conversion are set in y' 166, m' 167 and c' 168. In Steps S 404 to S 406, the number of the averaging pixels to beset in the averaging circuits 149 to 151 are determined to be 1, 2, 4 and 8, respectively, when the "width of conversion range" is 8 to 9, 6 to 7, 3 to 5 and 1 to 2. Thus, when the conversion range is narrow, the number of pixels used in averaging operation is increased in order to avoid any erroneous detection due to, for example, presence of halftone dots. On the other hand, when the conversion range is wide, the number of pixels employed for the averaging is reduced to suppress the tendency of erroneous detection of fine lines.

In regard to the color balance conducted for the region 5, the aforementioned data values derived from the color balance values AREA_BLAN stored at the time of area appointment shown in FIG. 49 are set in the regions of Y, M, C and Bk which are selected when the gate signal GAREA 626 is set at "1". In the regions which are selected when the gate signal GAREA 626 is "0", color balance data is set in accordance with BALANCE which represents the color balance in the color creation mode.

Figure 47:
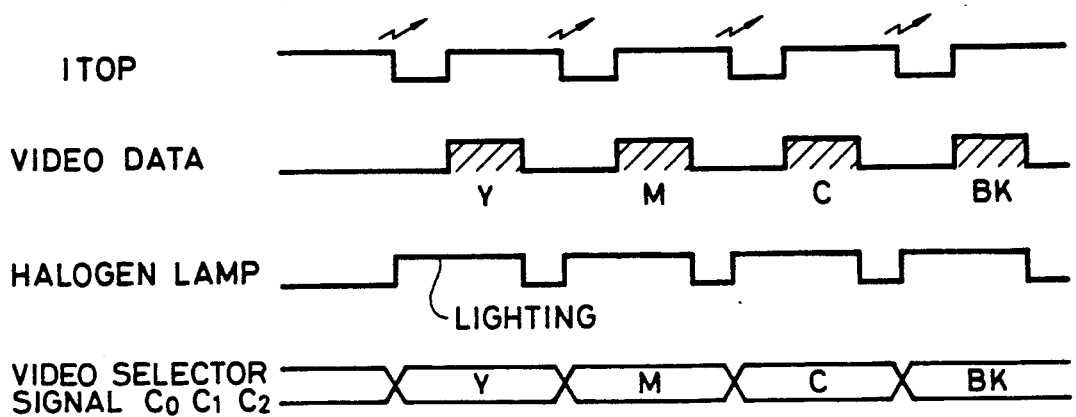
FIG. 47 is a time chart showing the timing of operation of the whole system.

In Step S 109, printer starting command is output through SRCOM 516. In Step S 110, ITOP shown in the timing chart of FIG. 47 is detected and, in Step S 111, switching of the output video signals $C_0$, $C_1$ and $C_2$ of Y. M, C and Bk is conducted. After the halogen lamp is started in Step S 112, completion of the video scan is judged in Step S 113. After conformation of completion of the video scan, the halogen lamp is turned off in Step S 114 and completion of copying operation is confirmed in Steps S 114 and S 115. Then, printer stopping command is issued in Step S 116, thus completing the copying process.

Figure 55:
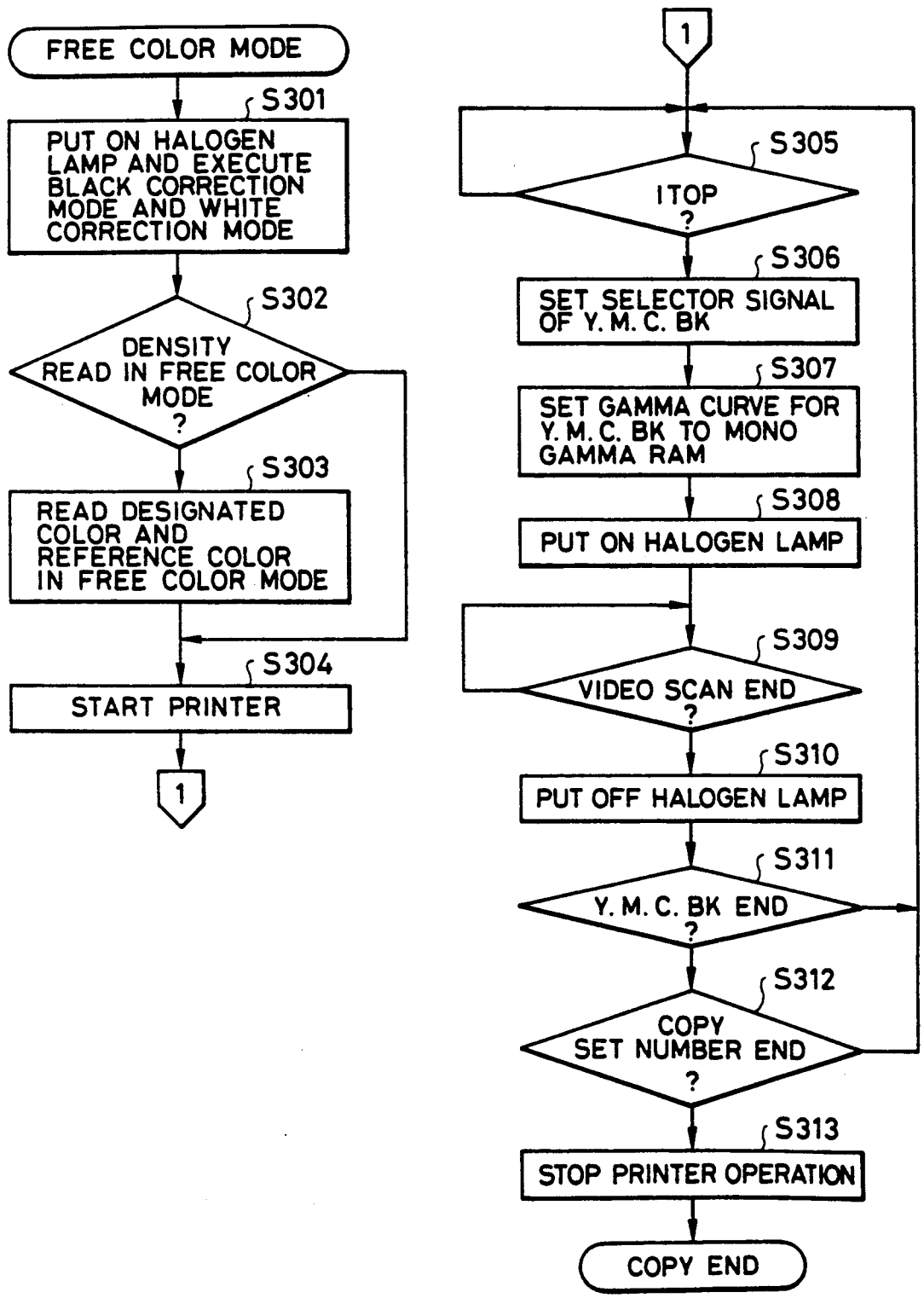
FIG. 55 is a control flow chart executed when the free color mode is set.

A description will be made hereinunder as to the sequence control which is conducted when the free color mode is set, with reference to a flow chart shown in FIG. 55. In response to pressing of the copy key, lighting of the halogen lamp, black correcting process and white correcting process are conducted in Step S 301. When the designated color mode and the density adjustment according to coordinates values have been set in the free color mode, reading of the color data of the designated color and the reading of the MONO value appointed by coordinates are conducted in Step S 303. The read values are stored in the respective predetermined storage areas. This operation has been described already with reference to FIG. 44.

In Step S 304, printer starting command is delivered through SRCOM 516 and, in Step S 305, ITOP shown in the timing chart of FIG. 47 is detected. In Step S 306, switching of output video signals $C_0$, $C_1$ and $C_2$ Y, M, C and Bk is conducted and, in response to the switching, gamma curves for Y, M and C are set in the MONO gamma RAM in the manner shown in FIG. 54A. For the black color Bk, the gamma curve is set such as to output "0" in response to all the input. In Step S 308, the halogen lamp is turned on. Upon judging the completion of the video scan in Step S 309, the process proceeds to Step S 310 in which the halogen lamp is turned off. Completion of copying operation is confirmed in Steps S 311 and S 313 and then a printer stopping command is issued in Step S 313 thus completing the copying process.

Figure 48:
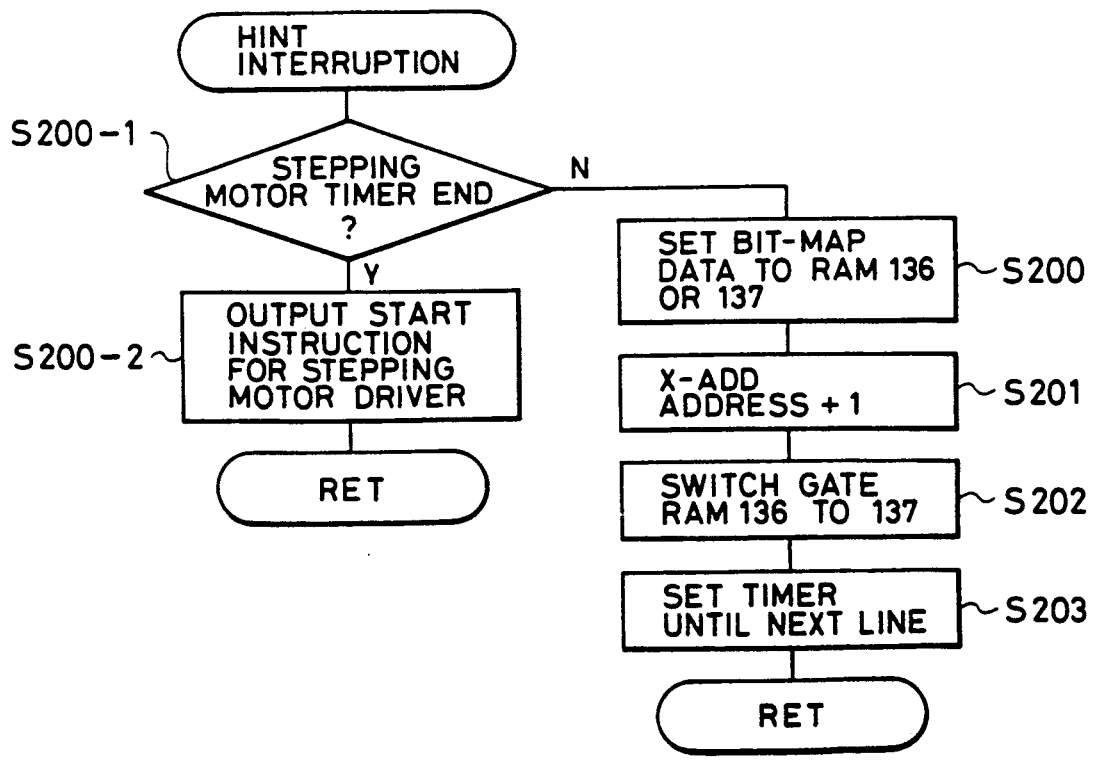
FIG. 48 is a flow chart showing an interruption control flow.

FIG. 48 shows a flow chart of interruption by a signal HINT 517 output from the timer 28.

In Step S 200-1, judgment is conducted as to whether the timer for starting the stepping motor has counted a predetermined time. If the answer is YES, the stepping motor is started and, in Step S 200, the one-line BIT_MAP date represented by X_ADD in FIG. 50 is set in the RAM 136 or 137. In Step S 201, the address of the data to be set by the next interruption is incremented by +1. In Step S 202, the switching signals $C_3$ 594, $C_4$ 596 and $C_5$ 593 for the RAM 136 and RAM 137 are generated. In Step S 203, the length of time till the next change-over of the sub-scan is set in the timer 28. Subsequently, the contents of the BIT_MAP represented by X_ADD are successively output to the RAM 136 or 137, thereby to change-over the gate signals.

Thus, the content of the processing in X direction is changed each time an interruption is generated as a result of movement of the carriage in the direction of the sub-scan, so that color process such as various color conversions can be conducted independently for the respective regions.

Thus, the color copying apparatus of the described embodiment realizes various color copying modes and afford a free reproduction of color data.

Although the embodiment has been described with specific reference to an electrophotographic color image forming apparatus, this is not exclusive and the invention can be applied to apparatus incorporating other types of recording devices such as ink jet printer, thermal transfer printer, and so forth. Although in the described embodiment the reading section and the image forming section are arranged close to each other, it will be clear to those skilled in the art that the invention is equally applicable to the cases where the reading section and the image forming section are installed apart form each other and connected through communication lines capable of transmitting video data.

In the embodiment described before, the width of the conversion range is manually set by the operator. In another form of the present invention, a multiplicity of points carrying color or colors to be converted are input by means of the point pen and the size of the conversion region is automatically set so as to include all these points.

It is also possible to arrange such that the operator inputs by the point pen a multiplicity of points carrying color or colors which are not to be converted and the size of the conversion range is automatically determined such as to exclude those points.

A description will be made hereinunder as to a second embodiment of the invention which is adapted to appoint the conversion range by inputting, through the point pen, a multiplicity of points carrying a color to be converted.

Figure 56:
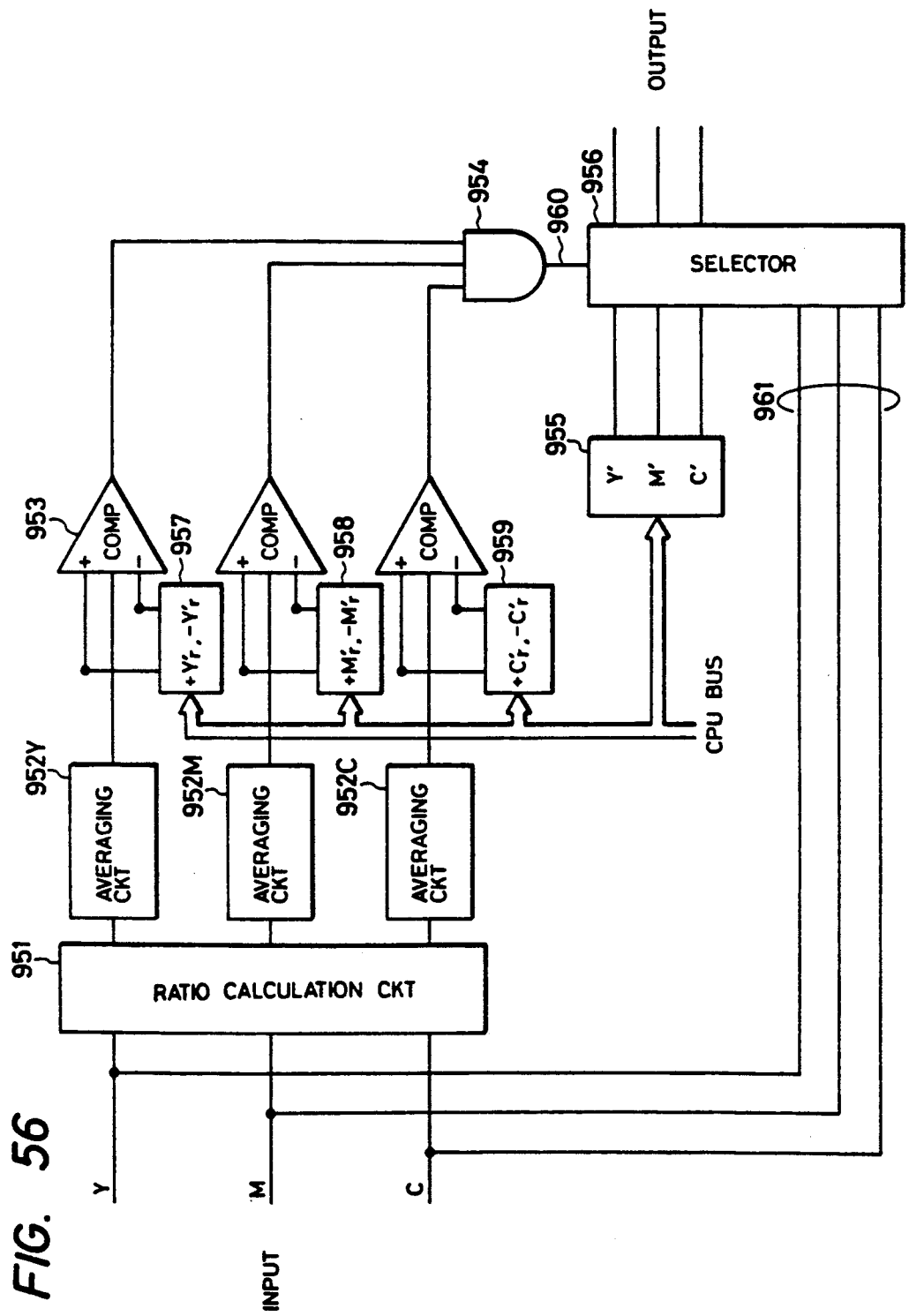
FIG. 56 is a block diagram of a color conversion circuit.

FIG. 56 is a block diagram of a color conversion circuit as a second embodiment. The color conversion circuit includes the following parts: a ratio computing circuit 951 for computing, in accordance with the following formulae (1), (2) and (3), the ratios of color components from Y, M and C density data which are obtained by color separating the input video signal into yellow, magenta and cyan and then digitizing the color=separated video signals; window comparators 953 each of which is adapted to output "1" (high) signal when the condition of $-Yr' \leq Yi \leq +Yr'$ is met, where Yi represents the yellow input data, $+Yr'$ represents a threshold of plus side and $-Yr'$ represents a threshold of minus side; registers 957, 958 and 959 connected to a CPU (not shown) through CPU BUS and adapted to set thresholds on the window comparators; an AND gate 954 for computing AND of the outputs of comparators 953 so as to form a control signal 960; a register 955 in which the color data after conversion are set as Y. M, C density data, the register 955 being connected to CPU BUS so that any desired data may be set therein; and a selector 956 operable in accordance with the control signal 960 and adapted to select one from the conversion data (Y', M', C') set in the register 955 or the video data 961 (Y, M, C) itself.

The input video data (Y. M. C density data) is delivered to the ratio computing circuit so that the ratios of the yellow, magenta and cyan components are computed from the density data for each unit pixels, in accordance with the formulae (1), (2) and (3). The computed data will be referred to as "Yr, Mr, Cr ratio data" hereinunder. From this computation, it is clearly understood that Yr, Mr and Cr do not change even when the density of the input color is changed, provided that the hue is unchanged.

$$Yr = \frac{Y}{Y + M + C} \times 256 \quad (1)$$

$$Mr = \frac{M}{Y + M + C} \times 256 \quad (2)$$

$$Cr = \frac{C}{Y + M + C} \times 256 \quad (3)$$

Figure 57:
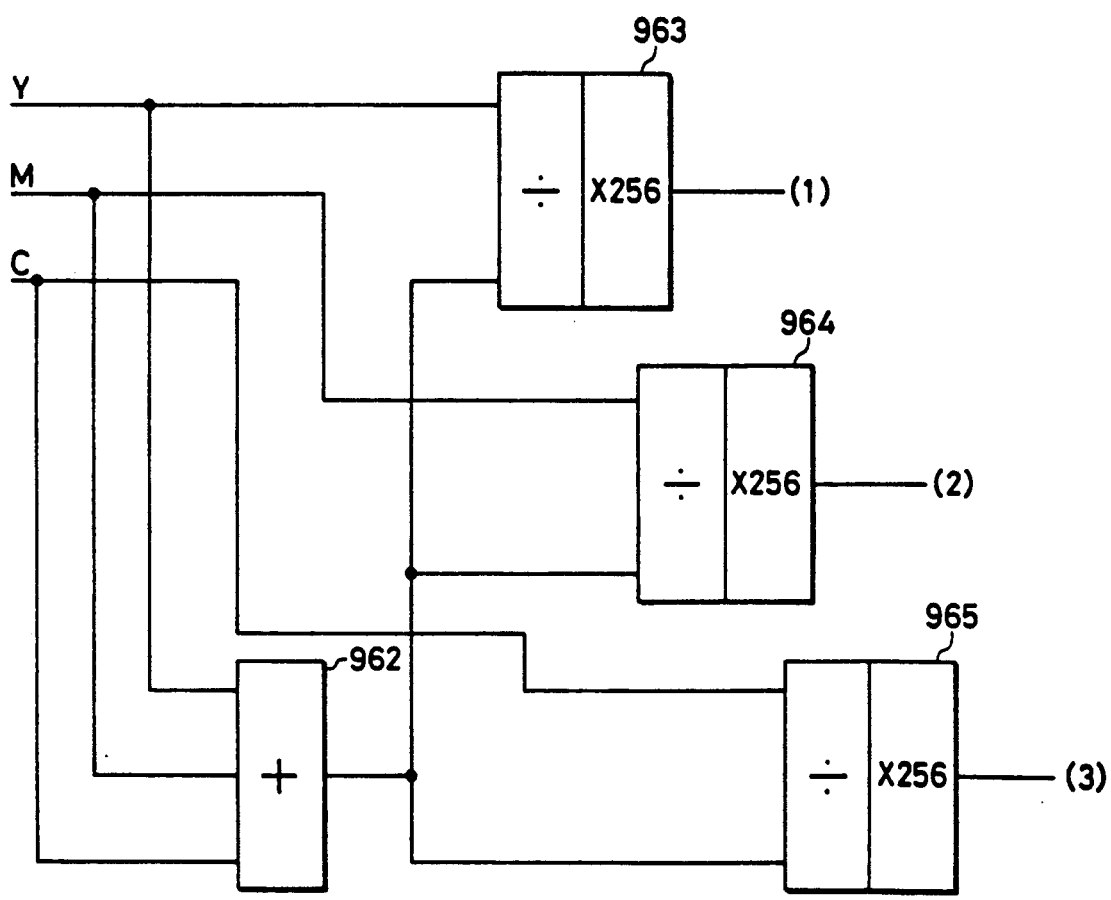
FIG. 57 is a block diagram of a ratio computing circuit.

FIG. 57 is a block diagram showing the internal structure of the ratio computing circuit 951 shown in FIG. 56. The ratio computing circuit includes an adder circuit 962, and table-conversion ROMs 963, 964 and 965. The density data of the respective colors Y, M and C are added by the adder circuit 962 and the result is input as addresses to the ROMs 963, 964 and 965. The density data Y, M and VC themselves also are input to ROMs independently as addresses. It is therefore possible to read the computing results from Tables which store the data obtained beforehand in accordance with the formulae (1), (2) and (3), whereby the ratios *Yr, Mr, Cr) are directly output from these ROMs.

The Yr, Mr, Cr ratio data output from the ratio computing circuit 951 are input to the averaging circuit 952 shown in FIG. 56 which computes average value as of data carried by the pixels around the pixels of interest. This suppresses the change of erroneous color detection attributable to, for example, inputting of halftone dot images.

The Yr, Mr, Cr ratio data output from the averaging circuit are input to the comparators 953 mentioned before, in which the color to be converted is detected. Alternatively, the ratio data concerning the color to be converted are set as thresholds by the registers 957, 958, 959 and the thresholds are set by the CPU with plus and minus signs as in the case of $+Yr'$ and $-Yr'$. The means for setting these threshold will be explained later.

When the input Yr, Mr, Cr ratio data have fallen within the ranges determined by the respective thresholds, i.e., when the color to be converted has been correctly detected, the comparators 953 output "1" (High) so that the AND gate 954 computes AND of these outputs whereby the control signal 960 for controlling the selector 956 is obtained. When the control signal 960 is set at "1" (High), i.e., when the color to be converted has been detected correctly, the selector 956 outputs the color data Y', M', C' after conversion which have been stored beforehand in the register 955 by the CPU (not shown). When the level of the control signal 960 is "0" (Low), the selector 956 outputs the signal 961 which has been converted.

Figure 58A:
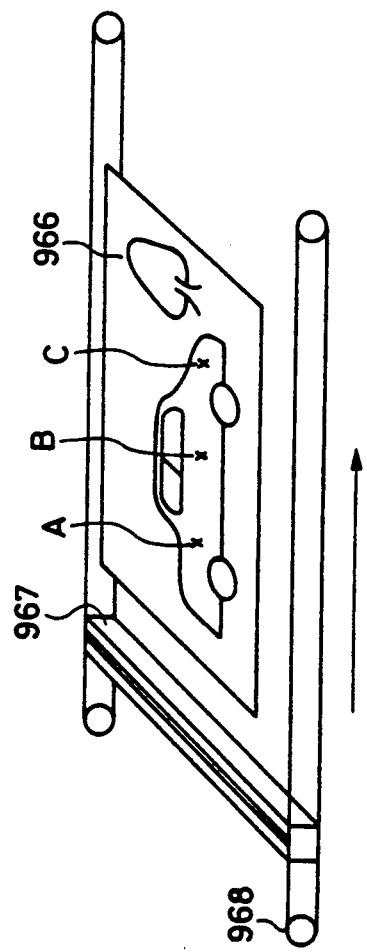
FIG. 58A is a schematic illustration of an image reading portion.

FIG. 58A schematically shows the image reading section employed in the second embodiment. The reading section includes a reading sensor 967 for reading the original 966, and a mechanical scanning means 968 controlled by the CPU and adapted to cause the required scanning movement of the sensor 967 in the direction of the arrow. Symbols A, B and C represents the points from which the colors before conversion are sampled. In this embodiment, these points are determined by appointing their coordinates by means of a digitizer (not shown) and the appointed coordinates values are stored in a memory means provided separately.

Figure 58B:
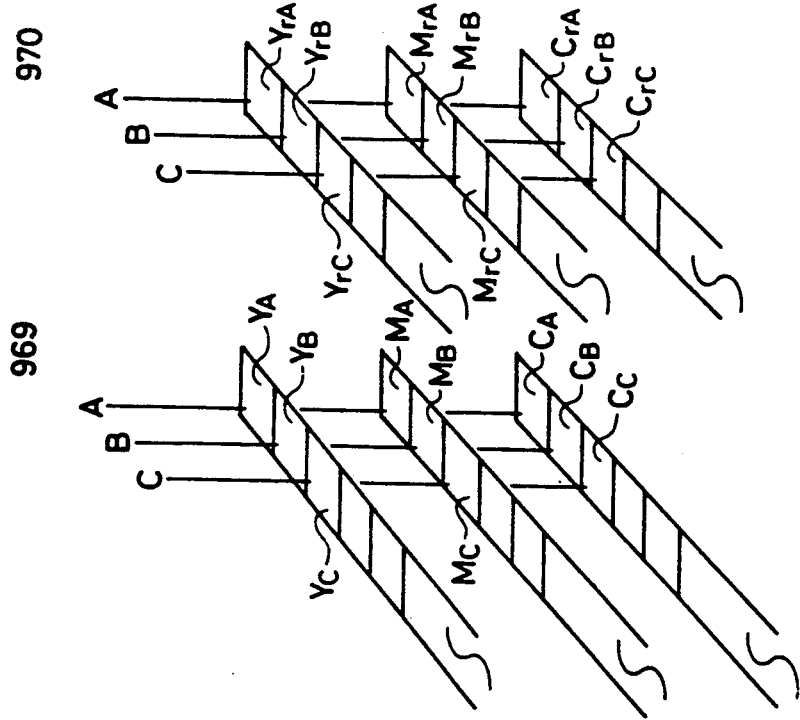
FIG. 58B is an illustration of construction of RAM.

Referring now to FIG. 58B, a reference numeral 969 denotes a RAM for storing the Y,M,C density data read from the respective sample points. A numeral 970 denotes a RAM which stores the color component ratios computed by the CPU from the data derived from the RAM 969.

Figure 59:
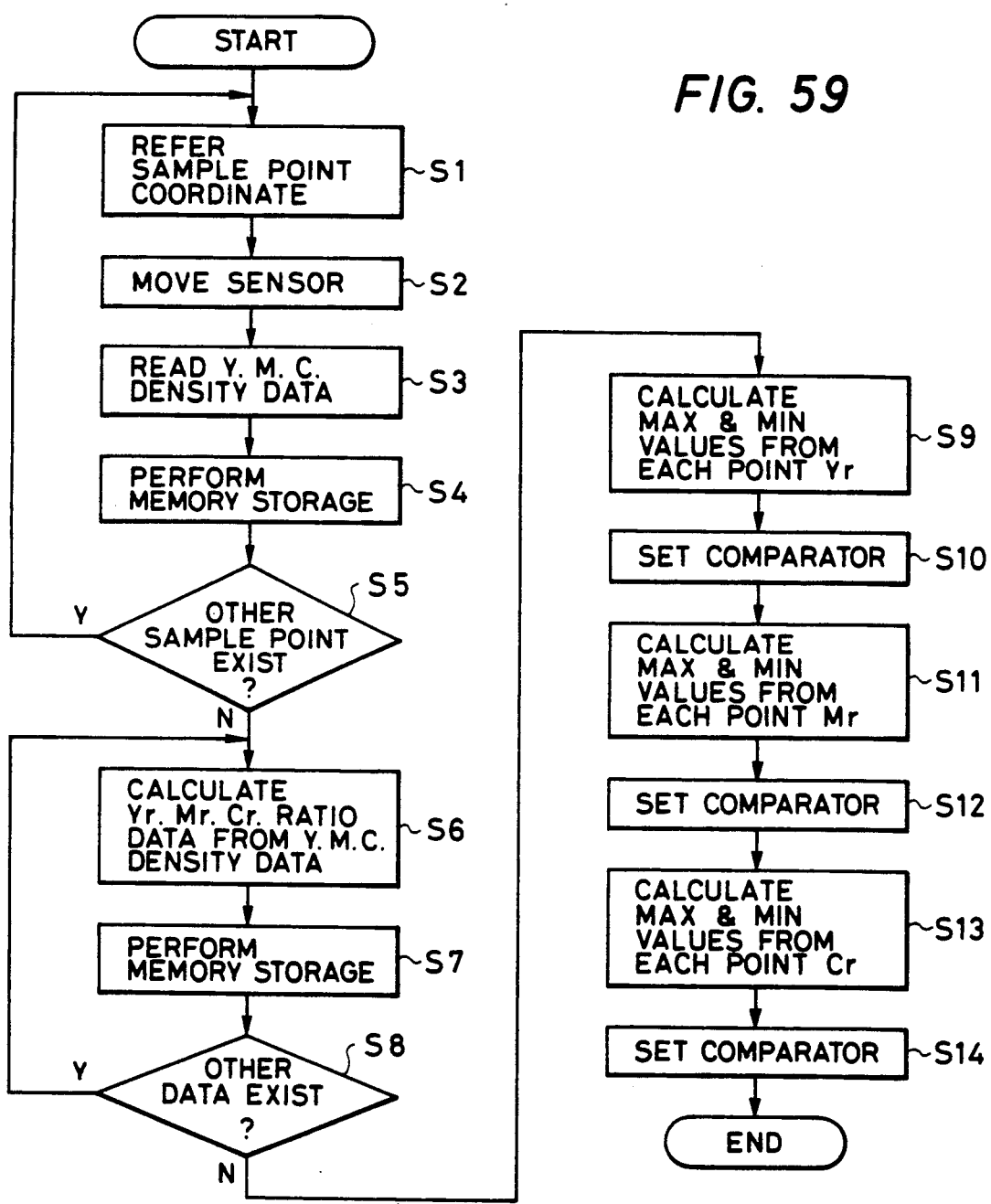
FIG. 59 is a flow chart of operation in accordance with a threshold setting program.

FIG. 59 is a flow chart showing a program for setting the thresholds.

In Step S 1, the CPU makes reference to coordinates of the sample points which are, in this embodiment, the points A,B,C and so forth shown in FIG. 58A. In Step S 2, the reading section 967 shown in FIG. 58A is moved under the control by the CPU to a desired position. When the desired position is reached in Step S3, Y. M and C density data, e.g., $Y_A$, $M_A$, $C_A$ are read from the reached point. The read data are stored in the RAM 959 in FIG. 58B in Step S 4. IN Step S 6, a judgment is conducted as to whether there is other sample points. If there is any sample point which has not been accessed yet, the above-described operation of repeated so as to pickup color density data from such points. These points are, for example, points B and C in this embodiment. Thus, the operation is conducted three times, once for each of the pints A, B and C.

In Steps S6, S7 and S8, the CPU computes the color component ratios Yr, Mr, Cr for each of the sample points A. B and C, using the Y. M. C density data in accordance with the formulae (1), (2) and (3). The thus computed color component ratios are stored in the RAM as indicated by 970 in FIG. 58B. In Steps S 10 to S 15, the CPU computes maximum and minimum values of each color-separated color and set the results of the computation in the registers 957, 958, 959 shown in FIG. 56, as thresholds for the comparators. MAX( ) and MIN( ), represent, respectively, functions for determining the maximum and minimum values. The maximum values and the minimum values are computed in accordance with the following formulae (4), (5), (6), (7), (6) and (9), in which MAX( ) and MIN( ), represent, respectively, functions for determining the maximum and minimum values. When the maximum and minimum values are set in the registers 957, 958, 959, the maximum values and minimum values are suitably offset in plus side and minus side, respectively. It is possible to use a suitable means for enabling the operator to freely select the amounts of offsets of the thresholds.

$$\min Y_r = \mathrm{MIN}(Y_{r_A} \cdot Y_{r_B} \cdot Y_{r_C}) \tag{4}$$

$$\min M_r = \mathrm{MIN}(M_{r_A} \cdot M_{r_B} \cdot M_{r_C}) \tag{5}$$

$$\min C_r = \mathrm{MIN}(C_{r_A} \cdot C_{r_B} \cdot C_{r_C}) \tag{6}$$

$$\max Y_r = \mathrm{MAX}(Y_{r_A} \cdot Y_{r_B} \cdot Y_{r_C}) \tag{7}$$

$$\max M_r = \mathrm{MAX}(M_{r_A} \cdot M_{r_B} \cdot M_{r_C}) \tag{8}$$

$$\max C_r = \mathrm{MAX}(C_{r_A} \cdot C_{r_B} \cdot C_{r_C}) \tag{9}$$

After the setting of the thresholds, the video data is input as explained before in connection with FIGS. 56 and 57 so that the color is detected and converted in real time.

Thus, the present invention makes it possible to obtain a construction which is inexpensive but yet capable of conducting high-speed processing of color data, by virtue of the use of the described means for processing images in real time.

In this embodiment, color conversion can be effected with a high degree of accuracy thanks to the use of the color component ratios and also to the use of a plurality of detection data acquired from a plurality of sample points carrying the color to be converted.

It will be clear to those skilled in the art that the described second embodiment can employ various types of color data such as R, G, B, and luminance, hue, saturation, and so forth, although Y, M and C-type color data have been specifically mentioned.

To sum up, the present invention provides a color image processing apparatus which is inexpensive but is capable of performing a high-speed and accurate color conversion with reduced error.

Furthermore, the present invention makes it possible to freely set the range of color to be converted when the user wishes to convert any desired color in the original image. Therefore, problems encountered by prior arts such as failure of conversion of the color to be converted and conversion of color which should not be converted can be eliminated.

Other features and advantages will be understood from the foregoing description in the specification. It is, however, to be understood that the described embodiments are only illustrative and various changes and modifications may be imparted without departing from the scope of the invention which is limited solely by the appended claims.

What is claimed is:

1. An image processing apparatus comprising:
    first indication means for indicating movement of an objective color image;
    second indication means for indicating conversion of a specific color in the objective color image; and
    processing means for moving the objective color image in accordance with the indication by said first indication means, and for performing the conversion of the specific color in the objective color image in accordance with the indication by said second indication means.

2. An apparatus according to claim 1, wherein said first and second indication means comprise a common indication member.

3. An apparatus according to claim 1, further comprising input means for inputting image data representing the objective color image.

4. An apparatus according to claim 3, wherein said input means comprises an image scanner.

5. An apparatus according to claim 1, further comprising reproduction means for reproducing as a visible image the objective color image processed by said processing means.

6. An apparatus according to claim 5, wherein said reproduction means comprises a printer.

7. An apparatus according to claim 6, wherein said printer is operated in accordance with an electrophotographic method.

8. An apparatus comprising:
    first indication means for indicating a color conversion mode for an objective color image; and
    second indication means for indicating a color after color conversion when the color conversion mode is indicated by said first indication means, and for indicating another processing mode when the color conversion mode is not indicated by said first indication means.

9. An apparatus according to claim 8, wherein said first indication means comprises a liquid crystal panel.

10. An apparatus according to claim 8, wherein said second indication means comprises a liquid crystal panel.

11. An apparatus according to claim 8, wherein said first and second indication means comprise a common indication member.

12. An apparatus according to claim 8, wherein the other processing mode comprises moving the objective color image.

13. An apparatus according to claim 12, wherein said other processing mode comprises zooming in and out of the objective color image.

14. An apparatus according to claim 12, further comprising supply means for supplying a color image signal representing the objective color image.

15. An apparatus according to claim 14, further comprising conversion means for converting a signal representing a predetermined color in the color image signal into a signal representing a color after the color conversion, in accordance with the indications by said first and second indication means.

16. An apparatus according to claim 15, further comprising reproduction means for reproducing as a visible image the signal converted by said conversion means.

17. An apparatus according to claim 16, wherein said reproduction means comprises a printer.

18. An apparatus comprising:
    setting means for setting a color conversion mode; and
    guide means for interactively guiding a color conversion indication by displaying characters, in said color conversion mode set by said setting means.

19. An apparatus according to claim 18, wherein the characters constitute a guiding sentence which is changed every time the color conversion indication is changed.

20. An apparatus according to claim 18, wherein said guide means further comprises:
a display for displaying the characters; and
judgment means for judging an indication displayed on said display.

21. An apparatus according to claim 20, wherein said judgment means detects a touch of said display.

22. An apparatus according to claim 20, wherein said display comprises a liquid crystal display.

23. An image processing method comprising the steps of:
detecting a first indication according to a movement of an objective color image;
detecting a second indication according to conversion of a specific color in the objective color image; and
moving the objective color image in accordance with the detected first indication, and performing color conversion of the objective color image in accordance with the second indication.

24. A method according to claim 23, wherein the first and second indications comprise indications by a common indication member.

25. A method according to claim 23, further comprising the step of inputting image data representing the objective color image.

26. A method according to claim 23, further comprising the step of reproducing as a visible image an image according to the objective color image which was moved and color-converted.

27. A method according to claim 26, wherein the visible image comprises a printed image.

28. An apparatus comprising:
first means for interactively setting a color processing mode by means of a touch on a display; and
second means for indicating the setting of the color processing mode, wherein said first means interactively sets the color processing mode in accordance with the indication by said second means.

29. An apparatus according to claim 28, further comprising display means for displaying characters on said display.

30. An apparatus according to claim 28, further comprising judgment means for judging an indication displayed on said display.

31. An apparatus according to claim 30, wherein said judgment means detects a touch of said display.

32. An apparatus according to claim 28, wherein said display comprises a liquid crystal display.

* * * * *

UNITED STATES PATENT AND TRADEMARK OFFICE
CERTIFICATE OF CORRECTION

PATENT NO.  : 5,140,413
DATED       : August 18, 1992
INVENTOR(S) : YASUMICHI SUZUKI, ET AL.                Page 1 of 9

It is certified that error appears in the above-identified patent and that said Letters Patent is hereby corrected as shown below:

On drawing

SHEET 5 OF 79

Figure 5:
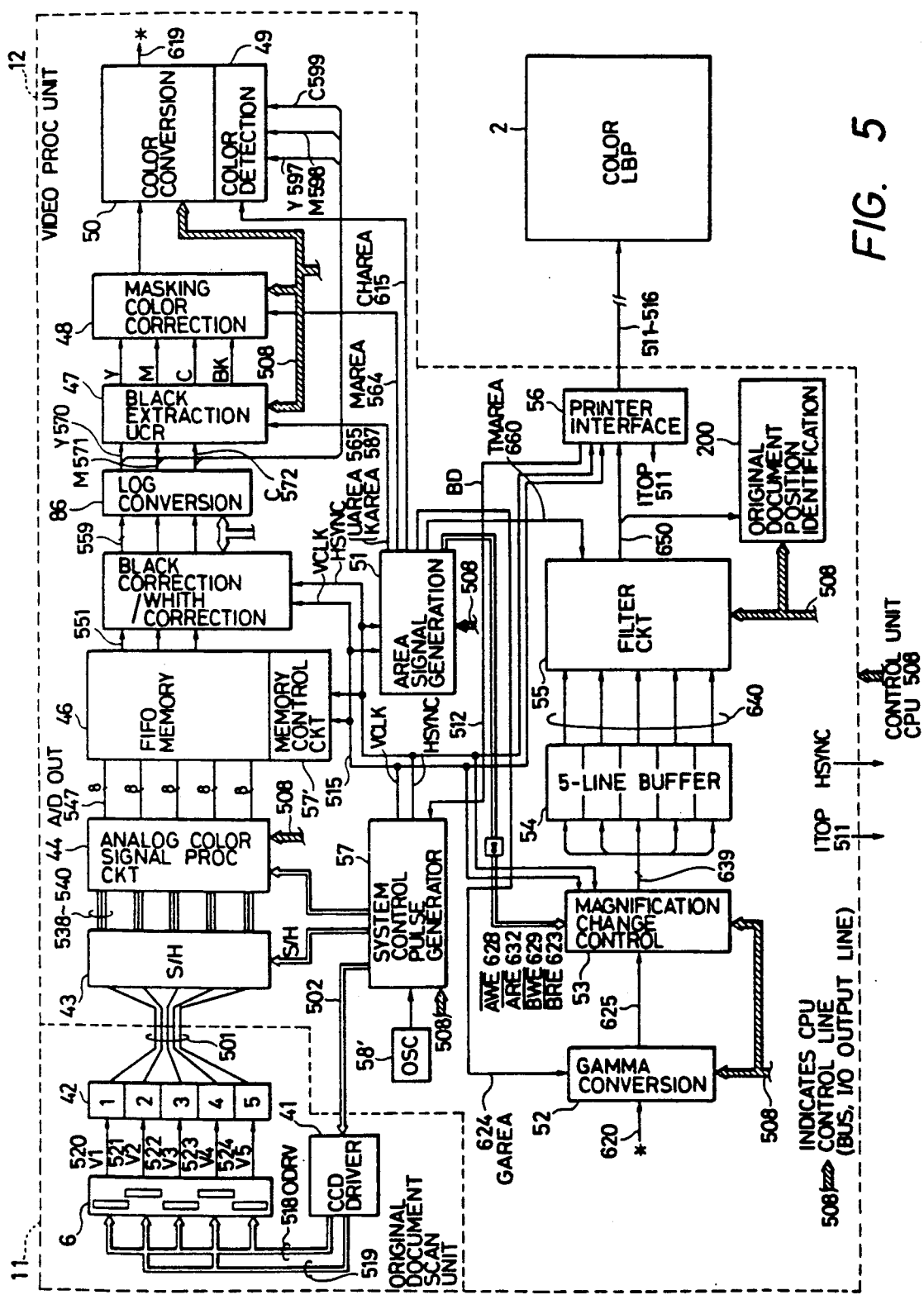
FIG. 5 is a detailed circuit diagram showing the circuit of a video processing unit incorporated in the controller shown in FIG. 2.
Figure 6A:
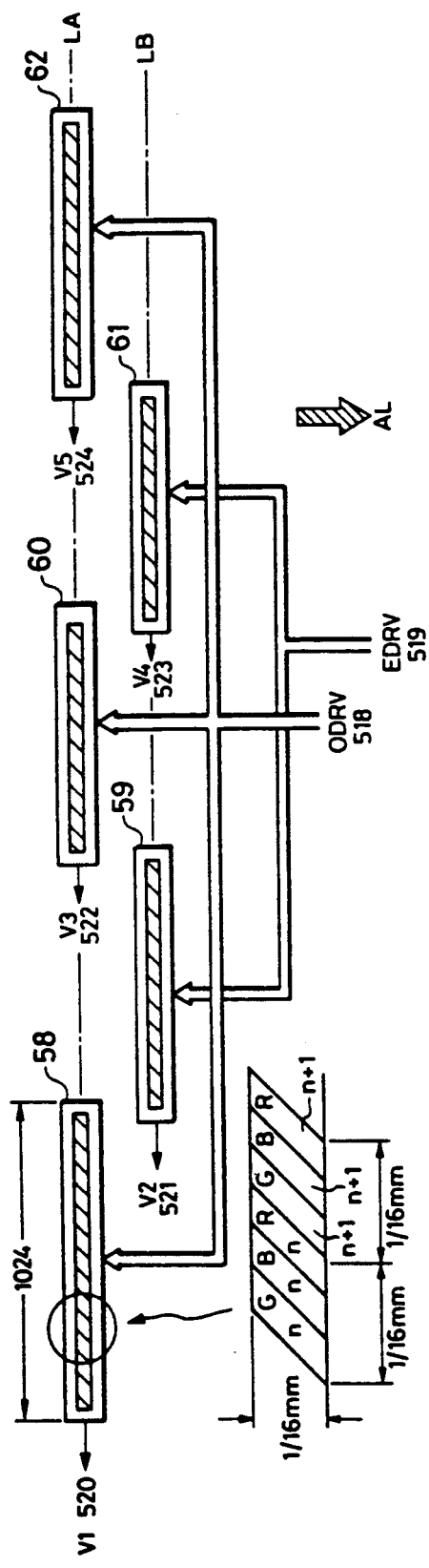
FIG. 6A shows the arrangement of a CCD sensor.
Figure 6B:
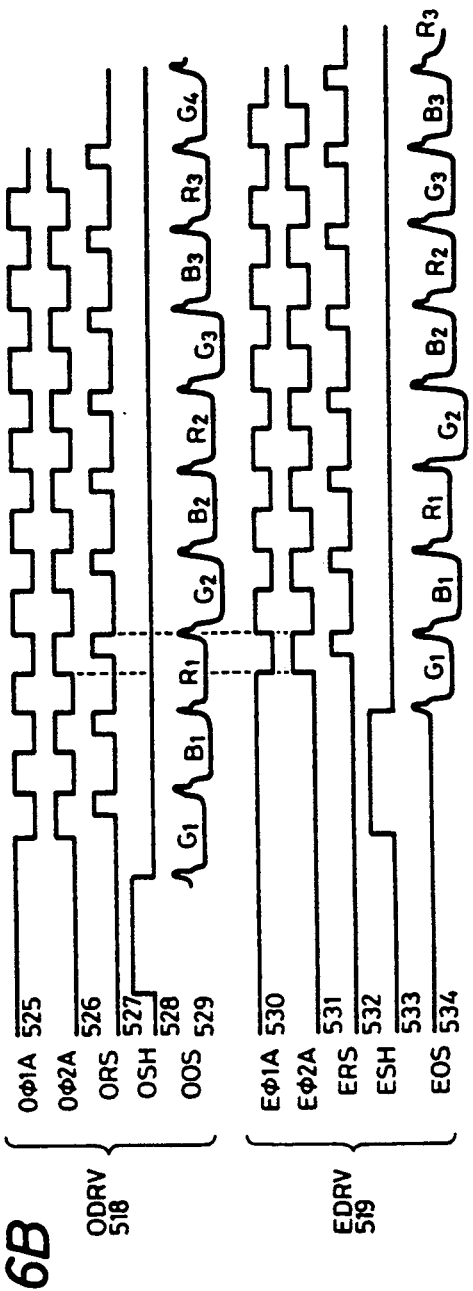
FIG. 6B is a signal timing chart illustrating timings of various signals in various portions of the arrangement shown in FIG. 6A.

FIG. 5, "WHITH" should read --WHITE--.

SHEET 15 OF 79

FIG. 10A, "RAN" should read --"RAM--.

SHEET 22 OF 79

Figures 2A, 11:
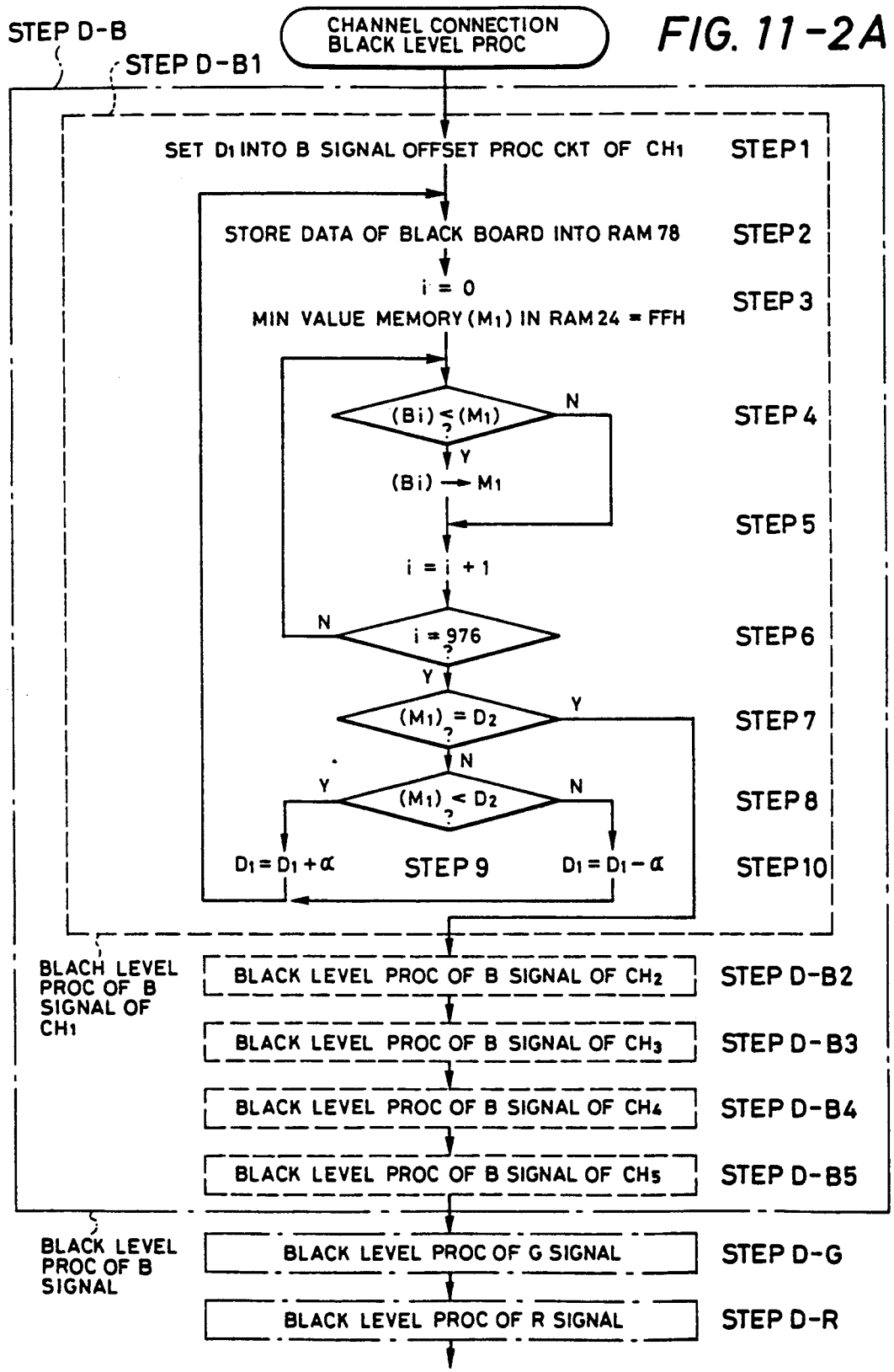
Figures 2B, 11:
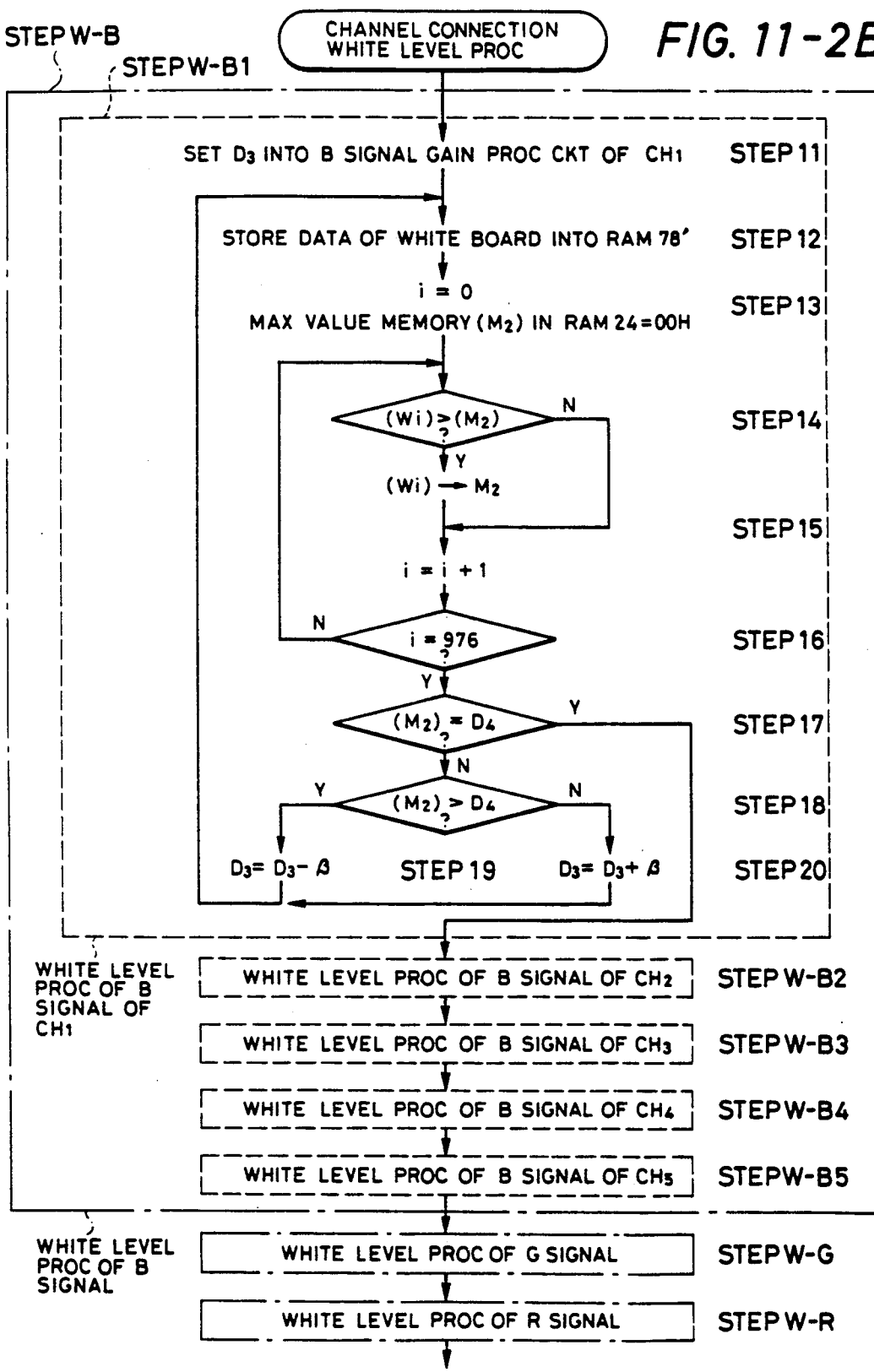
Figures 2C, 11:
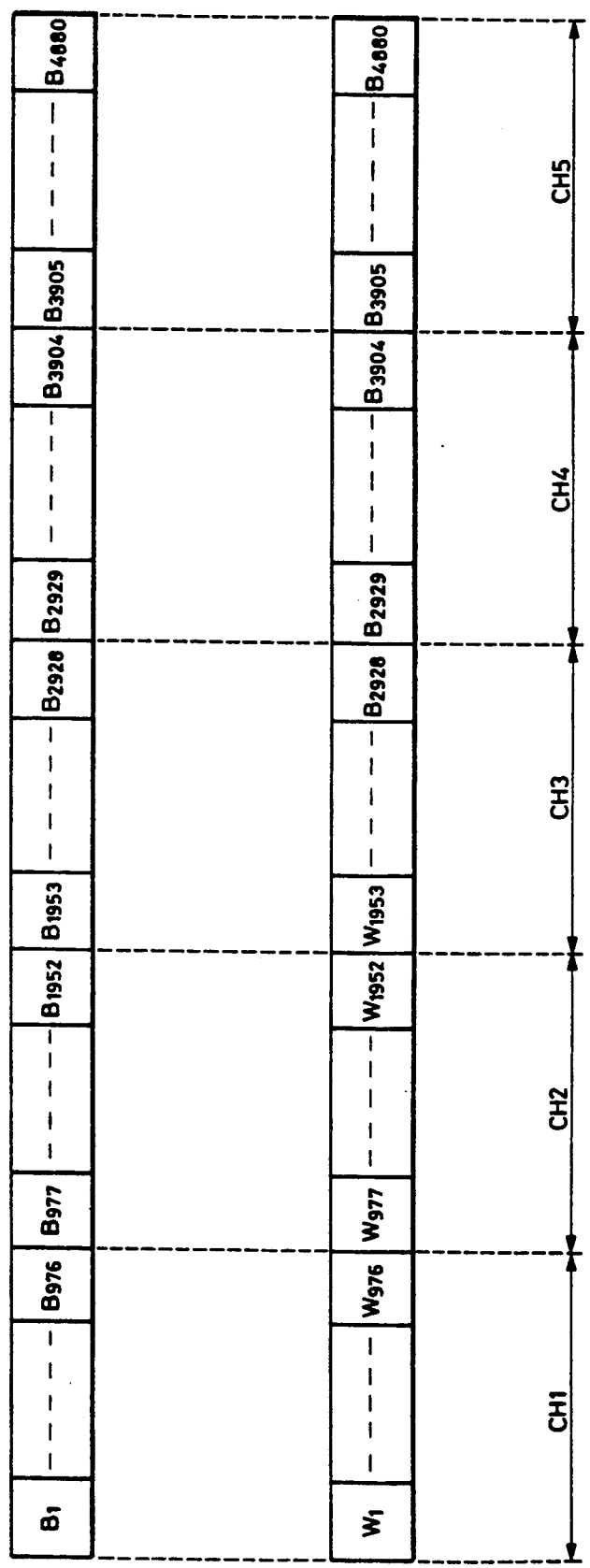
Figures 3, 11:
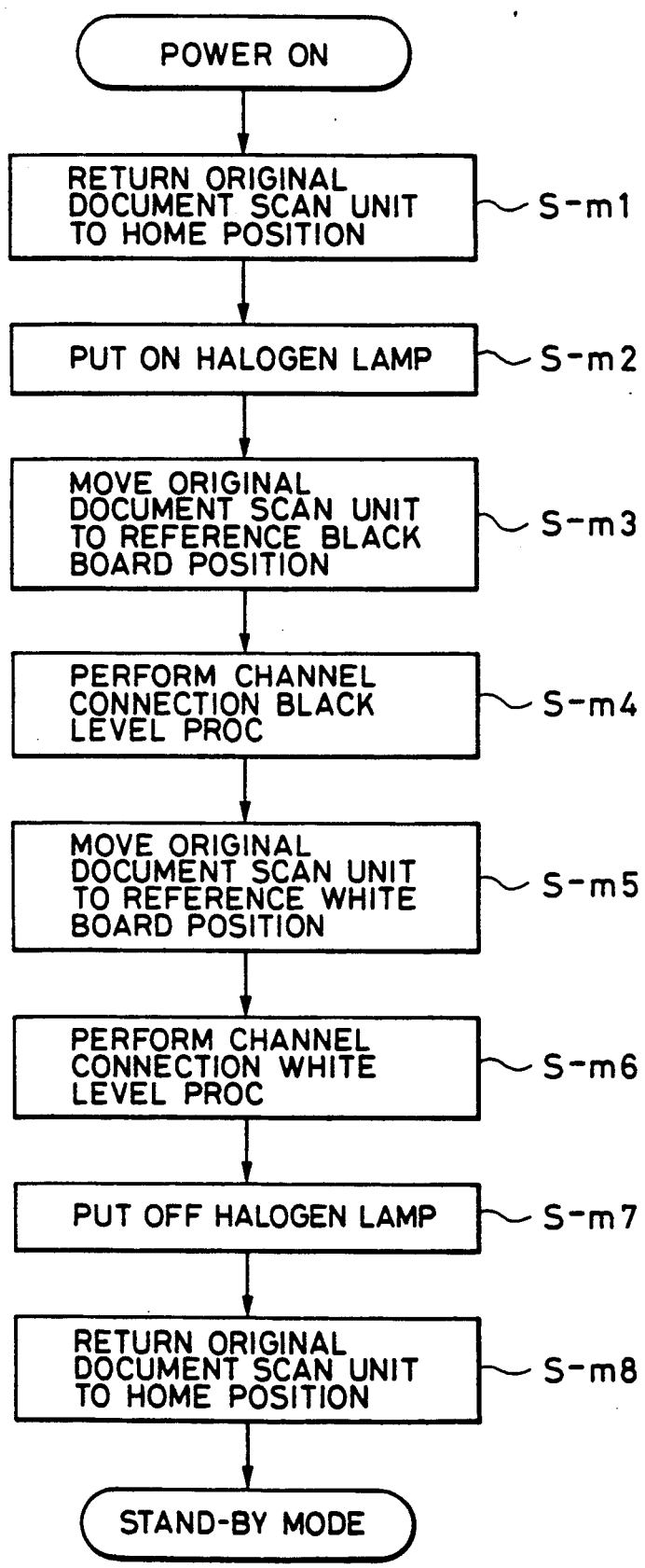
FIG. 3 is an illustration of a protocols of a motor driver and a CPU incorporated in the control block shown in FIG. 2.

FIG. 11-2A, "BLACH" should read --BLACK--.

SHEET 42 OF 79

FIG. 22, "ENLARGMENT" should read --ENLARGEMENT--.

SHEET 43 OF 79

FIG. 23, "VOLTAOGE" should read --VOLTAGE--.

SHEET 49 OF 79

Figure 29A:
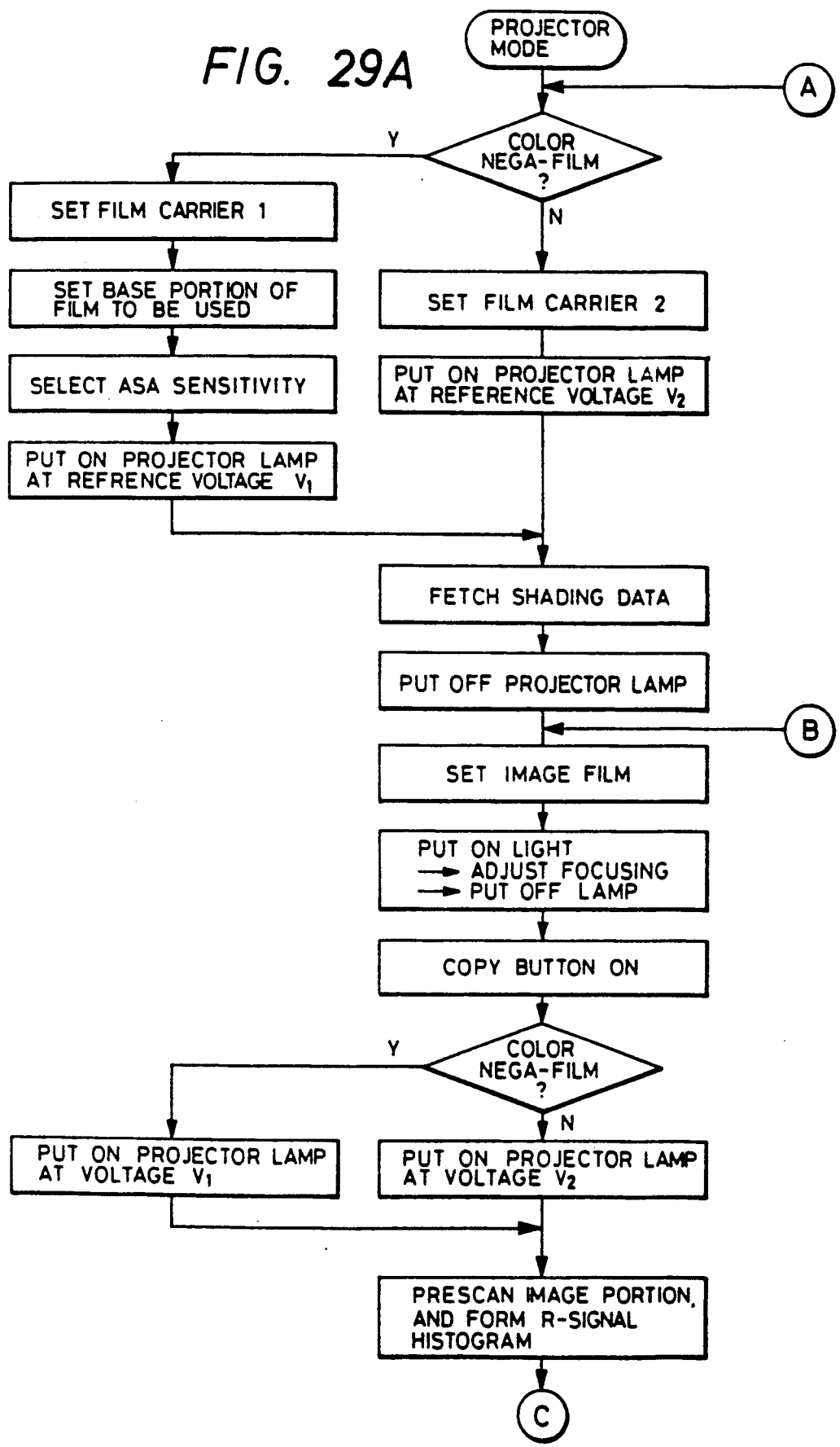
FIGS. 29A and 29B are control flow charts showing the control executed when the film projector is used.
Figure 29B:
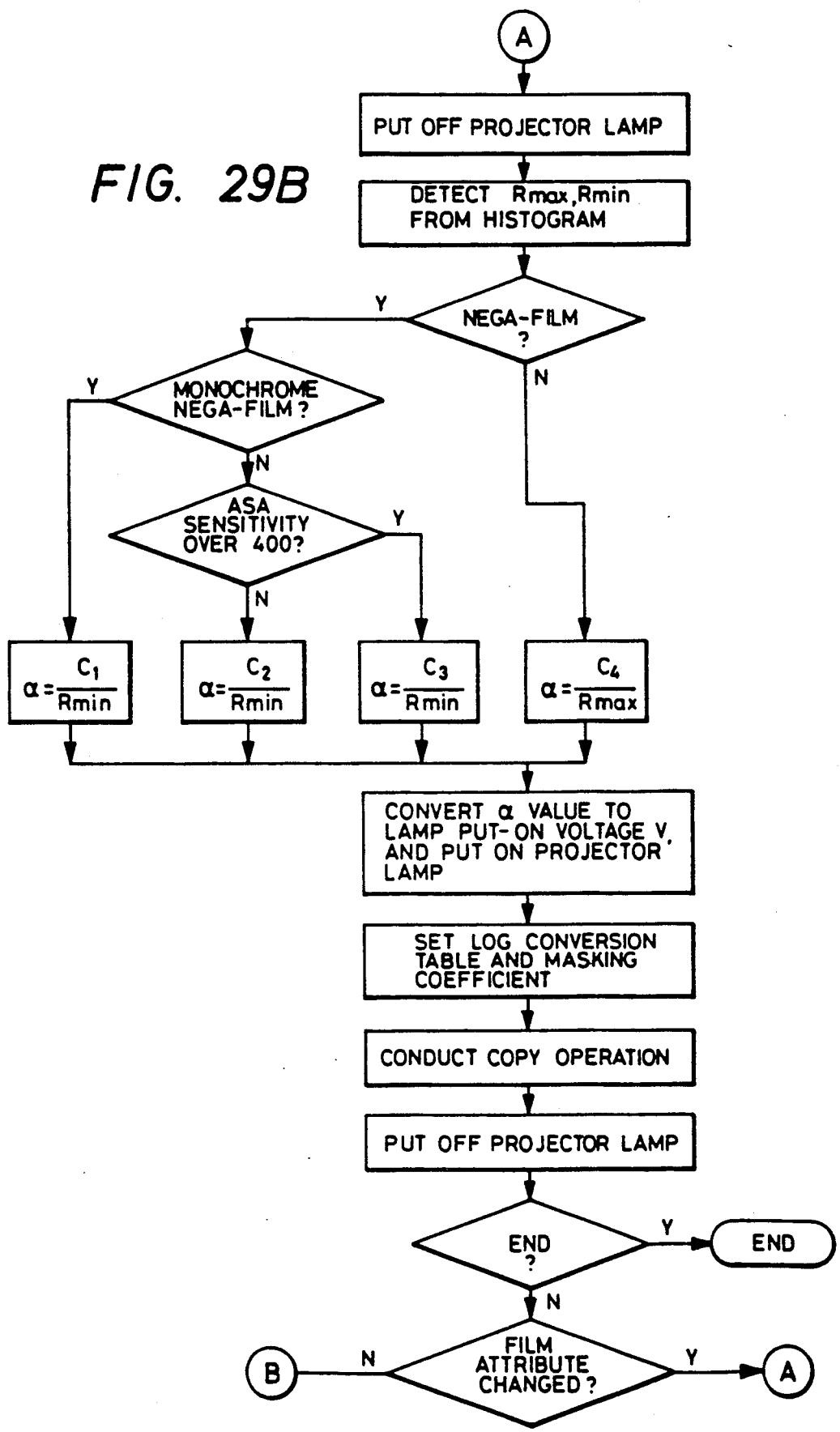
Figure 30:
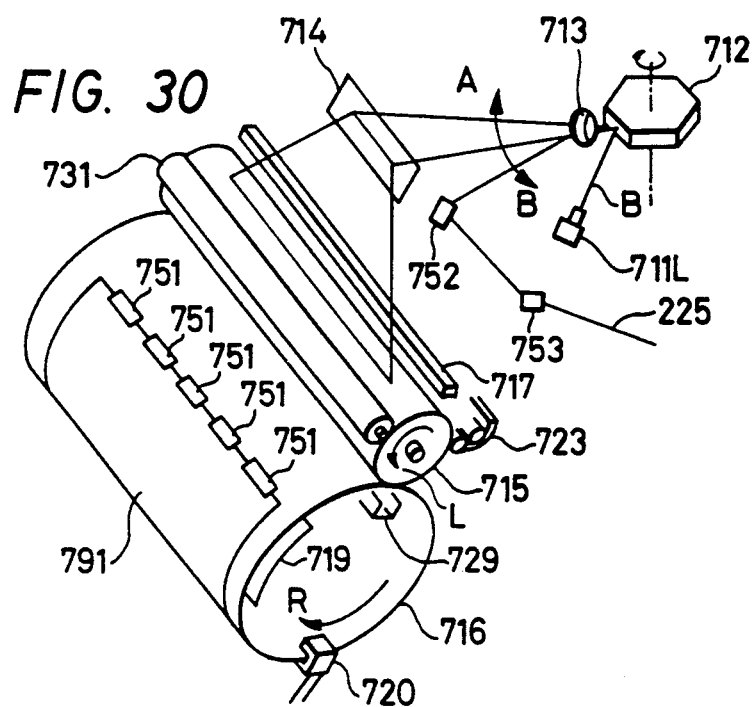
FIG. 30 is a perspective view of a laser print unit.

FIG. 29A, "REFRENCE" should read --REFERENCE--.

SHEET 53 OF 79

FIG. 33, "ENLARGMENT" should read --ENLARGEMENT--.

SHEET 63 OF 79

FIG. 44, "COODINATE" should read --COORDINATE--.

UNITED STATES PATENT AND TRADEMARK OFFICE
CERTIFICATE OF CORRECTION

PATENT NO. : 5,140,413
DATED : August 18, 1992
INVENTOR(S) : YASUMICHI SUZUKI, ET AL.

It is certified that error appears in the above-identified patent and that said Letters Patent is hereby corrected as shown below:

COLUMN 1

Line 7, "which" should read --now abandoned which--.

COLUMN 2

Line 35, "protocols" should read --protocol--.

COLUMN 5

Line 17, "7" should read --4--.

COLUMN 6

Line 50, "roller" should read --drum--.
Line 63, "9" should be deleted.

COLUMN 8

Line 29, "signal 515" should read --signal 512--.
Line 31, "signal 515" should read --signal 512--.

COLUMN 9

Line 4, "circuit 28." should read --unit 13.--.

COLUMN 10

Line 8, "CLOKO" should read --CLKO--.

UNITED STATES PATENT AND TRADEMARK OFFICE
CERTIFICATE OF CORRECTION

PATENT NO. : 5,140,413
DATED : August 18, 1992
INVENTOR(S) : YASUMICHI SUZUKI, ET AL.

It is certified that error appears in the above-identified patent and that said Letters Patent is hereby corrected as shown below:

COLUMN 11

Line 24, "251bso" should read --251b so--.
   Line 29, "G." should read --G,--.
   Line 42, "signal" should read --signals--.

COLUMN 12

Line 58, "signal" should read --signals--.

COLUMN 13

Line 3, "that" should read --with--.
   Line 25, "are" should read --is--.
   Line 41, "fifo" should read --FiFo--.
   Line 42, "form" should read --from--.
   Line 58, "synchroism" should read --synchronism--.

COLUMN 14

Line 6, "indicates" should read --indicate--.
   Line 16, "arrangement" should read --arrangements--.
   Line 46, "RAM 87." should read --RAM 78.--.

COLUMN 15

Line 17, "$(M_j+)$" should read --$(M_j+1)$--.

COLUMN 17

Line 1, "RAM 87" should read --RAM 78--.
   Line 34, "$D_1\pm\alpha)$" should read --$(D_1\pm\alpha)$--.

UNITED STATES PATENT AND TRADEMARK OFFICE
CERTIFICATE OF CORRECTION

PATENT NO. : 5,140,413
DATED : August 18, 1992
INVENTOR(S) : YASUMICHI SUZUKI, ET AL.

It is certified that error appears in the above-identified patent and that said Letters Patent is hereby corrected as shown below:

COLUMN 18

Line 44, "Sm-1" should read --S-m1--.
Line 52, "operate" should read --operates--.

COLUMN 19

Line 62, ")green)" should read --(green)--.
Line 64, ")red)" should read --(red)--.

COLUMN 20

Line 8, "has" should read --have--.
Line 60, "M1" should read --$M_1$--.

COLUMN 21

Line 12, "-bM1, -cC1)" should read -- $-bM_1, -cC_1$)--.
Line 25, "UAREA 566" should read --UAREA 565--.
Line 51, "signals" should read --signal--.
Line 54, "RAREA" should read --UAREA--.

COLUMN 22

Line 23, "AREAAn." should read --AREAn.--.
Line 64, "J-k" should read --J-K--.

COLUMN 23

Line 33, "if" should read --is--.
Line 42, "ram = $M_i$/-" (second occurrence) should be deleted.
Line 43, "($Y_i+M_i+C_i$)," should be deleted.

UNITED STATES PATENT AND TRADEMARK OFFICE
CERTIFICATE OF CORRECTION

PATENT NO. : 5,140,413
DATED : August 18, 1992
INVENTOR(S) : YASUMICHI SUZUKI, ET AL.

It is certified that error appears in the above-identified patent and that said Letters Patent is hereby corrected as shown below:

COLUMN 24

Line 49, "are" should read --area--.
    Line 65, "619The" should read --619. The--.

COLUMN 25

Line 28, "alloted" should read --allotted--.
    Line 60, "is" should read --are--.
    Line 68, "C." should read --C,--.

COLUMN 27

Line 6, "sh s" should read --shows--.
    Line 23, "change" should read --changed--.
    Line 33, "alloted" should read --allotted--.
    Line 34, "Te" should read --The-- and
           "alloted" should read --allotted--.

COLUMN 28

Line 47, "which is" should be deleted.
    Line 68, "are" should read --is--.

COLUMN 29

Lines 66-68, set lower case.

COLUMN 30

Line 14, "reduce" should read --reduces--.
    Line 28, "are a" should read --area--.
    Line 54, "for" should read --when--.

UNITED STATES PATENT AND TRADEMARK OFFICE
CERTIFICATE OF CORRECTION

PATENT NO. : 5,140,413
DATED : August 18, 1992
INVENTOR(S) : YASUMICHI SUZUKI, ET AL.

It is certified that error appears in the above-identified patent and that said Letters Patent is hereby corrected as shown below:

COLUMN 32

Line 3, "lits" should read --lights--.
Line 65, "lits" should read --lights--.

COLUMN 33

Line 2, "8by" should read --8 by--.
Line 3, "mans" should read --means--.
Line 46, "weave." should read --wave.--.

COLUMN 34

Line 27, "$P_{43}$" should read --$P_3$--.
Line 43, "resolutions" should read --resolution is--.
Line 60, "becomes" should read --become--.

COLUMN 35

Line 46, "28A," should read --28A),--.

COLUMN 36

Line 8, "lens 13" should read --lens 713--.
Line 67, "represent" should read --represents--.

COLUMN 37

Line 3, "beset" should read --be set--.

UNITED STATES PATENT AND TRADEMARK OFFICE
CERTIFICATE OF CORRECTION

PATENT NO. : 5,140,413

DATED : August 18, 1992

INVENTOR(S) : YASUMICHI SUZUKI, ET AL.

It is certified that error appears in the above-identified patent and that said Letters Patent is hereby corrected as shown below:

COLUMN 38

Line 47, "appoints" should read --appoint--.
Line 57, "M230," should read --M220,--.

COLUMN 39

Line 25, "wished" should read --wishes--.
Line 63, "in" (second occurrence) should read --is--.

COLUMN 42

Line 10, "proceeds" should read --proceed to--.
Line 13, "make" should read --makes--.
Line 39, "permits" should be deleted.
Line 40, "an" should read --and--.

COLUMN 43

Line 8, "differenct" should read --different--.
Line 14, "tizer 15" should read --tizer 16--.

COLUMN 44

Line 24, "M 370." should read --M 730.--.

COLUMN 47

Line 5, "unit 16" should read --unit 11--.
Line 60, "RANB" should read --RAMB--.

UNITED STATES PATENT AND TRADEMARK OFFICE
CERTIFICATE OF CORRECTION

PATENT NO. : 5,140,413
DATED : August 18, 1992
INVENTOR(S) : YASUMICHI SUZUKI, ET AL.

It is certified that error appears in the above-identified patent and that said Letters Patent is hereby corrected as shown below:

COLUMN 48

Line 27, "BIIMAP" should read --BIT__MAP--.
Line 35, "REGI__COLOR" should read --REG__COLOR--.

COLUMN 49

Line 15, "REGI__COLOR" should read --REG__COLOR--.
Line 45, "Y." should read --Y,--.

COLUMN 50

Line 2, "Y," should read --of Y,--.
Line 52, "form" should read --from--.

COLUMN 51

Line 20, "Y." should read --Y,--.
Line 57, "*Yr," should read --(Yr,--.

UNITED STATES PATENT AND TRADEMARK OFFICE
CERTIFICATE OF CORRECTION

PATENT NO. : 5,140,413
DATED : August 18, 1992
INVENTOR(S) : YASUMICHI SUZUKI, ET AL.

It is certified that error appears in the above-identified patent and that said Letters Patent is hereby corrected as shown below:

COLUMN 52

```
Line 5,  "threshold" should read --thresholds--.
Line 46, "Y." should read --Y,--.
Line 49, "IN" should read --In--.
Line 56, "pints" should read --points--.
Line 59, "A." should read --A,--.
```

Signed and Sealed this

Third Day of May, 1994

*Attest:*

BRUCE LEHMAN

*Attesting Officer*   Commissioner of Patents and Trademarks